United States Patent [19]
Hefferen et al.

[11] Patent Number: 6,154,686
[45] Date of Patent: Nov. 28, 2000

[54] DISTRIBUTED ARCHITECTURE

[75] Inventors: Peter J. Hefferen; Christopher E. Kikta, both of Pittsburgh; Bruce D. Arnold, Murrysville; John F. Wiedmann, Pittsburgh, all of Pa.

[73] Assignee: Innovex Technologies, Turtle Creek, Pa.

[21] Appl. No.: 09/049,512

[22] Filed: Mar. 27, 1998

Related U.S. Application Data

[63] Continuation-in-part of application No. 08/683,799, Jul. 18, 1996, Pat. No. 5,988,860.
[51] Int. Cl.[7] .......................... G05B 13/00; G05B 15/00; G05B 21/00
[52] U.S. Cl. ........................ 700/276; 700/277; 454/59
[58] Field of Search ...................... 364/528.11, 131; 454/59; 700/276, 2, 277, 282

[56] References Cited

U.S. PATENT DOCUMENTS

| | | | |
|---|---|---|---|
| 4,466,341 | 8/1984 | Grogan | 98/115 |
| 5,312,297 | 5/1994 | Dieckert et al. | 454/238 |
| 5,764,579 | 6/1998 | McMasters et al. | 364/131 |
| 5,882,254 | 3/1999 | Jacob | 454/61 |
| 5,988,860 | 11/1999 | Hefferen et al. | 700/276 |

*Primary Examiner*—William Grant
*Assistant Examiner*—Victoria Robinson
*Attorney, Agent, or Firm*—Ansel M. Schwartz

[57] ABSTRACT

A system for controlling the operation of a laboratory with a fume hood having a sash. The system includes an intelligent occupancy monitor mechanism. The system includes an intelligent sash closure mechanism. The producing mechanism and the controlling mechanism form a fully distributed intelligent non-hierarchical architecture. The system includes a network to which the producing mechanism and the controlling mechanism are connected to communicate with each other. A method for controlling air flow in a fume hood.

3 Claims, 58 Drawing Sheets

Microfiche Appendix Included
(1 Microfiche, 18 Pages)

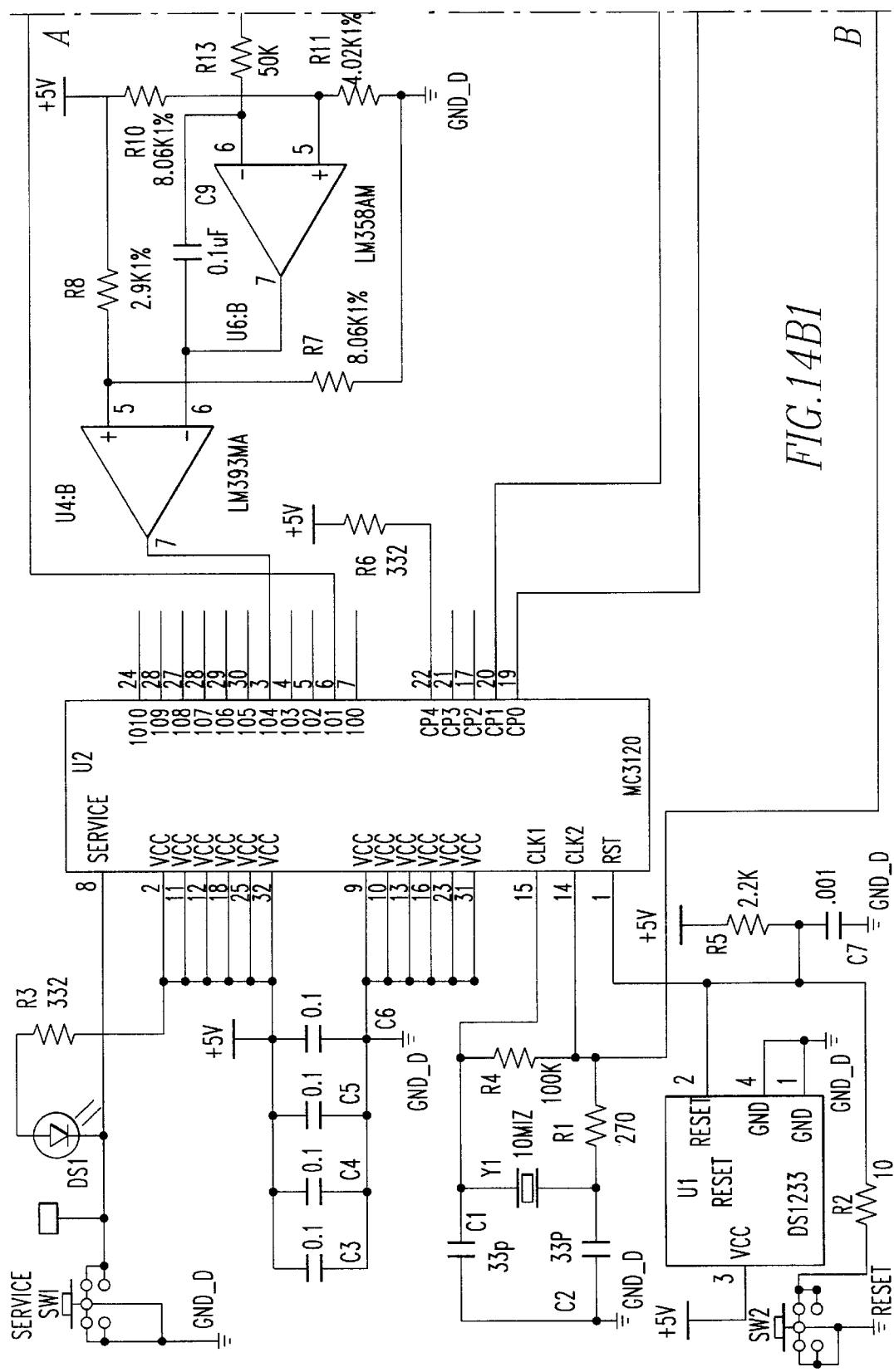
FIG. 14B1

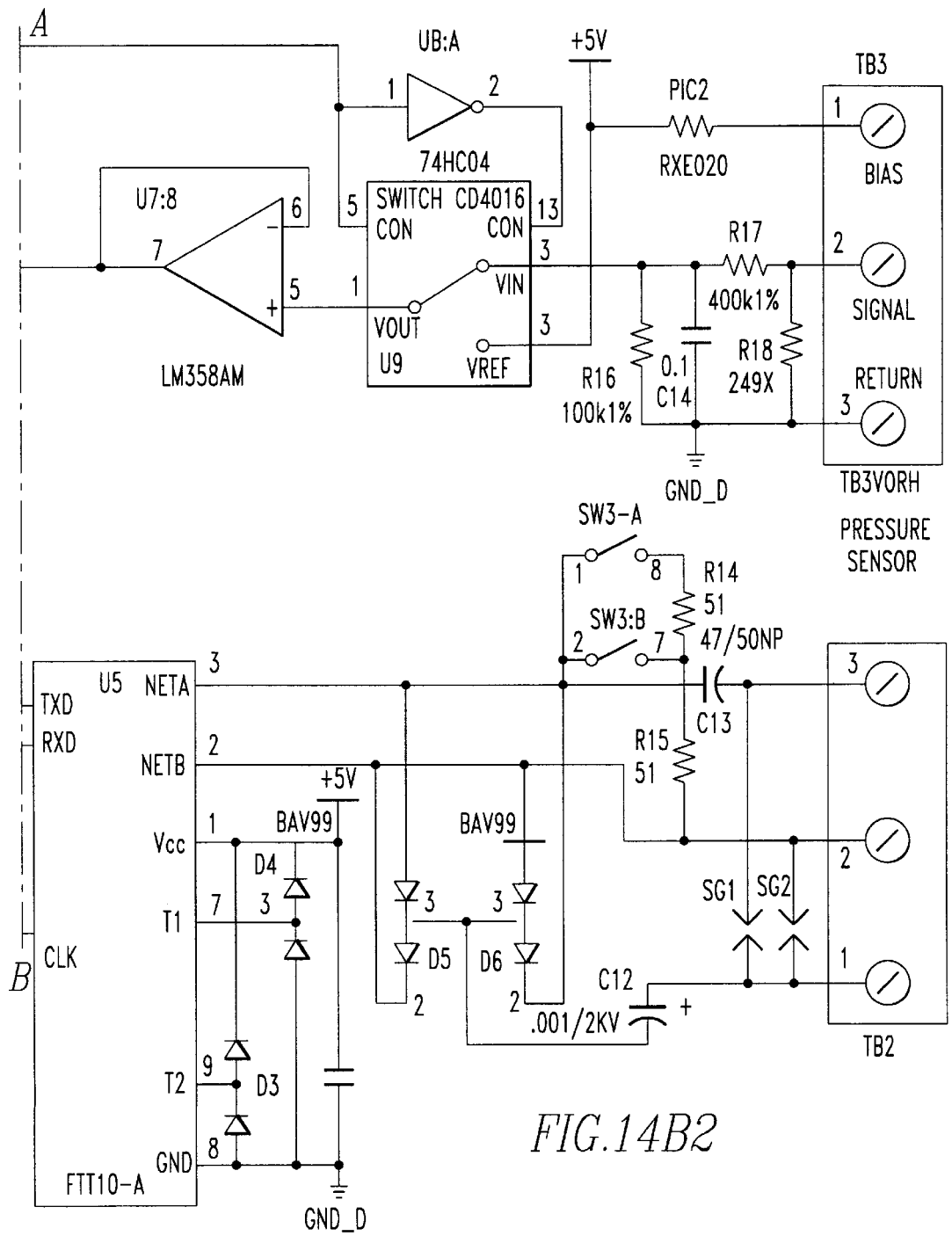
FIG.14B2

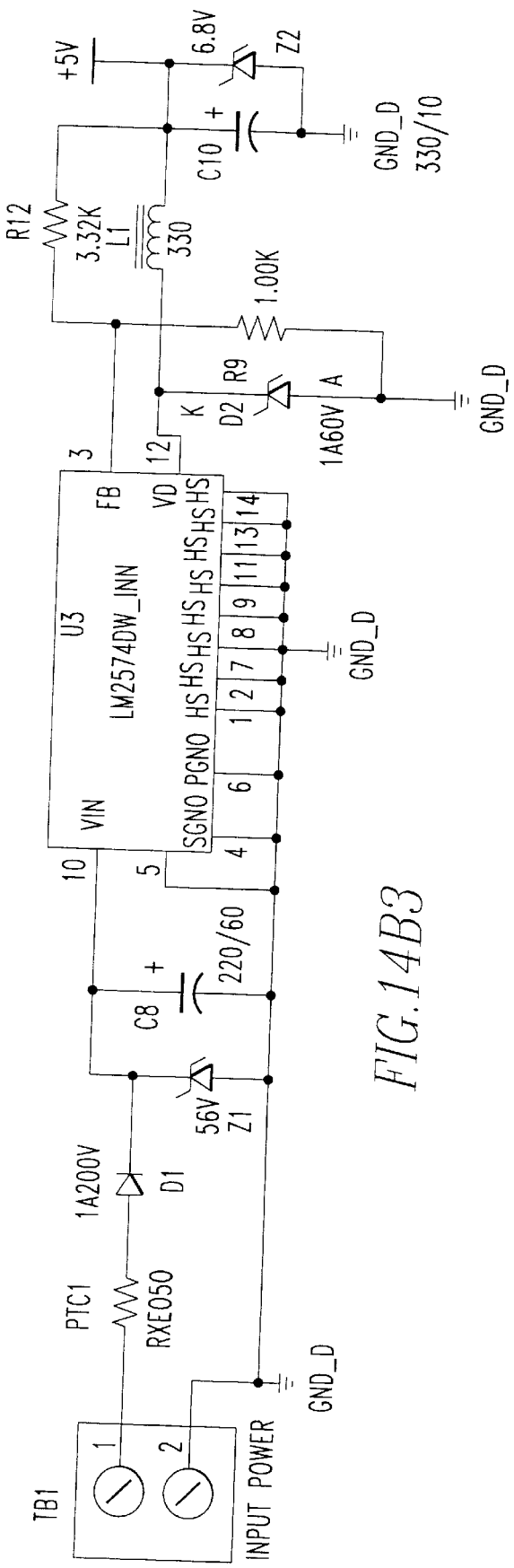
FIG. 14B3

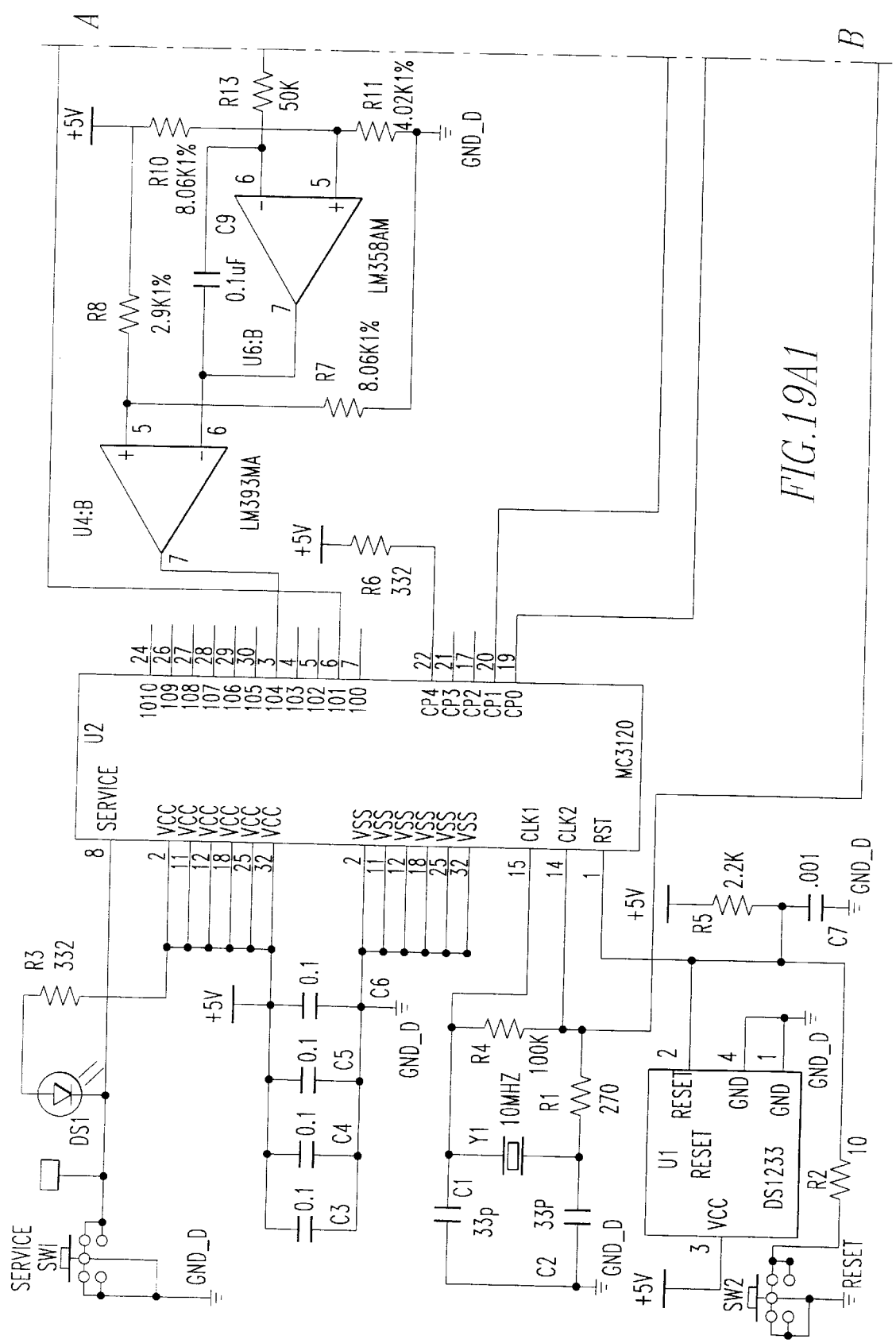
FIG.19A1

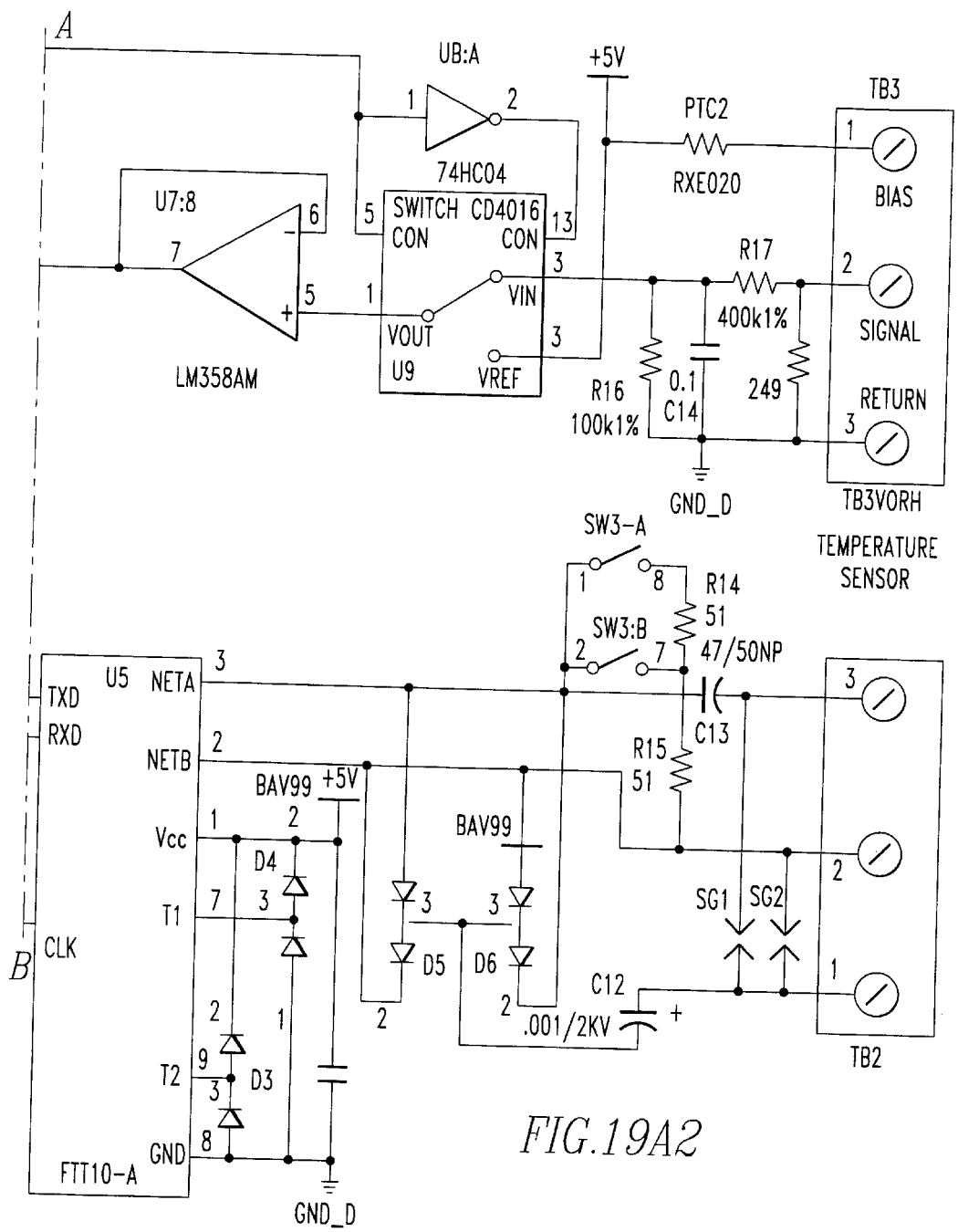
FIG.19A2

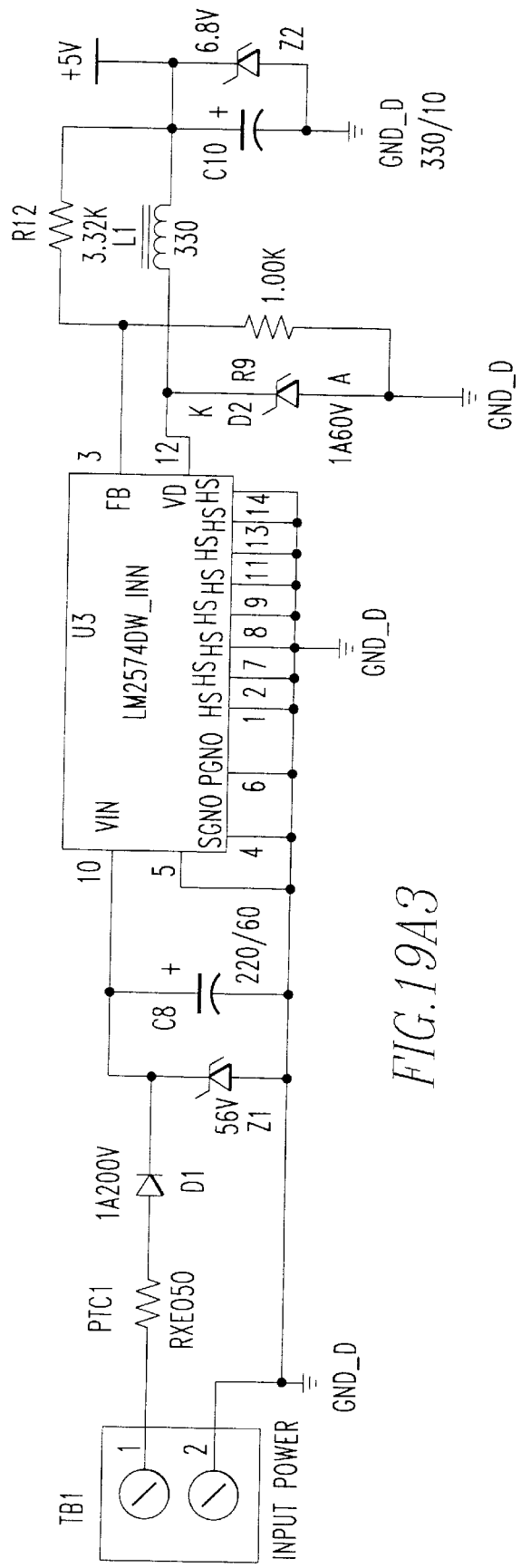
FIG.19A3

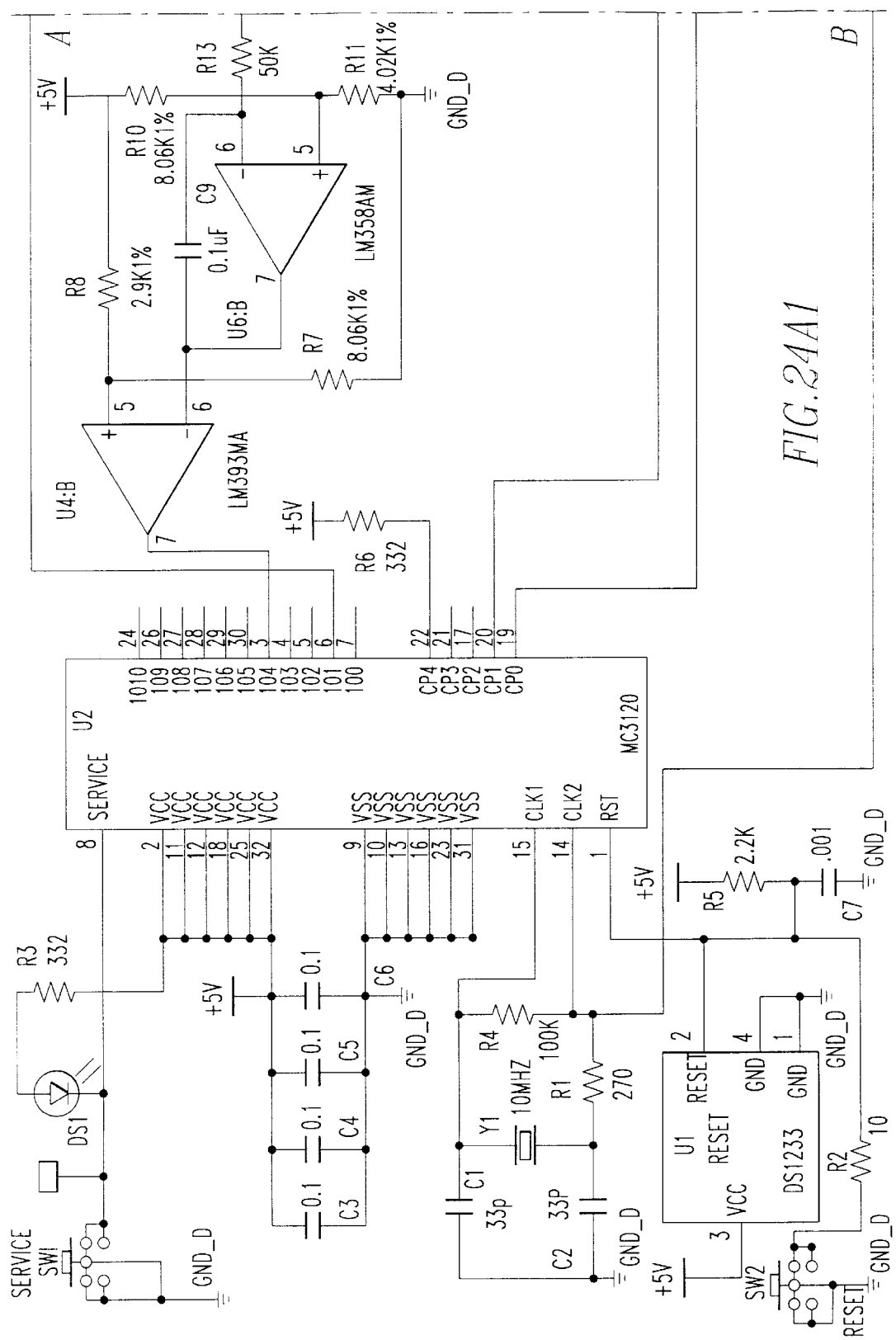
FIG.24A1

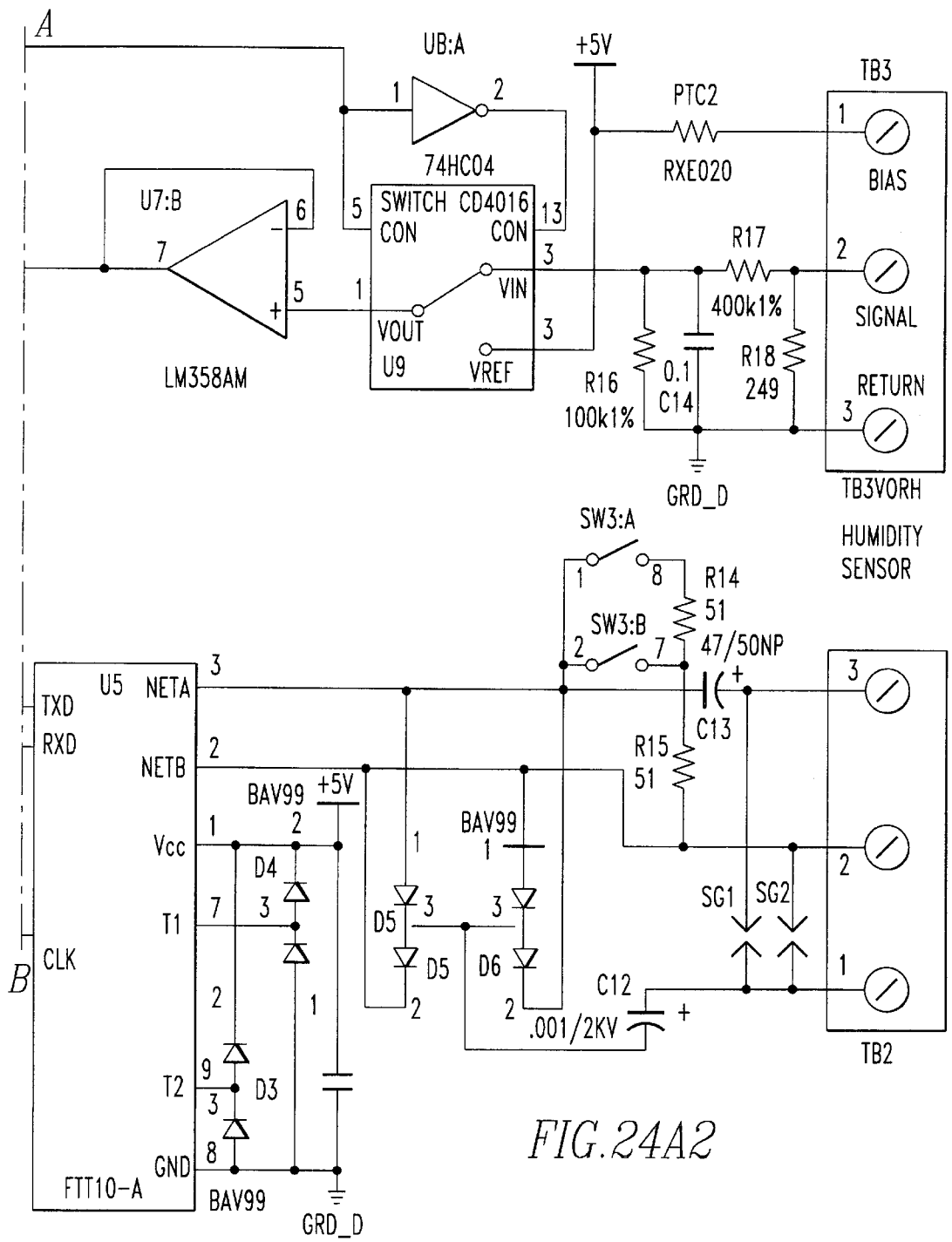
FIG. 24A2

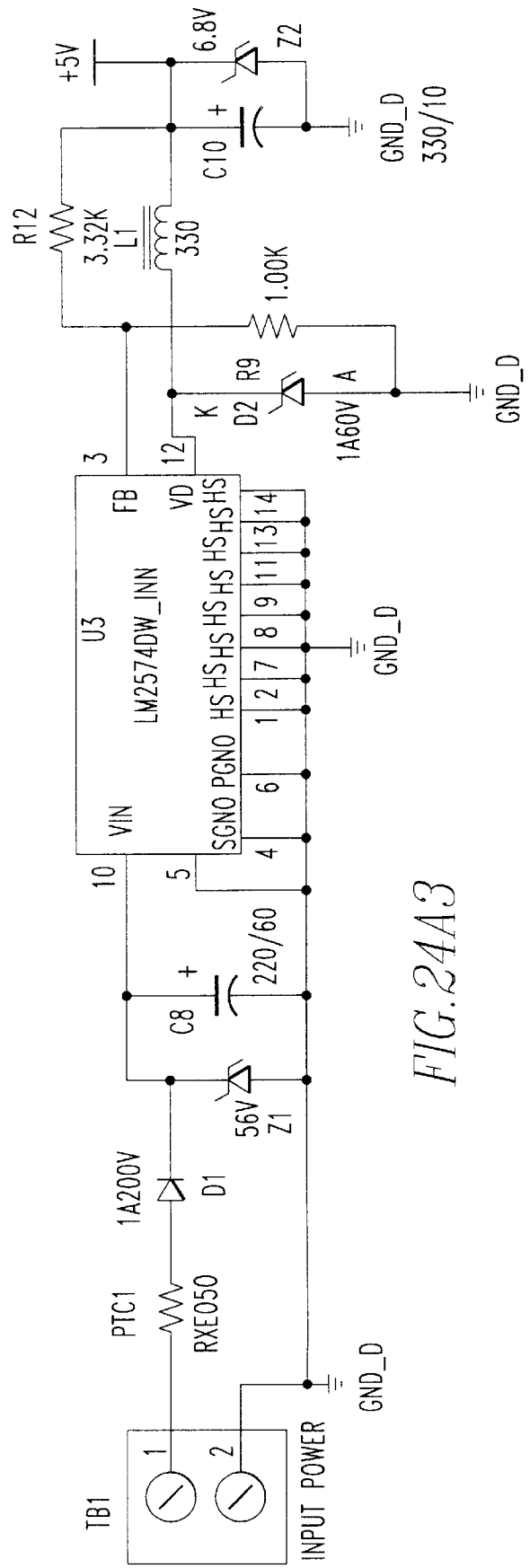
FIG. 24A3

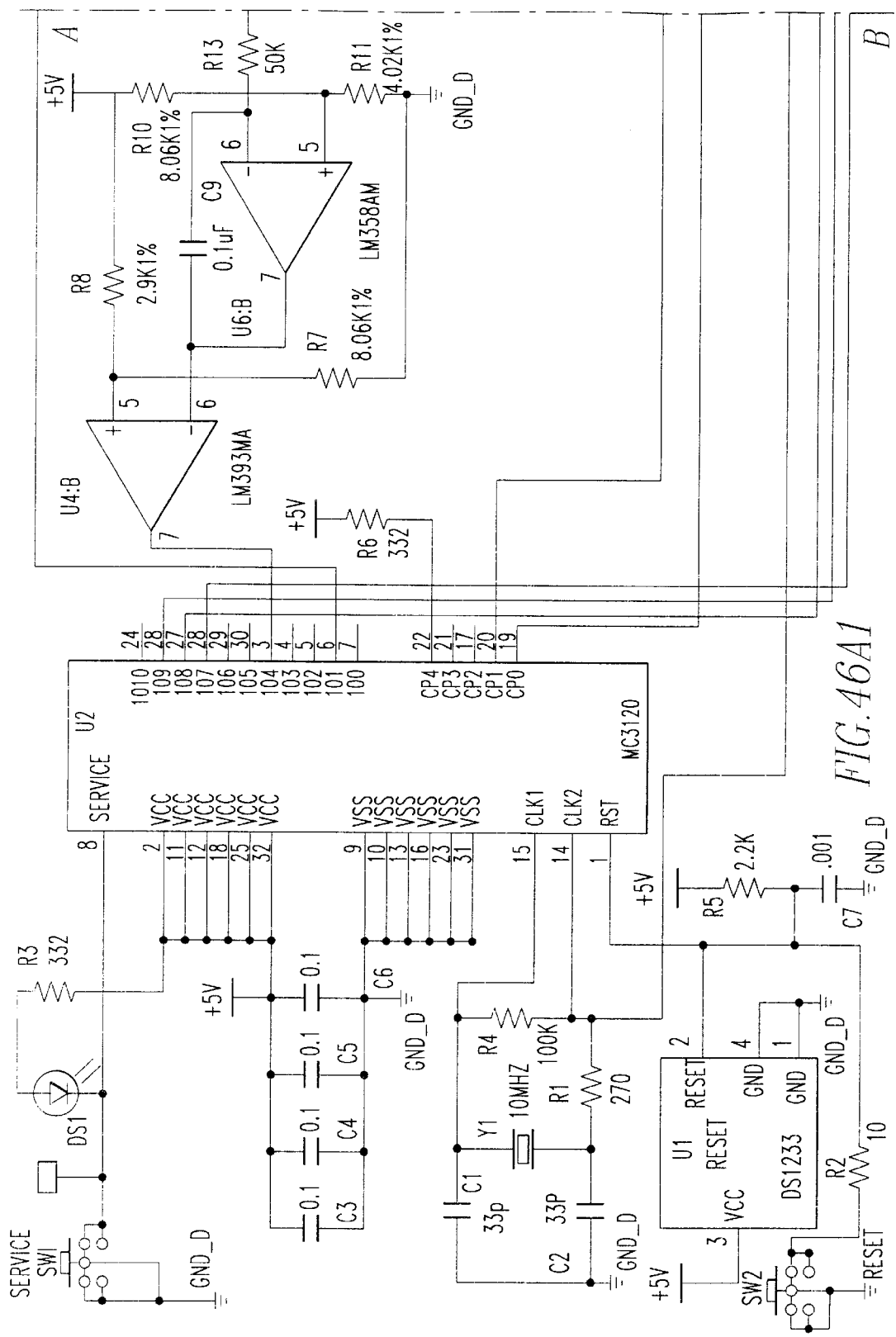
FIG. 46A1

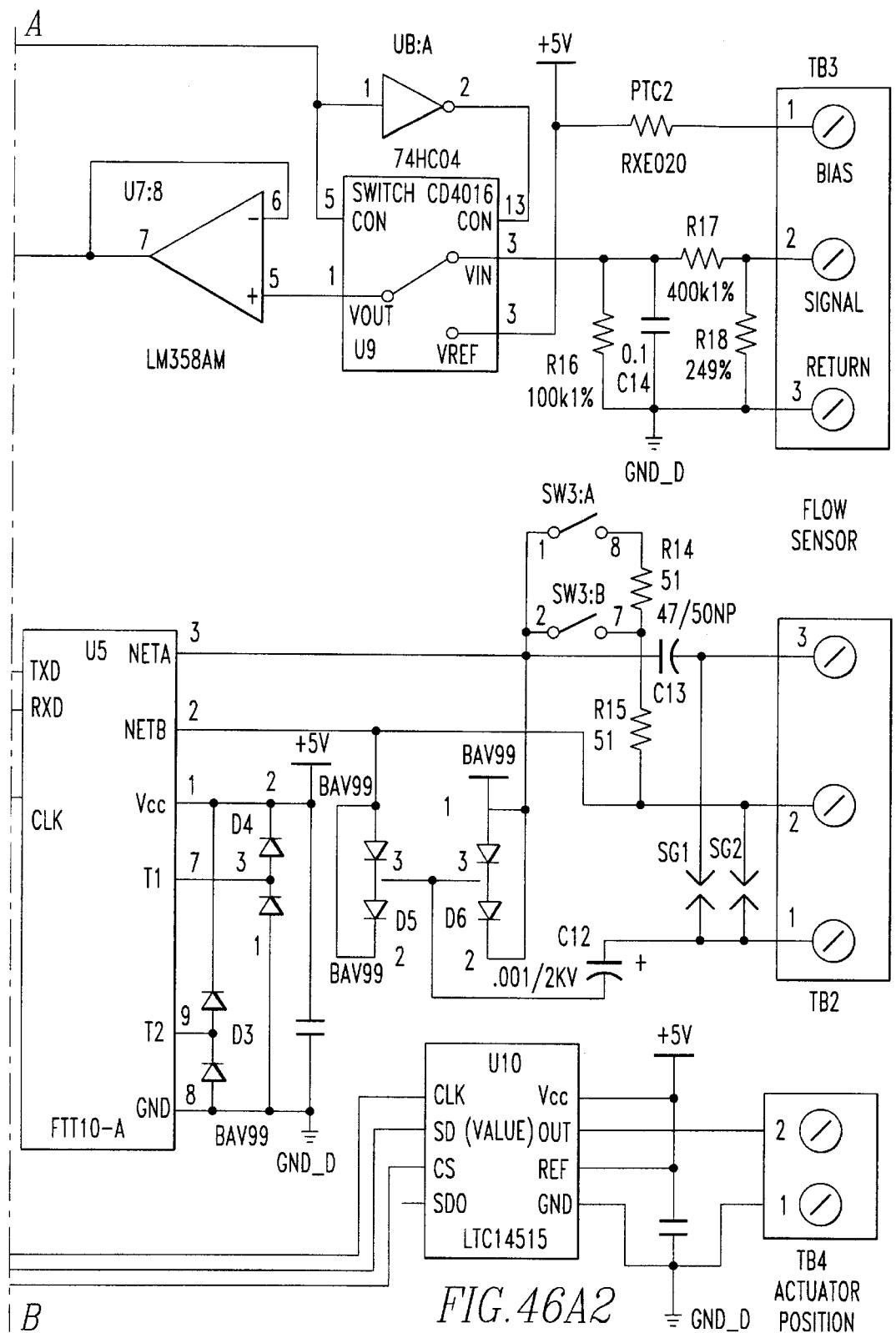
FIG. 46A2

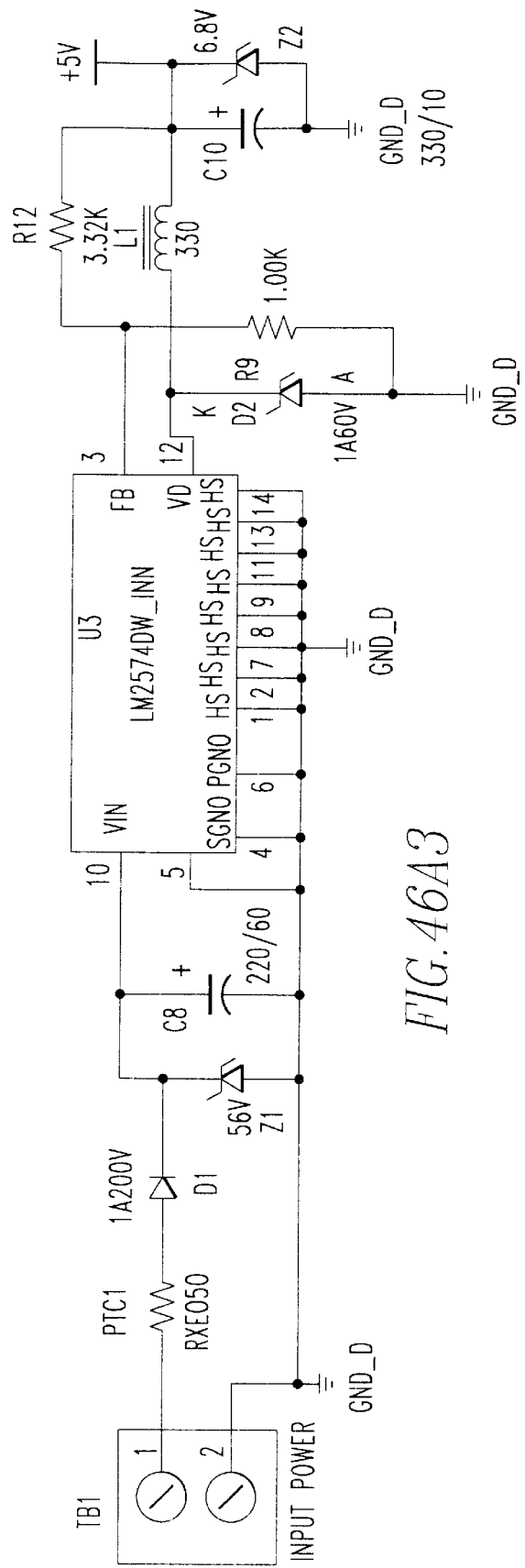
FIG. 46A3

DISTRIBUTED ARCHITECTURE

This application is a continuation-in-part of applications (s) application Ser. No. 08/683,799 filed on Jul. 18, 1996 this is now U.S. Pat. No. 5,988,860 as of Nov. 23, 1996.

MICROFICHE APPENDIX 1 sheet of microfiche containing a total of 18 frames is included herein.

FIELD OF THE INVENTION

The present invention is related to the control of air in a laboratory or a fume hood. More specifically, the present invention is related to the control of air in a laboratory or a fume hood using a distributed architecture of intelligent non-hierarchical input and output devices.

BACKGROUND OF THE INVENTION

With the primary industry emphasis on autonomous fume hood controllers and the operation of the laboratory control loop in response to their causal laboratory airflow perturbations with the resultant non-optimum laboratory loop control lag, there exists a need for a more holistic approach. Current fume hood based controllers invoke perceived control actions without any concept or regard for laboratory or neighboring fume hood(s) flow history or perceived future demands. This approach and its resultant lag has in essence rendered laboratory controllers virtually impossible to setup and tune for any reasonably wide turndown range for any but the simplest (and mostly inaccurate) opening size based analog positioning systems.

If the laboratory is assumed to be the primary control loop and the individual hoods/sashes and exhaust dampers are assumed to be just a varied group of controllable exhaust vents, with make-up air loops on individual hoods (if applicable) and supply fans/dampers just another varied group of input vents, and laboratory differential pressure (inside lab/outside lab) an indication of room door(s) flow direction then perhaps a more straightforward and effective control strategy will result.

With a neuron-based approach, the generated communication network variables to/from all neurons will appear on the network with the resultant binding of certain variables for localized individual input/exhaust vent control and the binding of (laboratory) global variables for whole system control will result in a flatter, more timely architecture than what currently exists. With the binding of all local hood desired flow variables into a lab total exhaust demand variable at the same time as the local hood exhaust intelligent actuators are receiving the same desired flow variable will allow the lab control neuron (possibly the same product with a different superset application as the hood differential airflow sensor neuron since it too will measure differential pressure within/without the lab) to determine and effect the remaining damper/vents in conjunction with uncontrolled openings (doors et. al.) at essentially the same time.

In essence the command to the lab systems supply and auxiliary exhaust vents intelligent actuators will occur simultaneously with the command to the individual intelligent actuators bound to individual (hood) exhaust dampers. All the laboratory actuators will slew in concert with each other. The laboratory will truly be just one system with some local damper actuators (hoods) having certain minimums and maximums that must be maintained (actually no different than just about any flow controlling damper anyway). In addition, the automatic sash closure strategy is best handled at the laboratory level in a non-autonomous fashion.

Since the laboratory is the main application with localized subset applications, the inclusion of a meaningful/integral smoke/fire control strategy is as straightforward as the inclusion of the laboratory into the building HVAC/lighting control strategy. In essence, the present invention is a fully distributed architecture.

The concept of a fully distributed architecture of intelligent non-hierarchical input (sensors) and output (actuation) devices is predicated on the existence of a 'flat architecture' in which intelligent devices act as peers communicating the sensible status of a process and implementing resultant controlling adjustments in response without the intervention of a superior hierarchical controller. In this architecture, inputs such as sash position sensors, air flow sensors, human presence sensors each has its own intelligence and communications capabilities in order to exist on a network with similarly intelligent and communication capable output devices such as intelligent dampers, intelligent VEnturi valves, intelligent actuators or intelligent sash closure devices such that complete process control actions can be implemented without the intervention or independent coordination of a 'controlling element' which occupies a superior position in networking or calculation. In this 'flat architecture' intelligent inputs and intelligent outputs act as peers in a non-hierarchial network and exchange sensed and controlling information in a configurable network which envisions single process loop control (such as a fume hood) and multiple process loop control (such as laboratories with multiple hoods) or arbitrarily configurable process loops to create 'virtual applications'.

In this approach, the elements of input and output have the means of calculation or communication resident on them and integral to them. This method using distributed elements necessary to a process application where those elements can share a non-hierarchial high speed network in which a single control loop including one or more input or output, or more than one control loop which incorporates inputs and/or outputs which may be simultaneously used by more than one loop or calculation or application, allows the global sharing of sensed elements and the fuller, faster implementation of final control actions. Other approaches envision inputs and outputs that are digital or analog which are connected to a hierarchically superior 'controller' which manages the inputs and outputs using their values as elements in calculations or electronics which determine final control actions. Subsequently, the 'controller' may communicate with other 'controllers' in a network of 'controllers' which may share sensed or calculated values in order to accomplish global control strategies. In that approach, the inputs and output have no inherent or integral intelligence or communications capabilities.

This new approach increases the speed of communications, improves access to shared inputs and values, and removes significant cost elements required in hierarchical networks or global control applications.

SUMMARY OF THE INVENTION

The present invention pertains to a system for directing air flow in a fume hood having a sash. The system comprises means or a mechanism for producing an output control signal corresponding to a desired flow of air through the sash of the fume hood. The producing mechanism comprises a producing CPU which actively produces the output control signal. The producing mechanism is to be disposed in fluid communication with the fume hood. The system also comprises means or a mechanism for controlling air flow through the sash of the fume hood corresponding to the output control signal. The controlling mechanism is connected to the producing mechanism to receive the output control signal. The controlling mechanism comprises a controlling CPU which actively produces a drive signal for operating the controlling mechanism corresponding to the output control signal.

The present invention pertains to a method for controlling air flow in a fume hood. The method comprises the steps of measuring air flow in a fume hood to identify a measured air flow. Then, there is the step of producing a communication network variable corresponding to a desired flow of air through the fume hood based on the measured air flow with a producing processor. Next, there is the step of transmitting the communication network variable over a network. Then, there is the step of receiving the communication network variable at a device with a controlling processor which controls air flow through the fume hood. Next, there is the step of controlling the air flow through the fume hood with the device based on the communication network variable which has been processed by the controlling processor.

The present invention pertains to a system for maintaining a desired relationship regarding air. The system comprises a first room. The system also comprises a second room separated from but connected to the first room by a wall with an interface through which air could pass when the interface is in an open state. The first room has means or a mechanism for producing a communication network variable corresponding to a desired condition of air in the first room so air will only flow from the second room into the first room. The first room also has means or a mechanism for controlling the condition of the air in the first room based on the communication network variable received from the producing means or mechanism. The system comprises a network to which the producing means or mechanism and the controlling means or mechanism are connected to communicate with each other.

BRIEF DESCRIPTION OF THE DRAWINGS

In the accompanying drawings, the preferred embodiment of the invention and preferred methods of practicing the invention are illustrated in which:

FIGS. 14b1, 14b2, and 14b3 show a schematic of the Space Pressure Sensor.

FIGS. 19a1, 19a2 and 19a3 are schematic representation of a temperature sensor.

FIGS. 24a1, 24a2 and 24a3 are schematic representation of a humidity sensor.

FIGS. 46a1, 46a2, and 46a3 are schematic representation of an Intelligent Actuator.

DESCRIPTION OF THE PREFERRED EMBODIMENT

Figure 1:
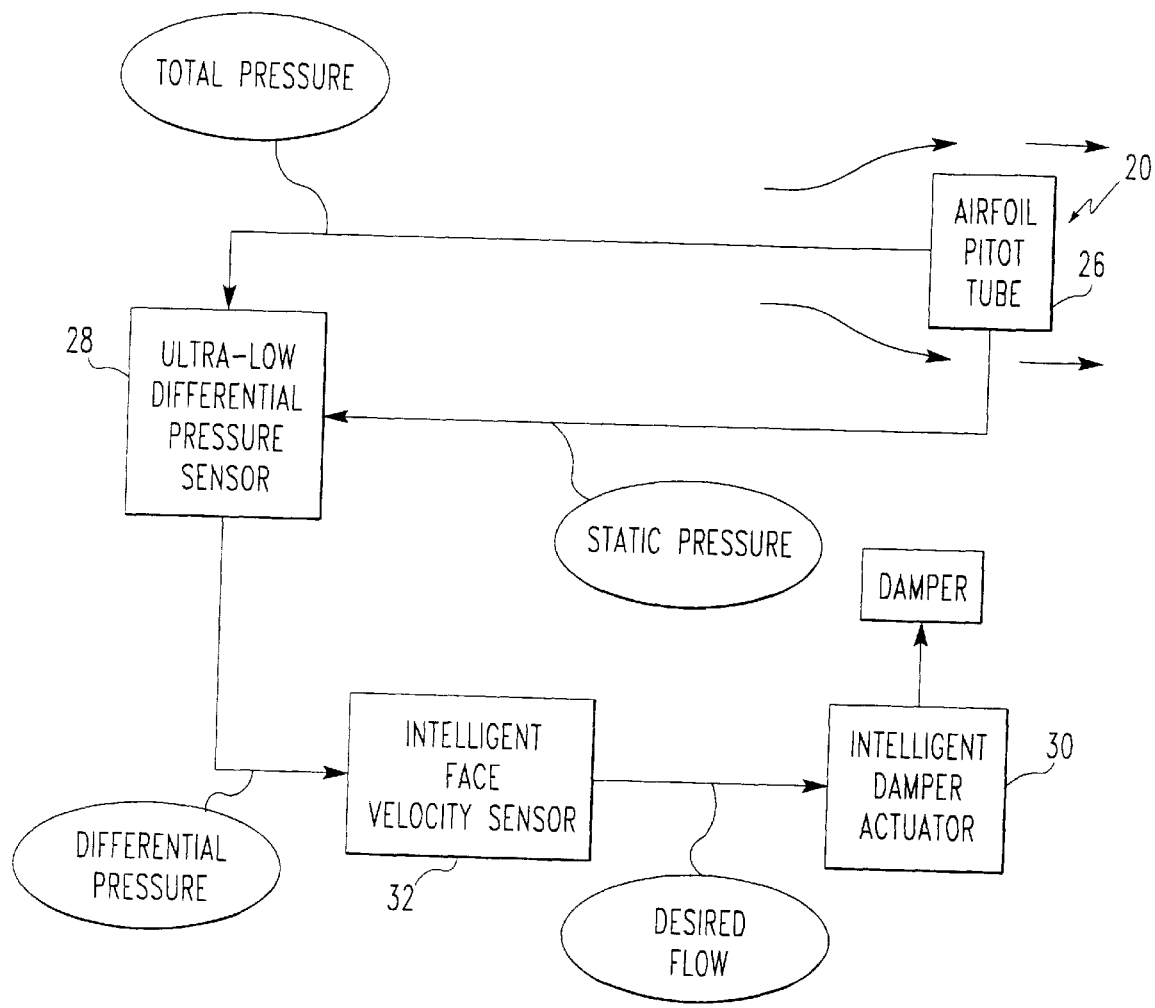
FIG. 1 is a schematic of an information flow diagram for a distributed architecture of intelligent non-hierarchical input and output devices.

Referring now to the drawings wherein like reference numerals refer to similar or identical parts throughout the several views, and more specifically to FIG. 1 thereof, there is shown a schematic representation of a system 10 for directing air flow in a fume hood 12 having a sash 14. The system 10 comprises means or a mechanism for producing an output control signal corresponding to a desired flow of air through the sash 14 of the fume hood 12. The producing means or mechanism 16 comprises a producing CPU 24 which actively produces the output control signal. The producing means or mechanism 16 is to be disposed in fluid communication with the fume hood 12. The system 10 also comprises means or a mechanism for controlling air flow through the sash 14 of the fume hood 12 corresponding to the output control signal. The controlling means or mechanism 18 is connected to the producing means or mechanism 16 to receive the output control signal. The controlling means or mechanism 18 comprises a controlling CPU 24 which actively produces a drive signal for operating the controlling means or mechanism 18 corresponding to the output control signal.

The producing means preferably comprises means or a mechanism for creating an air flow signal corresponding to the air flow through the fume hood 12. The air flow signal is provided to the producing CPU 24. The producing CPU 24 is connected to the creating means or mechanism 20. The creating means or mechanism 20 preferably comprises an air foil pitot 26 in contact with the fume hood 12 and in communication with the producing CPU 24. The air foil pitot 26 detects the air pressure in regard to the fume hood 12. See U.S. Pat. No. 5,415,583, incorporated by reference herein, for a full description of an air foil pitot and a fume hood. The air foil pitot 26 is in communication with the producing CPU 24. Besides an air foil pitot 26, other sensors which identify air flow through the fume hood 12 can be used. Examples of such sensors are sash 14 position sensors or flow sensors which produce a signal corresponding to the flow of air through the fume hood 12, as is well known in the art. Additionally, the creating means or mechanism 20 preferably comprises an ultra-low differential pressure sensor 28 connected to the air foil pitot 26 and the producing CPU 24 which creates the air flow signal.

The controlling means or mechanism 18 preferably comprises an actuator 30 in which the controlling CPU 24 is disposed and is operated by the drive signal. Moreover, the controlling means or mechanism 18 comprises a damper 34 connected to the actuator 30 which is operated by the actuator 30. The position of the damper 34 controls flow of air through a duct, as is well known in the art. Alternatively, a blower instead of a clamper can be used to control the flow of air through a duct connected to the fume hood.

Figure 4:
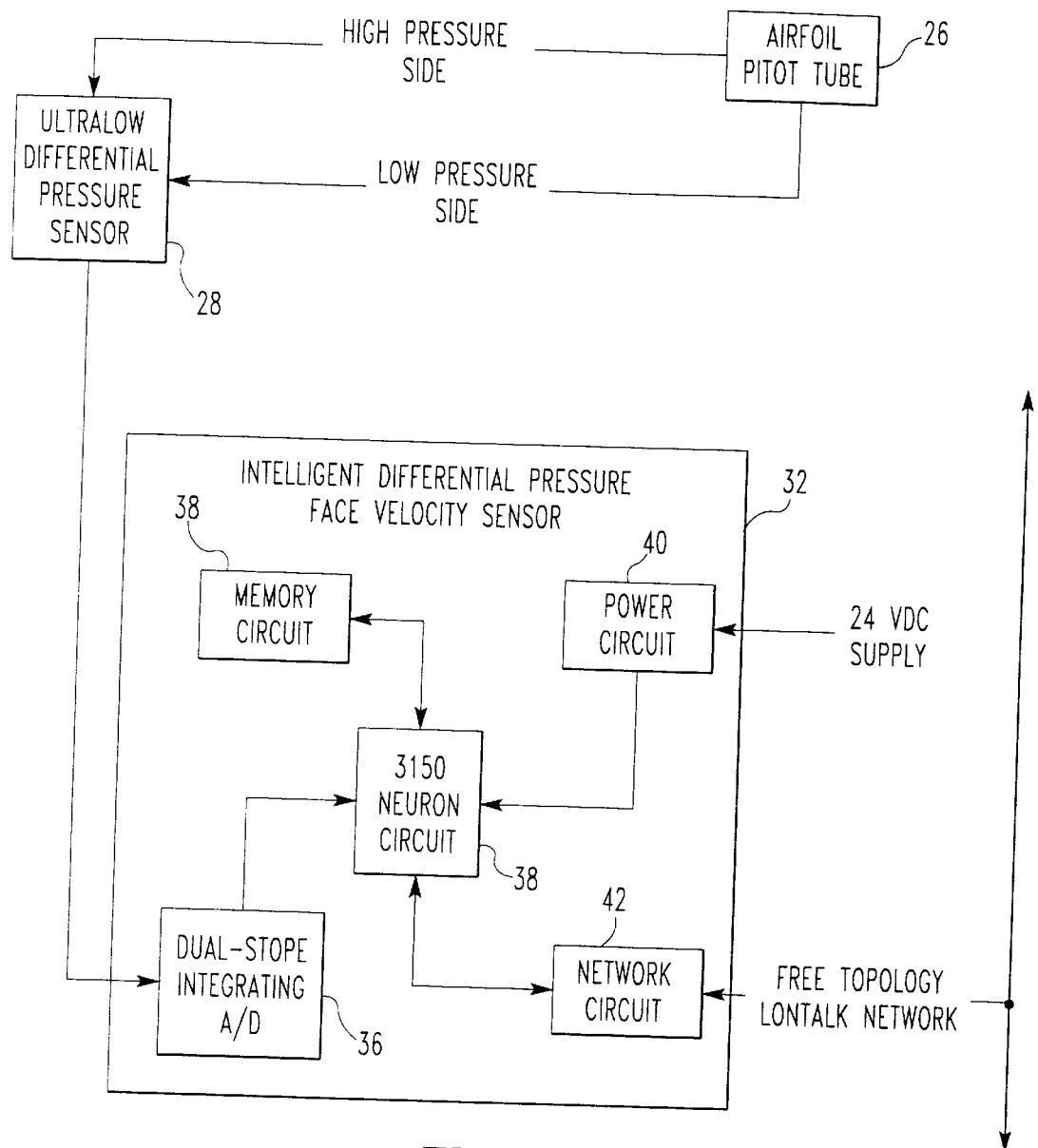
FIG. 4 is a schematic representation of the major components of a differential pressure face velocity sensor.
Figure 5:
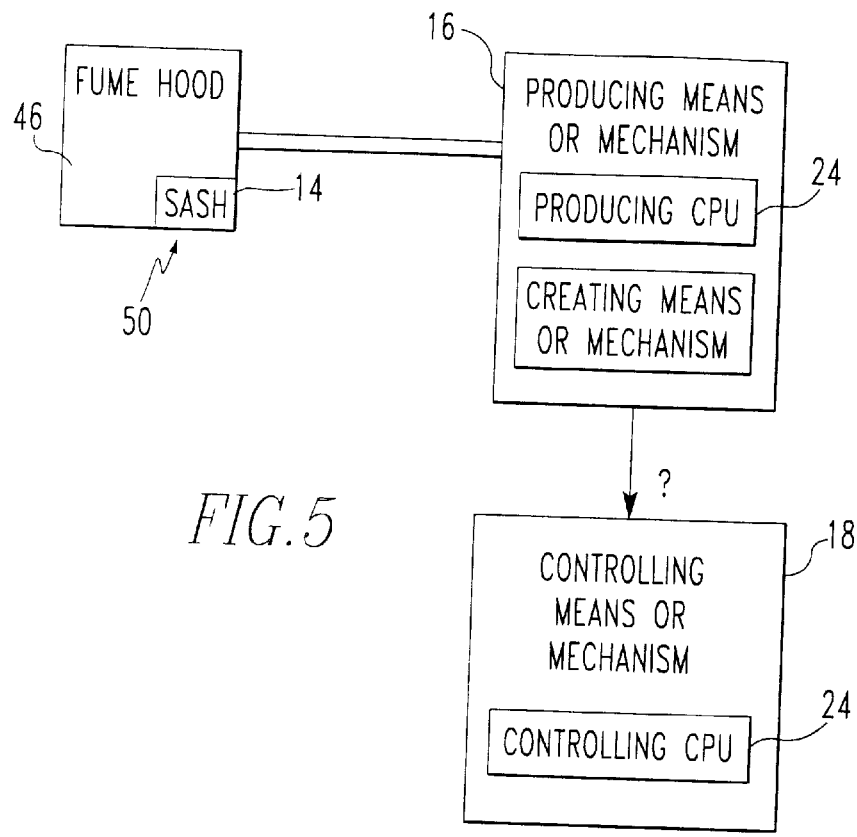
FIG. 5 is a schematic representation of a system of the present invention.

Referring to FIG. 4, the producing means or mechanism 16 preferably comprises a differential face velocity sensor 32. The producing CPU 24 is disposed in the producing means or mechanism 16. Preferably, the differential face velocity sensor 32 comprises a dual-slope integrating A/D converter 36 for converting analog signals to digital signals. Additionally, the differential face velocity sensor 32 comprises a neuron circuit 38 which produces a communication network variable which corresponds to a flow of air. The neuron circuit 38 is connected to the dual-slope integrating A/D converter 36. There is a memory circuit 38 for storing code which the neuron circuit 38 processes. The memory circuit 38 is connected to the neuron circuit 38. Moreover, the differential face velocity sensor 32 comprises a power circuit 40 for providing power to the neuron circuit 38 and is connected to the neuron circuit 38. Also, the differential face velocity sensor 32 comprises a network circuit 42 for communicating with a network and to provide the communication network variable to the network. The network circuit 42 is in connection with the neuron circuit 38.

The present invention pertains to a method for controlling air flow in a fume hood 12. The method comprises the steps of measuring air flow in a fume hood 12 to identify a measured air flow. Then, there is the step of producing a communication network variable corresponding to a desired flow of air through the fume hood 12 based on the measured air flow with a producing processor. Next, there is the step of transmitting the communication network variable over a network. Then, there is the step of receiving the communication network variable at a device with a controlling processor which controls air flow through the fume hood 12. Next, there is the step of controlling the air flow through the fume hood 12 with the device based on the communication network variable which has been processed by the controlling processor.

Figure 6:
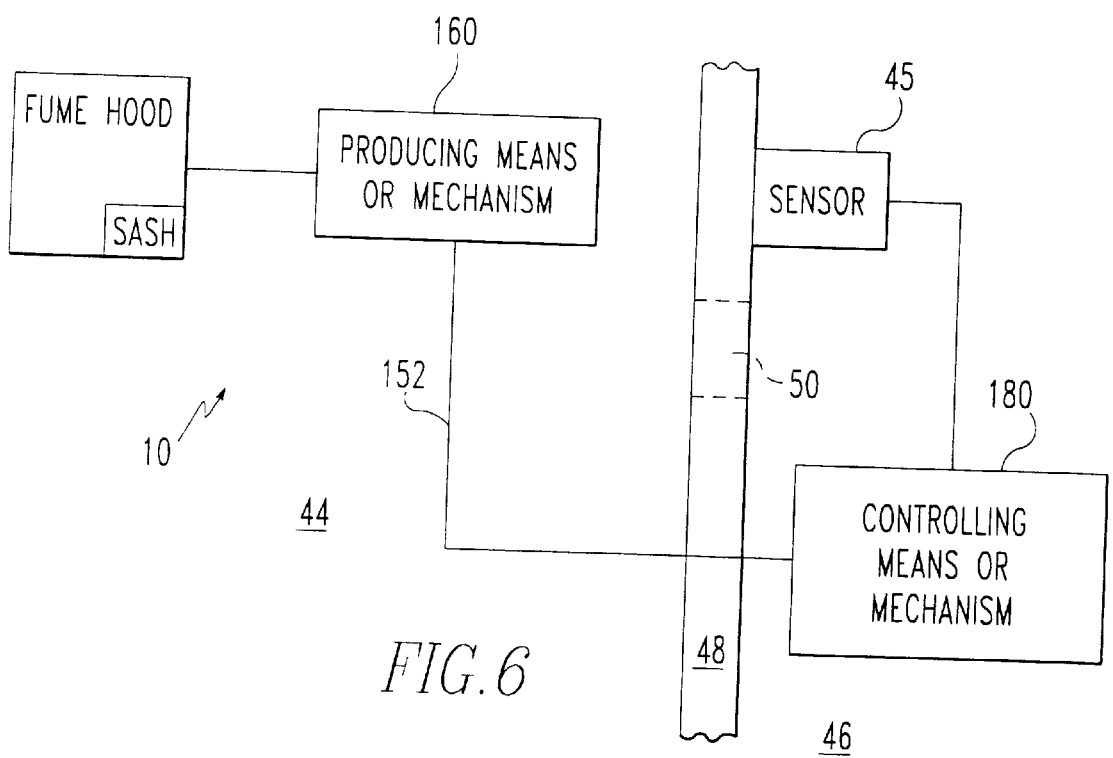
FIG. 6 is a schematic representation of a system of the present invention.

The present invention pertains to a system 10 for maintaining a desired relationship regarding air, as shown in FIG. 6. The system 10 comprises a first room 44. The system 10 also comprises a second room 46 separated from but connected to the first room 44 by a wall 48 with an interface 50 through which air could pass when the interface 50 is in an open state. The interface 50 can be a door, window or preferably a fume hood 12 sash 14. The first room 44 has means or a mechanism for producing a communication network variable corresponding to a desired condition of air in the first room 44 so, preferably, air will only flow from the second room 46 into the first room 44. The condition can be humidity, for instance, or preferably pressure. The first room 44 also has means or a mechanism for controlling the condition of the air in the first room 44 based on the communication network variable received from the producing means or mechanism 160. The system 10 comprises a network 52 to which the producing means or mechanism 160 and the controlling means or mechanism 180 are connected to communicate with each other. The system 10 can preferably also include a sensor 45, such as a pressure sensor in communication and preferably disposed in the second room. The sensor can be a pressure sensor connected to the controlling means or mechanism. The controlling means or mechanism can use the pressure of the second room as a reference and cause the pressure in the first room to be less than the pressure in the second room by controlling the flow of air through, for instance, a duct with a damper out of the second room. Alternatively, the controlling means or mechanism can use the sensor in the second room to make sure the pressure is always greater in the first room than the second room in the same manner as previously described.

In the operation of the invention, the Intelligent Differential Pressure Face Velocity Sensor calculates the face velocity at the sash. The face velocity sensor must be used with an ultra-low differential pressure transmitter, which is responsible for converting the high and low port pressures to a 4–20 mA analog signal. An example of the typical configuration used with the Face Velocity Sensor is shown in FIG. 1.

A 3150 Neuron Processor is the basis of the face velocity sensor. A dual-slope integrating converter converts the 4–20 mA analog differential pressure to a digital value. The converter interface software is simplified, since the Neuron Processor has a pre-defined software object for the dual-slope integrating converter. A program converts the differential pressure value to face velocity through a formula. Another program uses this face velocity and a PID loop to calculate a actuator response communication network variable. See the Appendix' for the application program which operates the face velocity sensor. See the Neuron C Reference Guide and the Neuron C Programmer's Guide, both of which are incorporated by reference herein, by Echelon Corp. 4015 Miranda Avenue, Palo Alto, Calif. 94304, for a complete explanation of the operation of the 3150 Neuron Processor, programming, networking, protocols, etc.

As FIG. 1 illustrates, there are 5 major components to the Intelligent Differential Pressure Face Velocity Sensor, the 3150 Neuron Processor Circuit, Memory Circuit, Power Circuit, Network Circuit, and the Dual-Slope Integrating A/D. Each of these components are discussed in the following sub-sections.

The 3150 Neuron Processor Circuit is composed of the 3150 Neuron Processor and support for the clock, service pin, and reset.

The 3150 Neuron Processor is the major component of the face velocity sensor. The 3150 Neuron Processor is composed of three separate logical units, the Media Access Control (MAC) Processor, Network Processor, and the Application Processor.

The MAC Processor handles layers one and two of the seven-layer network protocol stack. This includes driving the communications subsystem hardware as well as executing the collision avoidance algorithm. The MAC Processor works in conjunction with the Network Processor and they communicate using network buffers located in the onboard shared memory.

The Network Processor implements layers three through six of the network protocol stack. It handles communication network variable processing, addressing, transaction processing, authentication, background diagnostics, software timers, network management, and routing functions. The Network Processor works in conjunction with the Application Processor and they communicate using application buffers located in the onboard shared memory.

The Application Processor implements layer seven of the network protocol stack and executes the operating system and the application code. The operating system consists of a built-in multitasking scheduler which allows for parallel events.

The clock support is a simple circuit which provides a clock input to the 3150 Neuron Processor and the FTT-n0 Free Topology Transceiver. The clock support circuit consists of a 10 MHZ crystal, capacitors, and two resistor s. This circuit is recommended by the Echelon Corporation.

The service support is a circuit which provides an indicator of the service status and a means for generating a service request across the network. A service request is necessary for configuring the LONTalk network with an "off the self" network management tool. The service pin support consists of a LED, resistor, and a push button.

The reset circuit is a standard Low Voltage Indication (LVI) Circuit using a MC33164-5 LVI part, capacitor, and a 74AC00 NAND Logic Gate. The LVI provides a clean reset and under voltage protection to the Neuron Processor, Memory, and Network Transceiver. The NAND gate is used to prevent bus contention between the Neuron Processor and the Memory by delaying the reset signal to the memory.

The memory circuit is composed of a MCM606C 32K×8 SRAM part, a 29C257-120 64K×8 FLASH part, a 74AC00 NAND Logic Gate, and a 74AC32 AND Logic Gate. The SRAM provides additional RAM to the Neuron Processor and it is mapped into memory at 0xDFFF to 0x8000. The FLASH provides code space for the Application and System Images. The application image is the user program and any additional standard Neuron Processor library functions and is executed by the Application Processor. The System image is the code which is executed by the MAC and Network Processors. The Logic Gates provide the logic used to decode the memory space, control the select lines, and control the output enables.

The Power Circuit is composed of a LM2574M-5V Switching Regulator, capacitors, a Zener Diode, a Diode, and an Inductor. This circuit is a common power supply circuit.

The Network Circuit is composed of a FTT-10 Free Topology Transceiver, capacitors, and surge protectors.

The Dual-Slope Integrating A/D is composed of OP Amps, resistors, capacitors, and an CD4016 Analog Switch. This circuit is recommended by the Echelon Corporation for supporting the Dual-Slope Integrating A/D object.

Figure 2:
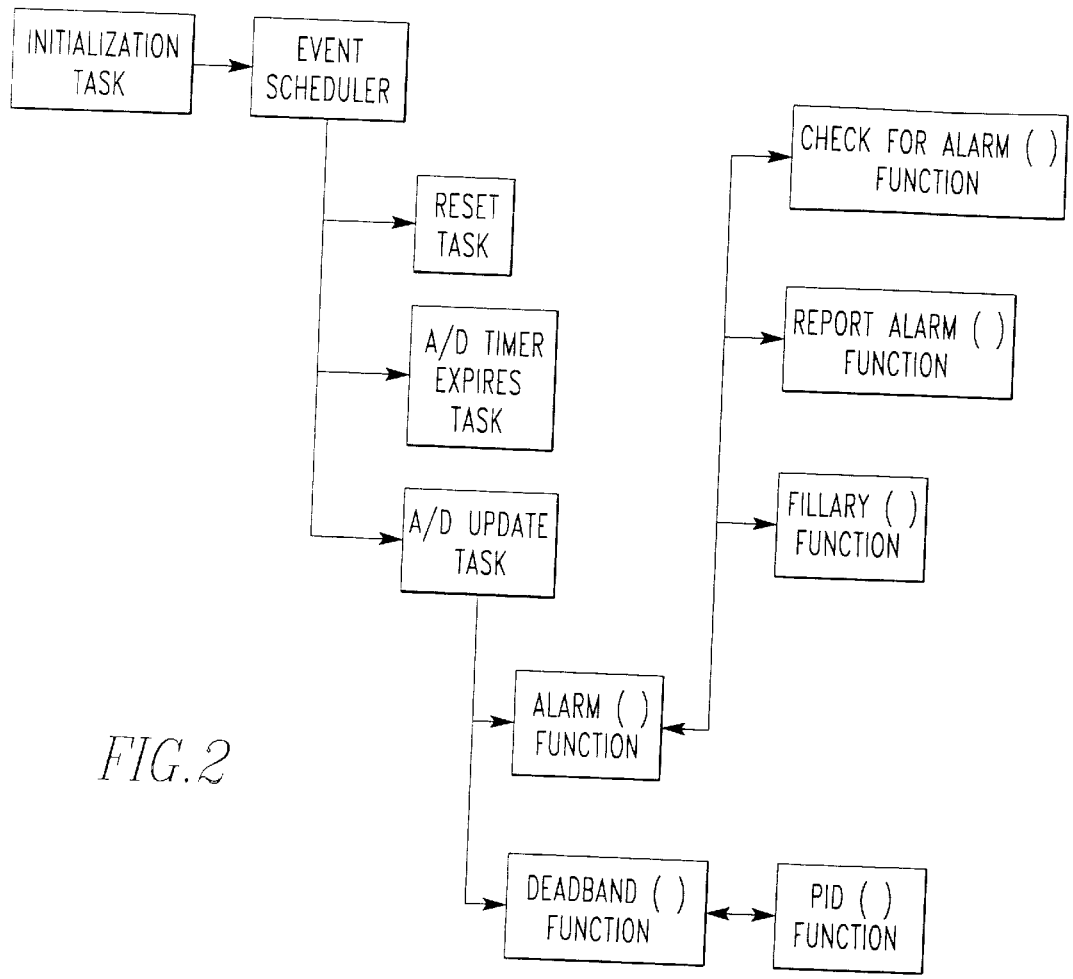
FIG. 2 is a schematic representation of the major software components of face velocity sensor.

The 3150 Neuron simplifies software development, since many device drivers are pre-written as I/O objects. FIG. 2 illustrates the major components of the application program for the Face Velocity Sensor.

The Initialization Task is automatically run after the Face Velocity Sensor is reset or powered on. The Initialization Task allocates memory and sets default values for Communication Network Variables, Input/Output Objects, Timer Objects, Global Variables, Network Buffers, and Application Buffers. After the Initialization Task executes it passes control over to the event scheduler.

Communication network variables are similar to Global Variables in 'C', but Communication network variables can be sent or received by other LONWorks controllers on the LONTalk network. The Neuron Processor takes care of sending and receiving communication network variables, but a Network Configuration Tool is necessary to link communication network variables between controllers. There are two basic type of communication network variables, input and output. Input communication network variables receive their values from other controllers on the network. Output communication network variables send their values to other controllers on the network.

The Face Velocity Sensor has the following system communication network variables:

| Name | Direction | Type | Description |
|---|---|---|---|
| nviDateTime | input | SNVT_time_stamp | System Date and Time |
| nvoAlarmStatus | output | SNVT_alarm | Face Velocity Alarm Status |
| nviEmergency | input | SNVT_switch | Emergency Status |
| nviEmerPosition | output | SNVT_lev_cont_f | Damper Emergency Position |
| nviName | input | SNVT_str_asc | Controller Name |

The nviDateTime communication network variable is used for receiving the current date and time. The Face Velocity Sensor does not have a real time clock, so it is dependent on another controller to broadcast the date and time on the network. The face velocity sensor uses the date and time to time stamp face velocity alarms.

The nviAlarmStatus communication network variable is used for reporting the high and low face velocity alarms. The alarm status is very robust and it includes a date and time stamp when the alarm occurred, the face velocity value, the alarm limit, type of the alarm (high limit, high limit return, low limit, low limit return, no alarm condition), and the name of the controller.

The nviEmergency and nviEmerPosition communication network variables are used to control the damper actuator when there is an emergency condition is broadcast on the network. The nviEmergency variable receives the emergency status. When there is an emergency, nviEmerPosition is the position for the PID loop's output.

The nviName communication network variable is the name of the controller and its default is "Hood_1".

The Face Velocity Sensor has the following communication network variables for converting the raw voltage representing the differential pressure to a face velocity in engineering units:

| Name | Direction | Type | Description |
| --- | --- | --- | --- |
| nviFVReadRate | input | SNVT_count | Update Rate for A/D Converter |
| nviDPLowScale | input | SNVT_speed_f | Low Scaling Value for Diff. Pressure |
| nviDPHighScale | input | SNVT_speed_f | High Scaling Value for Diff. Pressure |
| nviFVLowLimit | input | SNVT_speed_f | Face Velocity Low Alarm Limit |
| nviFVHighLimit | input | SNVT_speed_f | Face Velocity High Alarm Limit |
| nvoFaceVelocity | output | SNVT_speed_f | Face Velocity Value |

The nviFVReadRate communication network variable is the scan rate for the A/D converter. The scan rate should never be less than 20 which is 20 milliseconds. The scan rate has the units of milliseconds.

The nviDPLowScale and nviDPHighScale communication network variables are the high and low scaling values for converting the raw counts (0 to 65535) to a differential pressure. The Face Velocity sensor is assuming a 0 to 5 Volt linear differential pressure transmitter. If a different differential pressure transmitter wants to be used, the LOW_COUNTS and HIGH_COUNTS defines in the application code must be changed. The LOW_COUNTS (0) define corresponds to the low scaling value and the HIGH_COUNTS (65535) corresponds to the high scaling value. The differential pressure is calculated from the raw counts using the following equation:

$$\text{Differential Pressure} = \frac{(\text{Raw Counts} - \text{LOW\_COUNTS}) \times (nviDPHighScale - nviDPLowScale)}{(\text{HIGH\_COUNTS} - \text{LOW\_COUNTS})} + nviDPLowScale$$

The nviFVLowLimit and nviFVHighLimit communication network variables define the face velocity's low and high alarm limits, respectively. When the face velocity is below the low alarm limit, a low limit alarm is generated. When the face velocity returns to a value above the low alarm limit, a low limit return is generated. When the face velocity is above the high alarm limit, a high limit alarm is generated. When the face velocity returns to a value below the high alarm limit, a high limit return is generated.

The nvoFaceVelocity communication network variable is the alculated face velocity. The face velocity is calculated from the differential pressure using the following equation:

$$nvoFaceVelocity = 4.037\sqrt{\text{Differential Pressure}}$$

The Face Velocity Sensor has a built in PID control routine which has the following communication network variables for controlling the damper actuator:

| Name | Direction | Type | Description |
| --- | --- | --- | --- |
| nviPIDSetpoint | input | SNVT_speed_f | Control Setpoint |
| nviPIDProp | input | SNVT_lev_cont_f | Proportional Gain |
| nviPIDIntegral | input | SNVT_lev_cont_f | Integral Gain |
| nviPIDDerivative | input | SNVT_lev_cont_f | Derivative Gain |
| nviPIDDeadband | input | SNVT_speed_f | Deadband |
| nviPIDSign | input | SNVT_count_inc | Control Sign (+1 = Forward, −1 = Reverse) |
| nviPIDEnable | input | SNVT_switch | PID Loop Enable |
| nvoPIDOut | output | SNVT_lev_cont_f | Output from PID Loop (0 to 100%) |

The nviPIDSetpoint communication network variable is the control setpoint for the PID loop. The PID loop controls the face velocity through the nvoPIDOut communication network variable. The PID loop's output is broadcast on the network and the damper actuator controller receives this value and uses it to modulate its damper. The PID output is a percentage from 0 to 100%.

The nviPIDEnable communication network variable is used for disabling and enabling PID control. The nviPIDSign communication network variable controls if the PID loop is forward or reverse acting. The control sign is an integer value and it can have a value of −1 or +1. The control sign's default is +1, forward acting.

The nviPIDDeadband communication network variable helps to eliminate toggling the damper actuator when the face velocity is around the setpoint. When the face velocity is within the deadband around the setpoint, the PID loop does not change its output. Doing this helps to reduce wear on the damper actuator.

The nviPIDProp communication network variable is the proportional gain for the PID control loop.

The nviPIDIntegral communication network variable is the integral gain for the PID control loop.

The nviPIDDerivative communication network variable is the derivative gain for the PID control loop.

The Neuron processor has built-in Input/Output objects which simplify the development of controllers since the device drivers are pre-written. The Face Velocity sensor is using a dual slope A/D converter I/O object called ADCONVERTOR. This A/D converter performs measurements with 16-bits of resolution for as little as a 13 ms integration period. The ADCONVERTOR requires a millisecond timer to provide continuous A/D conversion.

The ConvertTimer millisecond timer object is provided for continuous reading of the A/D converter at the rate determined by the communication network variable nviFVReadRate.

The face velocity sensor defines the following constants:

| Name | Type | Description |
| --- | --- | --- |
| LOW_COUNTS | unsigned long | Raw counts which correspond to the low scaling value |
| HIGH_COUNTS | unsigned long | Raw counts which correspond to the high scaling value |
| CONTROL_VALUE | unsigned long | Integrating period for the dual slope A/D converter |

The face velocity sensor uses the following global variables:

| Name | Type | Description |
| --- | --- | --- |
| nviPIDSetpoint | SNVT_speed_f | Control Setpoint |
| RawCounts | unsigned long | Differential pressure in raw unscaled counts |
| DiffPressure | float_type | Calculated differential pressure |
| Error | float_type | PID Error (Setpoint − Face Velocity) |
| PrevError | float_type | PID Error from the previous PID loop's calculation |
| PPart | float_type | Proportional component of the PID loop's output |
| IPart | float_type | Integral component of the PID loop's output |
| DPart | float_type | Differential component of the PID loop's output |
| AIR_COEF | float_type | Coefficient of Air for face velocity calculation |
| PID_MAX_OUT | float_type | PID loop's maximum output in percent |
| PID_MIN_OUT | float_type | PID loop's minimum output in percent |
| ZERO | float_type | Zero in represented as a floating point number |

The Event Scheduler allocates processor time to the application tasks. The Event Scheduler decides when it is time to run a task, and the higher priority tasks run first such as the Reset Task. The Event Scheduler passes control to a task and the completed task relinquishes control to the Event Scheduler. The Event Scheduler is responsible for updating the Watchdog timer.

The Reset Task is responsible for setting up the variables and I/O objects to a know state. The timer object ConvertTimer is set to the communication network variable nviFVReadRate. This causes the A/D I/O object, ADCONVERTOR to be updated at the desired rate. Neuron C does not support floating point numbers. All floating point calculations are accomplished by using Echelon's floating point library. The global variables AIR_COEF, PID_MAX_OUT, PID_MIN_OUT, and ZERO are really used as defined constants and the Reset Task must initialize them to their proper values.

The timer object ConvertTimer is a repeating timer which expires at the set nviFVReadRate. The A/D Timer Expires Task is responsible for starting the A/D conversion by writing the CONTROL_VALUE constant to ADCONVERTOR I/O Object.

The A/D Update Task occurs when the A/D converter has completed its conversion of the unscaled differential pressure. This raw value must be converted to differential pressure that has engineering unit using the following formula:

$$\text{Differential Pressure} = \frac{(\text{Raw Counts} - \text{LOW\_COUNTS}) \times (nviDPHighScale - nviDPLowScale)}{(\text{HIGH\_COUNTS} - \text{LOW\_COUNTS})} + nviDPLowScale$$

The face velocity must be calculated using the differential pressure. The following formula is used:

$$\text{nvoFaceVelocity} = 4.037\sqrt{\text{Differential Pressure}}$$

After calculating the face velocity, it is checking to make sure it is within the alarm limits. This alarm checking is done by the function Alarm( ). If there is a face velocity alarm condition, it is reported by the communication network variable nvoAlarmStatus. If the communication network variable nviEmergency indicates that there is an emergency condition, the PID loop's output is driven to the emergency position indicated by the communication network variable nviEmerPosition. If there is no emergency condition and the PID loop is enabled by the communication network variable nviPIDEnable, the face velocity sensor will control the damper actuator through the function PID( ). The PID loop's, setpoint, deadband, gains, and control sign are all controllable through their respective communication network variables. The PID loop's output is broadcast by the communication network variable nvoPIDOut.

The Neuron Processor has tasks that are handled by the Event Scheduler. These task are event based. To complement and provide more modularity, tasks can call functions. Functions resemble tasks, but they must be invoked by a task or another function and not the Event Scheduler. The face velocity sensor has the following functions:

| Function | Description |
| --- | --- |
| Alarm( ) | Checks and reports face velocity alarms |
| CheckForAlarm( ) | Looks for face velocity alarms |
| ReportAlarm( ) | Reports alarm conditions |
| PID( ) | Performs PID control |
| DeadBand( ) | Determines if the face velocity is within the deadband around the setpoint |
| FillArray( ) | Copies a SNVT_speed_f type value to an array of four unsigned integers |

| Alarm( ) Function | |
| --- | --- |
| void Alarm( ) | |
| Remarks: | The Alarm( ) function reports alarm and return from alarm conditions. This function uses the high and low alarm limit communication network |

-continued

|  |  |
|---|---|
|  | variables, nviFVLowLimit and nviFVHighLimit. Alarms are reported through the nvoAlarmStatus communication network variable. |
| Return Value(s): | None |
| CheckForAlarm( ) Function | |
| int | CheckForAlarm( ) |
| Remarks: | The CheckForAlarm( ) function checks the face velocity communication network variable, nvoFaceVelocity against the high and low alarm limit communication network variables, nviFVLowLimit and nviFVHighLimit. |
| Return Value(s): | HIGH_LIMIT_ALARM if the face velocity is above the high alarm limit. LOW_LIMIT_ALARM if the face velocity is below the low alarm limit. NO_ALARM if the face velocity is between the high and low alarm limits. |
| ReportAlarm( ) Function | |
| void ReportAlarm( | unsigned long ObjectID<br>alarm_type_t AlarmType<br>priority_level_t PriorityLevel<br>unsigned long IndexToSNVT<br>unsigned Value[4]<br>unsigned AlarmLimit [4]) |
| ObjectID | Face velocity sensor object number |
| AlarmType | Type of alarm |
| PriorityLevel | Priority Level for this alarm |
| IndexToSNVT | Standard Communication Network Variable Type |
| Index for | alarm value and limit |
| Value[4] | Value which caused the alarm |
| AlarmLimit[4] | Alarm limit |
| Remarks: | The ReportAlarm( ) function takes the passed parameters and fills in the alarm status communication network variable, nvoAlarmStatus. Along with the passed parameters, this function fills in the date and time and the face velocity sensor's name. |
| Return Value(s): | None |
| PID( ) Function | |
| void | PID( ) |
| Remarks: | The PID( ) function uses a PID algorithm to control the face velocity by modulating the PID loop's output. The output from the PID loop is broadcast as a control signal to the damper actuator controller. The loop must be enabled by setting the PID loop enable to "ON". If the PID loop enable is "OFF" the PID loop's output is not updated. If the face velocity is within the deadband around the setpoint, no control action is taken and the loop's output is not changed. The PID loop can be selected to operate one of two ways, forward acting or reverse acting, by the control sign. The control sign is configurable through the nviPIDSign communication network variable. When the PID loop is controlling, its output is a summation of the Proportion, Integral, and Derivative components. The Proportional component is calculated by the following formula: Ppart = Error * nviPIDProp The Integral component is calculated by the following formula: Ipart = Ipart + (nviPIDIntegral * Error) The Derivative component is calculated by the following formula: Dpart = (Error − Previous Error) * nviPIDDerivative The PID Loops output is broadcast to other damper actuator controllers on the network though the nviPIDOut communication network variable. Most of the time, the PID loop's output is just a summation of the all three components, Proportional, Integral, and Derivative. But, the control loop can suffer from anti-windup reset. Anti-windup reset is an over accumulation of the Integral component, since the integral component is used in its own formula. To combat this, a special check is made to ensure that the PID loop's output is clamped to the minimum or maximum output value. If the PID loop's output value is outside these limits, the Integral component is adjusted so that the total of all components equals the maximum or minimum output values. The PID loop's output is calculated by the following formulas: nvoPIDOut = Ppart + Ipart + Dpart if nvoPIDOut > PID_MAX_OUT then IPart = IPart + PID_MAX_OUT − nvoPIDOut nvoPIDout = PID_MAX_OUT else if nvoPIDOut < PID_MIN_OUT then IPart = IPart + PID_MIN_OUT − nvoPIDOut nvoPIDout = PID_MIN_OUT |
| Return Value(s): | None |
| DeadBand( ) Function | |
| boolean | DeadBand( ) |
| Remarks: | The DeadBand function determines if the face velocity is within the deadband around the setpoint. The deadband is defined by the nviPIDDeadband communication network variable. |
| Return Value(s): | TRUE, the face velocity is outside the deadband<br>FALSE, the face velocity is inside the deadband |
| FillArray( ) Function | |
| void | FillArray( SNVT_speed_f * value_f,<br>unsigned int * value) |
| value_f | Pointer to the speed variable which is a floating point number to be copied. |
| value | Pointer to the unsigned four byte array to be filled by the floating point number. |
| Remarks: | The FillArray( ) function copies a variable which is defined as a floating point speed into a four byte unsigned array. |
| Return Value(s): | None |

The Air Pitot Tube is placed in the moving air stream, usually mounted under the fume hood's bypass airfoil. The bypass airfoil is a metal plate which directs the airflow across the fume hood's work surface. The Airfoil Pitot Tube provides two different pressure components, total pressure and static pressure. The static pressure is the pressure which impacts all surfaces of the probe. The total pressure is the combination of the impact pressure of the airstream hitting the part of the probe facing into the airstream and the static pressure. The total pressure is measured by the sensing ports parallel to airstream and the static pressure is measured by the sensing ports perpendicular to the airstream. These two pressures are transmitted to an ultra-low differential pressure transmitter through pneumatic air lines.

The two pressures, total and static are transmitted from the Airfoil Pitot Tube to the ultra-low differential pressure transmitter. The pressure transmitter subtracts the static pressure from the total pressure to produce a differential pressure. This differential pressure is actually the velocity pressure, which is proportional to the face velocity by the following equation:

$$\text{Face Velocity} = 4.037 \sqrt{\text{Velocity Pressure}}$$

The velocity pressure is in the units millimeters of water and the face velocity is in the units meters per second. The differential pressure transmitted converts the differential pressure to a linear analog signal 0 to 5 Volt signal. A 250 Ohm resistor can be used with pressure transmitters whose output is 4 to 20 mA. This voltage signal is transmitter through signal wire to the A/D Converter's terminals on the face velocity sensor.

The analog velocity pressure signal is received by the Dual-Slope Integrating A/D circuit. This circuit performs A/D measurements with 16 bits of resolution at a sample rate of 13 ms. Control of this A/D converter is quite simple, because the Dual Slope A/D Converter I/O object is provided by the Neuron Circuit. This A/D converter is discussed in detail in the Neuron C Reference Guide mentioned above. The A/D Timer Expires Task and the A/D Update Task in the application program handles the A/D conversion. The A/D Update Task reads the raw count velocity pressure and converts it to a floating point number. The scaling values are adjustable through the network to provide flexibility with choosing the differential pressure transmitters. The following formula is used to convert the velocity pressure's raw count value to floating point value with engineering units.

$$\text{Velocity Pressure} = \frac{(\text{Raw Counts} - \text{LOW\_COUNTS}) \times (nviDPHighScale - nviDPLowScale)}{(\text{HIGH\_COUNTS} - \text{LOW\_COUNTS})} + nviDPLowScale$$

The communication network variables and defines are discussed in the Differential Pressure Face Velocity Sensor's design document, Hardware and Software Design.

The A/D Update Task uses the differential pressure value to calculate the face velocity by using the following equation:

The Alarm( ) function is called by the A/D Update Task to perform face velocity alarming. This function will broadcast high limit, high limit return, low limit, and low limit return alarms. The face velocity low and high limit alarm values are programmable through the network.

The face velocity sensor is capable of receiving emergency broadcasts on the network. This operation is done in the A/D Update Task The sensor has no provisions for detecting emergency conditions itself. If there is an emergency condition, the PID control loop will be suspended, and the emergency position value will be the PID loop's output. The emergency position value is programmable through the network.

The calculated face velocity is used by the PID( ) function to control the damper actuator. This function is invoked by the A/D Update Task. PID loop control can be disabled through the network. The PID loop uses Proportional, Integral, and Derivative Control to modulate its output. The gains associated with the PID loop are programmable through the network. To help alleviate oscillation around the setpoint, there is a deadband. If the face velocity is with the deadband around the setpoint, the PID loops output remains the same. If the face velocity is outside the deadband, the PID loop calculates the output. To prevent the integral component from becoming too large, there is anti-wind up reset protection. This protection clamps the integral value when all of the components add up to more than 100% or less than 0%. The output from the PID loop is broadcast on the network for the damper actuator controller to receive. The following equations are used for PID control:

Error=Setpoint−Face Velocity

Proportional Component=Error*Proportional Gain

Integral Component=Integral Component+(Integral Gain*Error)

Derivative Component=(Error−Previous Error)*Derivative Component

PID Output=Proportion Component+Integral Component+Derivative Component

Figure 3A:
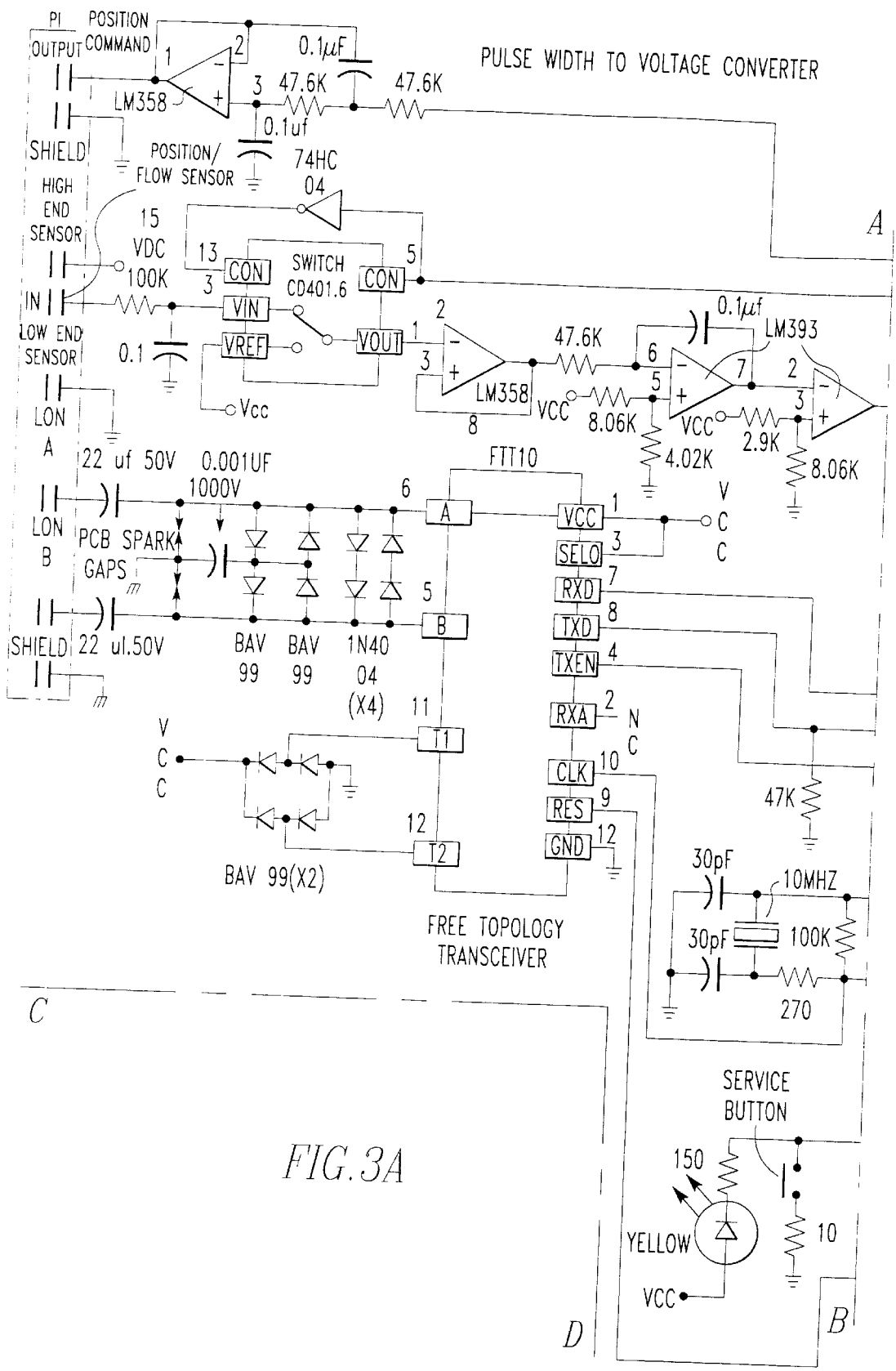
FIGS. 3a, 3b and 3c are schematic representations of the circuit for the intelligent actuator.
Figure 3B:
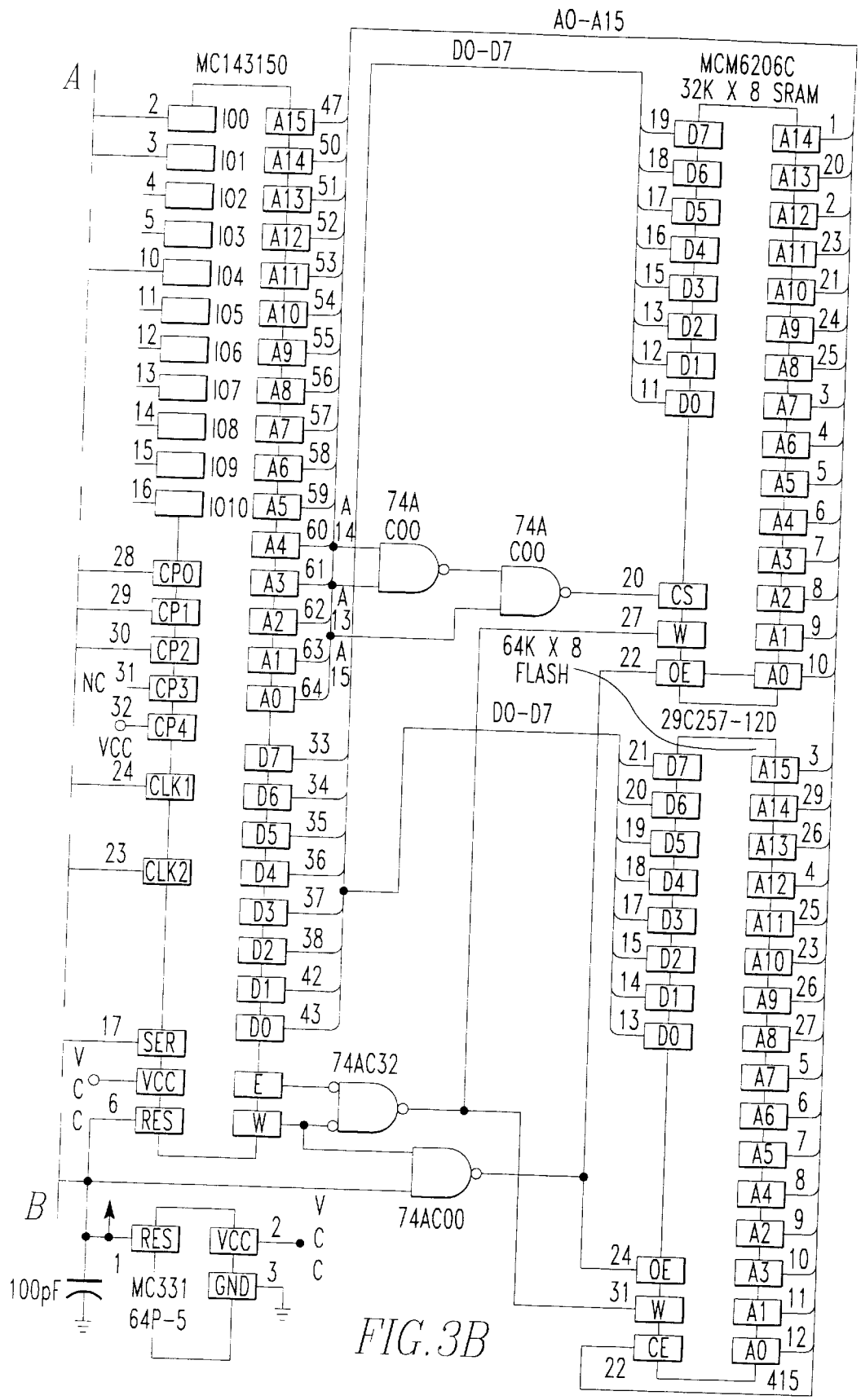
Figure 3C:
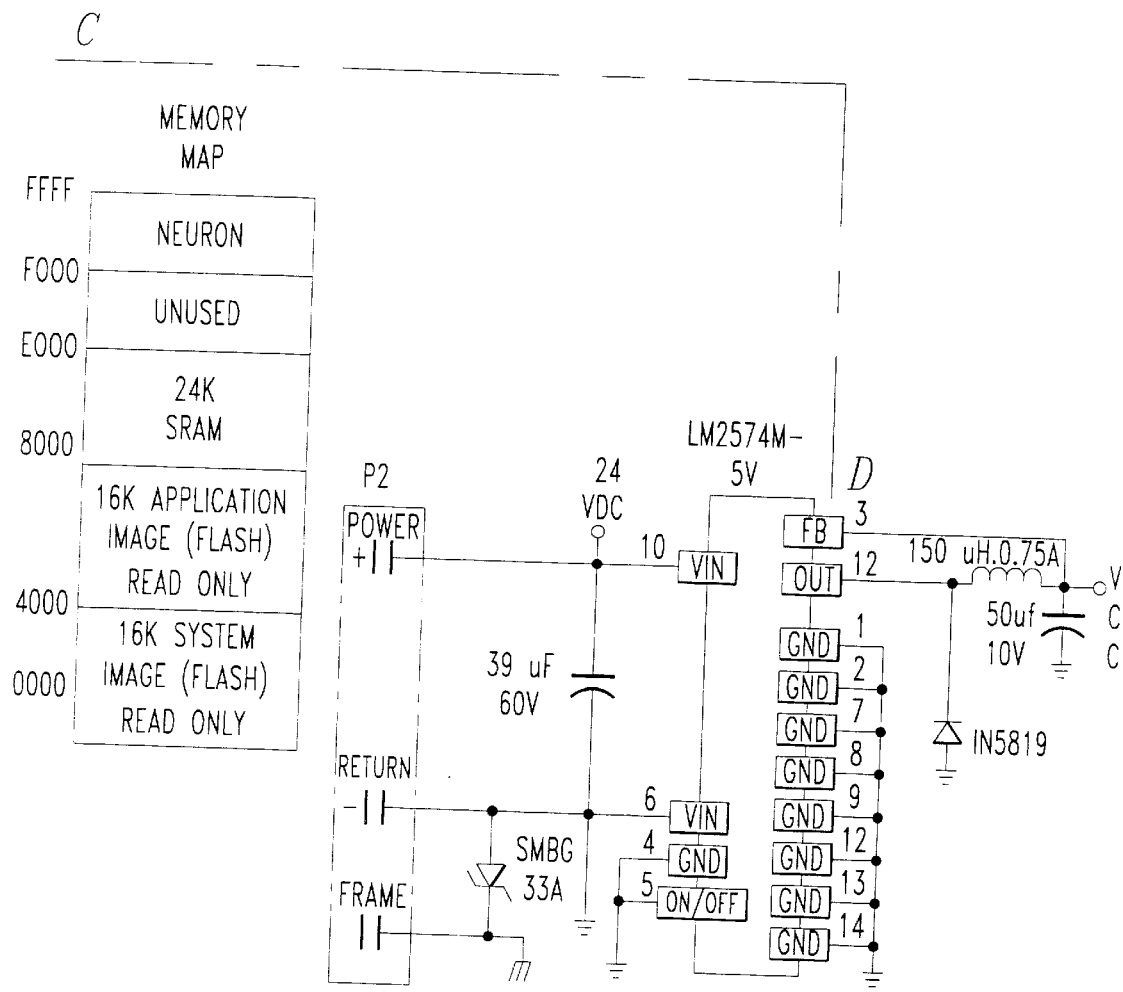

Referring to FIG. 3, the intelligent actuator comprises the same essential circuitry as the differential airflow transducer with the exception of using the dual-slope input object to measuring actuator position feedback via a potentiometer (if needed), and the generation of a pulse-width (duty-cycle) modulated wave via a pulse-width output object which is filtered to produce an analog voltage which is a position command to the actuator. The actuator and the damper are standard, whose operation is well known, once the actuator receives the analog voltage.

Note that the analog voltage does not have to be precise, just monotonic, if feedback is used. The analog voltage actuator command could just as well be replaced by a 2 bit up and down command to directional power switches which could control the actuator motor directly, again relying on the feedback for actual position control. Additionally, the analog input used for feedback could be replaced with the quadrature-detect input object used in conjunction with an optical (or mechanical) encoder to determine position (if needed). With this encoder, not only position but velocity as well can be inferred for minimal overshoot within the intelligent actuator via its own PI (D with voltage command) loop and an inner velocity loop for top speed (slew rate) regulation.

The PID loop in the differential pressure sensor bound to the actuator modifies the communication network variable for desired airflow (consistent with closed loop control) to achieve the desired airflow through the airflow vent (sash) regardless of actuator position error anyway.

During operation, the intelligent actuator receives the desired position communication network variable that is bound to this neuron and produces an output command which is a function of its known response transfer function of the attached damper. This command is the interpolation of the command value as a function of the minimum and maximum of the dampers' position, possibly modified by the use of a lookup table. Verification of the position is read back via either the dual-slope object or the quadrature object, if needed.

The communications described above using communication network variables between the intelligent actuator for the damper and the intelligent differential pressure face velocity sensor based on the Neuron C Reference Guide and the Neuron C Programmer's Guide, as identified above, can be used for all the following intelligent devices discussed to operate them all, together, in twos or in any configuration.

The system can also include an intelligent occupancy monitor. The main purpose of the intelligent occupancy monitor is to detect when an operator has left an area unattended. This is desirable because certain actions can be taken to reduce energy costs if an operator is not present. The occupancy monitor only reports the current area's occupancy status and does not take any controlling actions.

The occupancy monitor can accept input from many types of attendance sensors, such as infrared motion detectors and static mats. The occupancy monitor uses the occupancy sensor to calculate if the space is unoccupied. The occupancy monitor signals the occupancy status on the LonTalk network through a communication network variable. Other intelligent products can receive the occupancy status by binding to the occupancy status communication network variable.

The intelligent occupancy monitor is commonly used in conjunction with the Intelligent Sash Driver. The sash driver closes a fume hood's sash when the hood is left unattended, to reduce the amount of conditioned air being exhausted.

Figure 7:
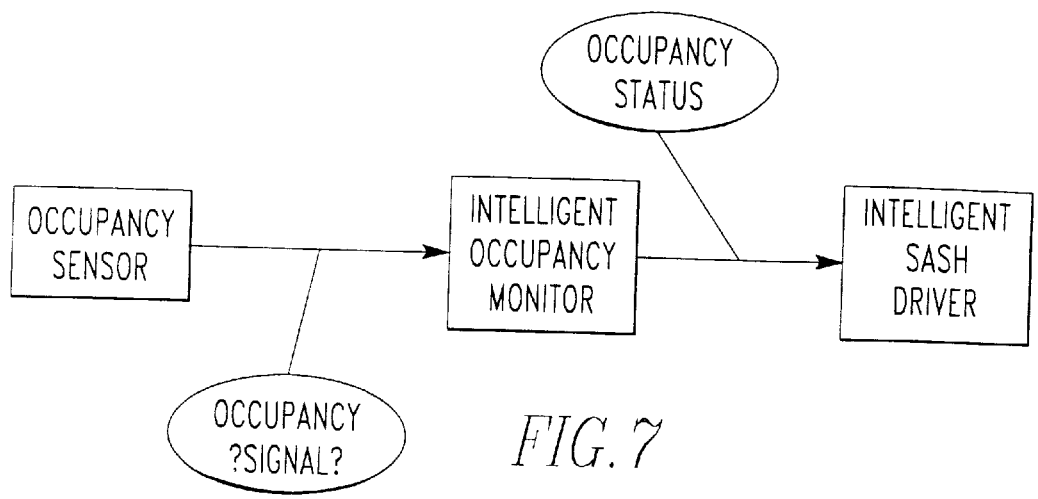
FIG. 7 is an Information Flow Diagram for the Intelligent Occupancy Monitor.

The occupancy monitor is just one component which can be incorporated into a fume hood, laboratory, or clean room control strategy. FIG. 7 displays the major components of a common system and their flow of information.

Figure 8:
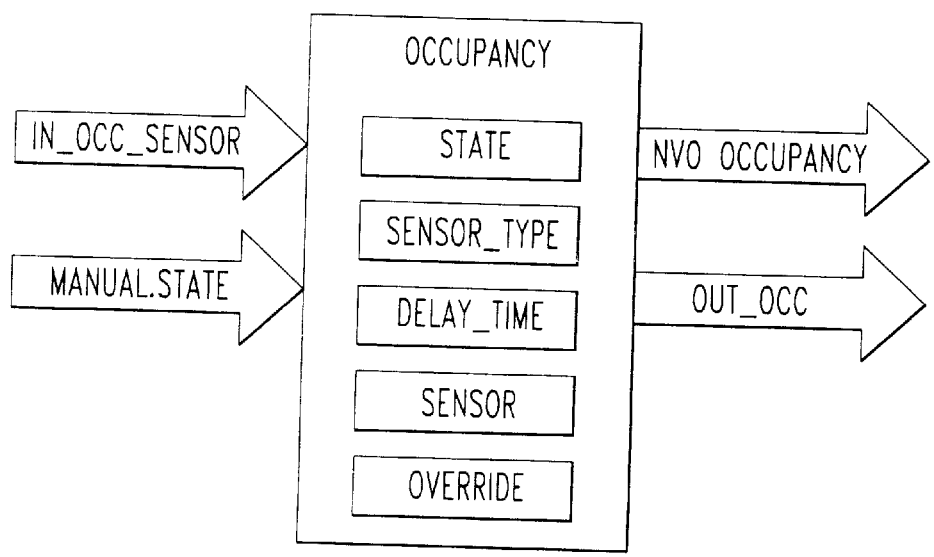
FIG. 8 is shows the Occupancy Object's Inputs, Outputs, and Properties.

The occupancy software object is used for determining the occupancy state. It contains properties which are used for computing the occupancy state. These properties are a combination of configuration and calculated variables. FIG. 8 shows the properties, inputs, and outputs for the Occupancy object.

The operator's presence is detected by an external device called an attendance sensor. This usually is a motion detector. The attendance sensor has contacts which are used for signaling the attendance status. The attendance sensor's contacts are wired to the attendance sensor's input and a common terminal on the occupancy monitor. The attendance sensor's input is connected through hardware to the occupancy IO pin on the neuron processor. This IO pin is logically connected to the sensor property through the IO object in_occ_sensor. When the attendance sensor signals some is present by closing its contacts, it is reflected in software by the sensor property.

The polarity of the sensor can be adjusted for normally open (NO) and normally closed devices. The sensor_type property is used for adjusting for NO and NC devices. If sensor_type is ST_DISABLED, the occupancy monitor is disabled. If the sensor_type is ST_NO, a normally open device is connected to the occupancy monitor. When the in_occ_sensor IO pin is OFF, the sensor detects an operator. If the sensor_type is ST_NC, a normally closed device is connected to the occupancy monitor. When the in_occ_sensor IO pin is ON, the sensor detects an operator.

The manual.status input is from the Manual object which allows the attendance sensor to be overridden by the operator. When the manual.state is ON, the attendance sensor is overridden and occupancy state is OCCUPIED. When the manual.state is OFF, the attendance sensor controls the occupancy state.

When the sensor detects an operator and the manual.state is OFF the sensor property reflects the sensor's state. When this occurs, the occupancy object arms a timer which allows for a delay before signaling that the area is unoccupied and the state property is set to OCCUPIED. When the delay timer expires the state property is set to UNOCCUPIED. The time delay is adjustable by the delay_time property.

If the state property is OCCUPIED the nvooccupancy communication network variable is ON and 100%. The out_occ IO object is also set to ON. This IO object can be used for an indicating light for displaying the occupancy state. If the state property is OFF the nvooccupancy communication network variable is OFF and 0%. The out_occ IO object is set to OFF.

The override property is not currently used. It is intended for overriding the in_occ_sensor IO object.

Figure 9:
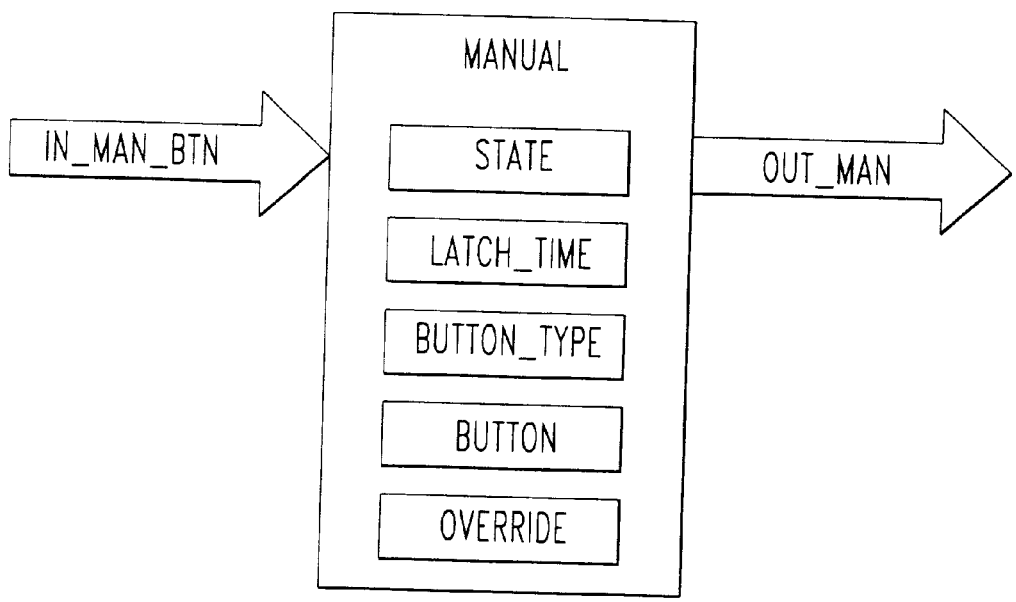
FIG. 9 shows Manual Object's Inputs, Outputs, and Properties.

The manual occupancy object allows the operator to temporarily override the attendance sensor. It contains properties which are used for manually overriding the attendance sensor. FIG. 9 shows the properties, inputs, and outputs for the Manual occupancy object.

The manual occupancy state is determined by either a push button or a switch. The occupancy state is reflected by the state property. The button or switch is connected through hardware to the manual IO pin on the neuron processor. This IO pin is logically connected to the button property through the IO object in_man_btn. When the button is pressed, it is reflected in software by the button property.

The occupancy monitor accepts several types of switches and buttons. The button_type property determines the type of input. If the button_type is SW_DISABLED the manual occupancy object is disabled and has no effect upon the occupancy status. If the button type is SW_NO the button is normally open. When in_man_btn is OFF, the state is ON. If the button_type is SW_NC the button is normally closed. When in_man_btn is ON, the state is ON. If the button_type is SW_NO_MOMENTARY, the button is momentary normally open. When the button is pressed, in_man_btn is OFF and when the button is released, in_man_btn is ON. The in_man_btn IO object temporarily changes state and the software must latch the manual state. If the button_type is SW_NC_MOMENTARY, the button is momentary normally closed. When the button is pressed, in_man_btn is ON and when the button is released, in_man_btn is OFF. The in_man_btn IO object temporarily changes state and the software must latch the manual state.

The override property is not currently supported. It is intended for overriding the in_man_btn IO object.

If the state property is ON the out_man IO object is ON. This IO object can be used for an indicating light for displaying the manual override state. If the state property is OFF, the out_man IO object is OFF.

If button_type is SW_NO or SW_NC

If the manual button is pressed, the button and state property reflect the input. The state property is used by the Occupancy Object for determining the occupied state. The latch_time property is not used.

If button_type is SW NO-MOMENTARY or SW_NC_MOMETARY

Since the button is momentary, the manual state needs to be latched. The state is latched for a time period which is adjustable through the latch_time property. When the latch period expires, the state returns to OFF. If the button is pressed for the first time, the state changes from OFF to ON and the latch timer is armed. If the button is not pressed again, the state will change back to OFF when the latch period expires. If the button is pressed for the first time, the state changes from OFF to ON. If the button is pressed again, before the latch time expires, the state returns to OFF and the latch timer is disabled.

The system can al so include an intelligent pressure sensor. The main purpose of the intelligent pressure sensor is to measure the pressure in a space. This is desirable because certain actions can be taken to maintain the desired pressure levels within space. The pressure sensor only reports the current space pressure and does not take any controlling actions.

The pressure sensor can accepts input from a pressure measuring device operating in the range of 0.0 to 0.05" w.c.. The pressure sensor signals the current pressure reading on the LonTalk network through a communication network variable. Other intelligent products can receive the pressure reading by binding to the current pressure communication network variable.

The intelligent pressure sensor is commonly used in conjunction with the Laboratory Monitor. The supply air damper and exhaust air damper are adjusted to maintain a safe level within the lab.

Figure 11:
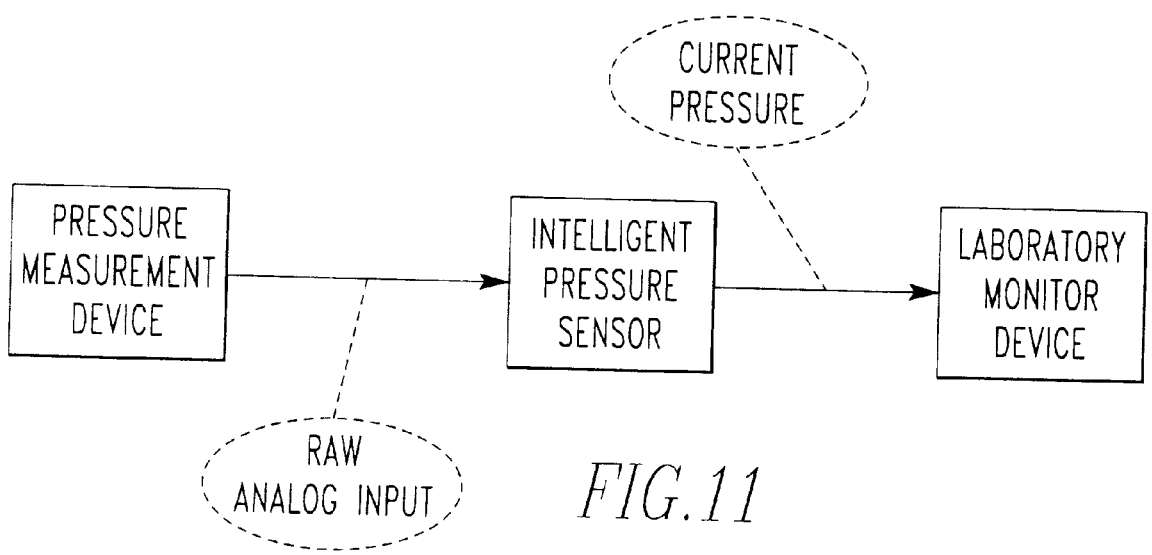
FIG. 11 shows an Information Flow Diagram for the Intelligent Pressure Sensor.
Figure 10A:
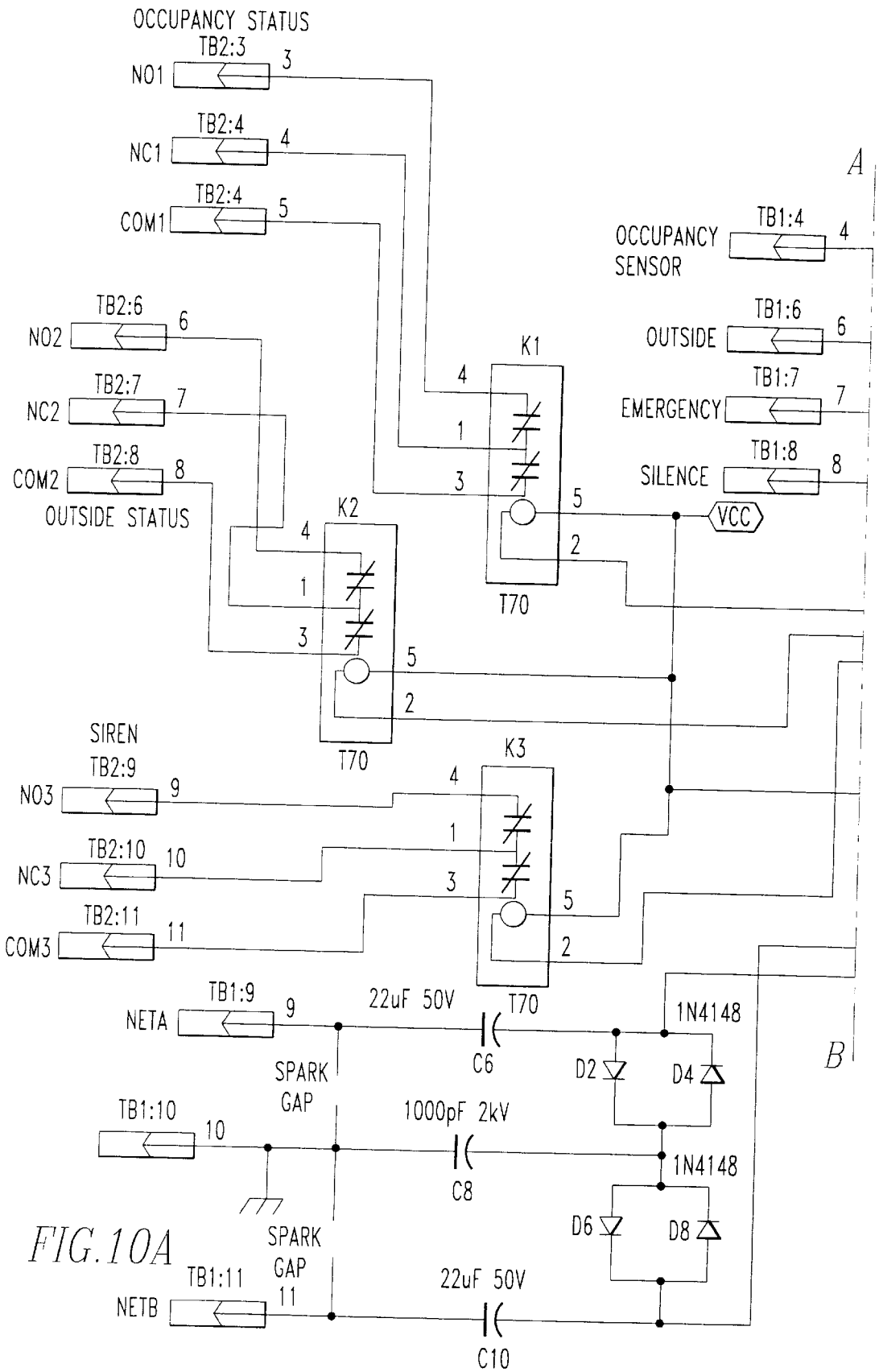
FIGS. 10a, 10b, 10c, 10d and 10e, show a schematic of the occupancy monitor.
Figure 10B:
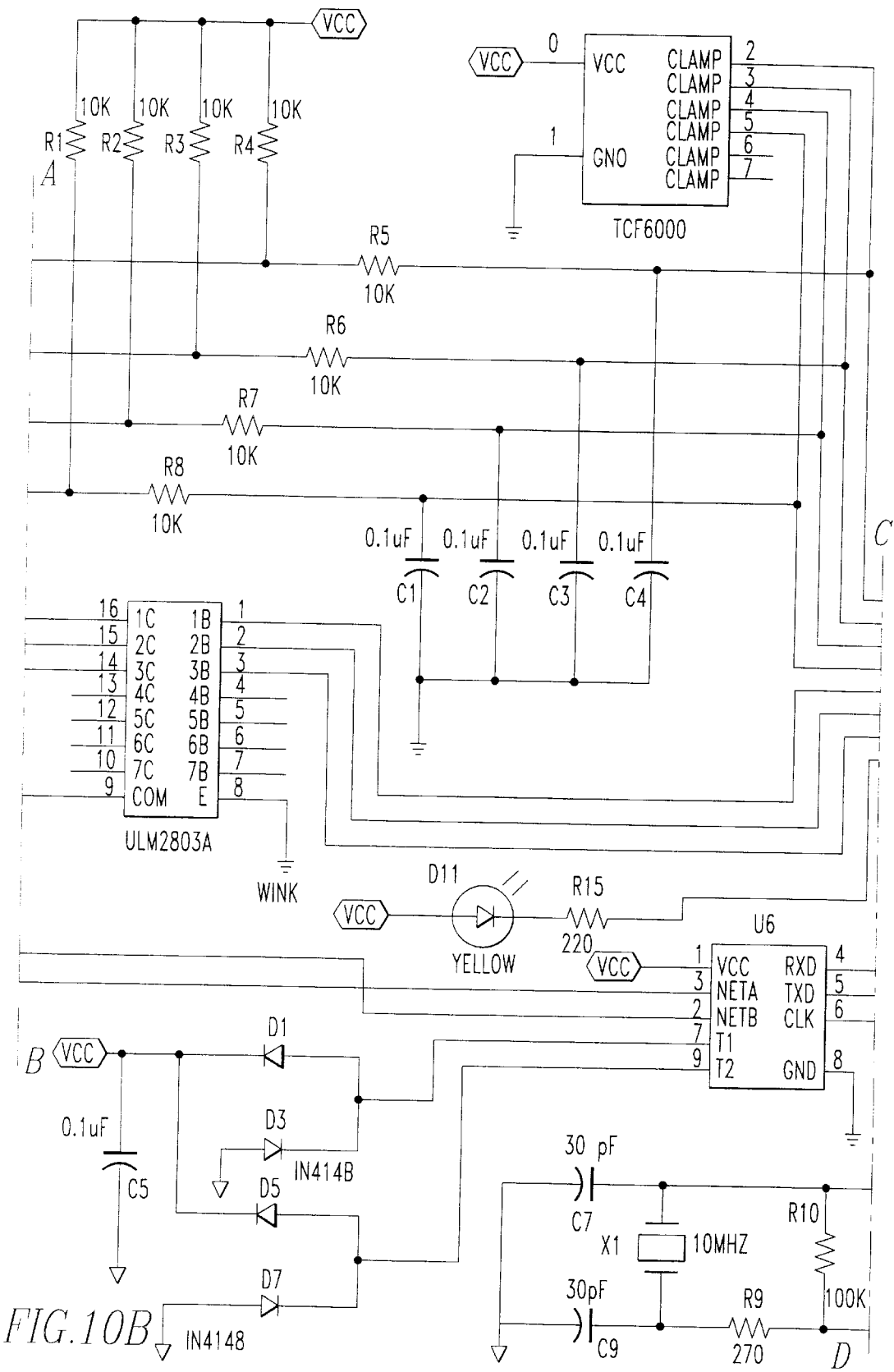
Figure 10C:
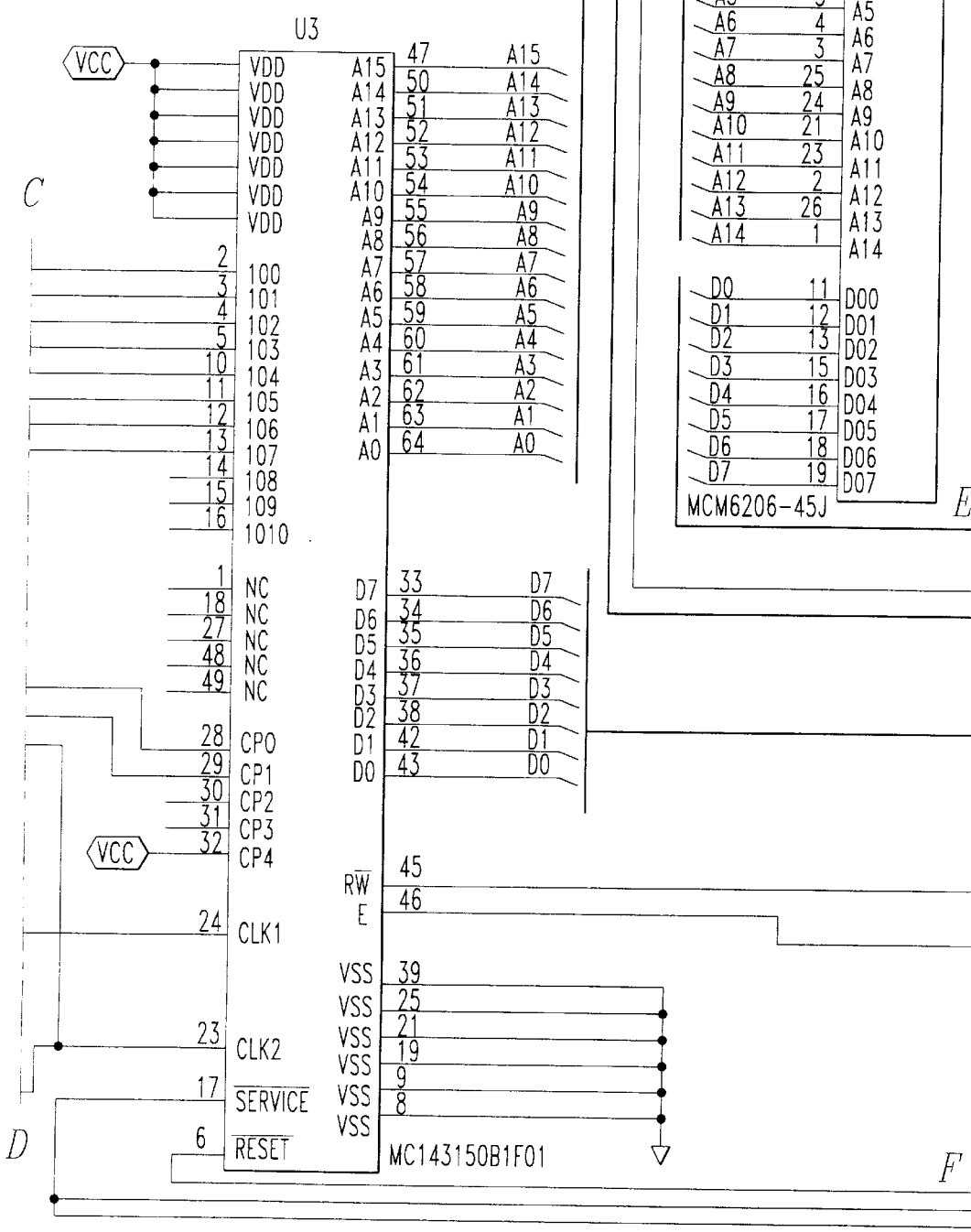
Figure 10D:
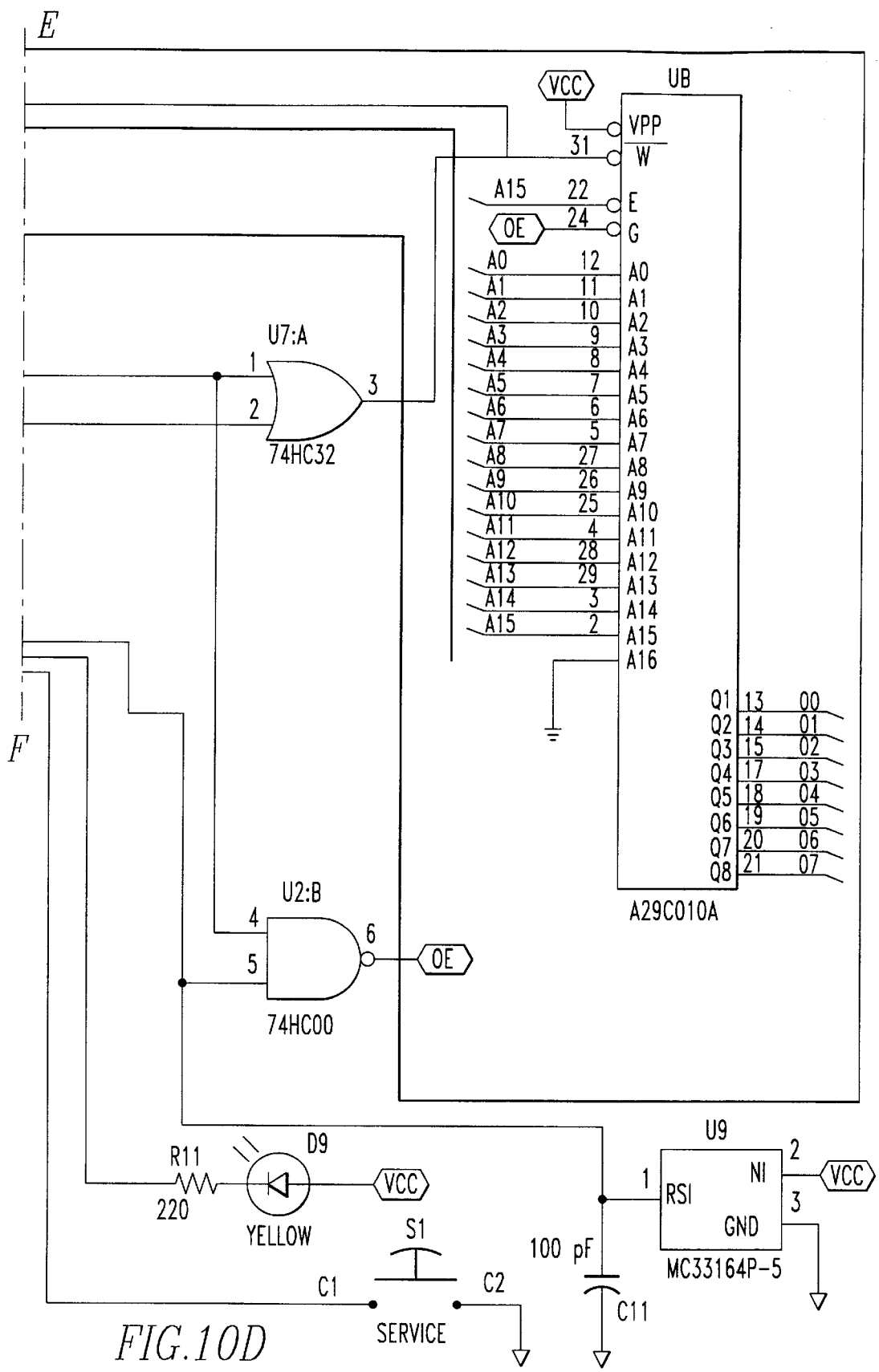
Figure 10E:
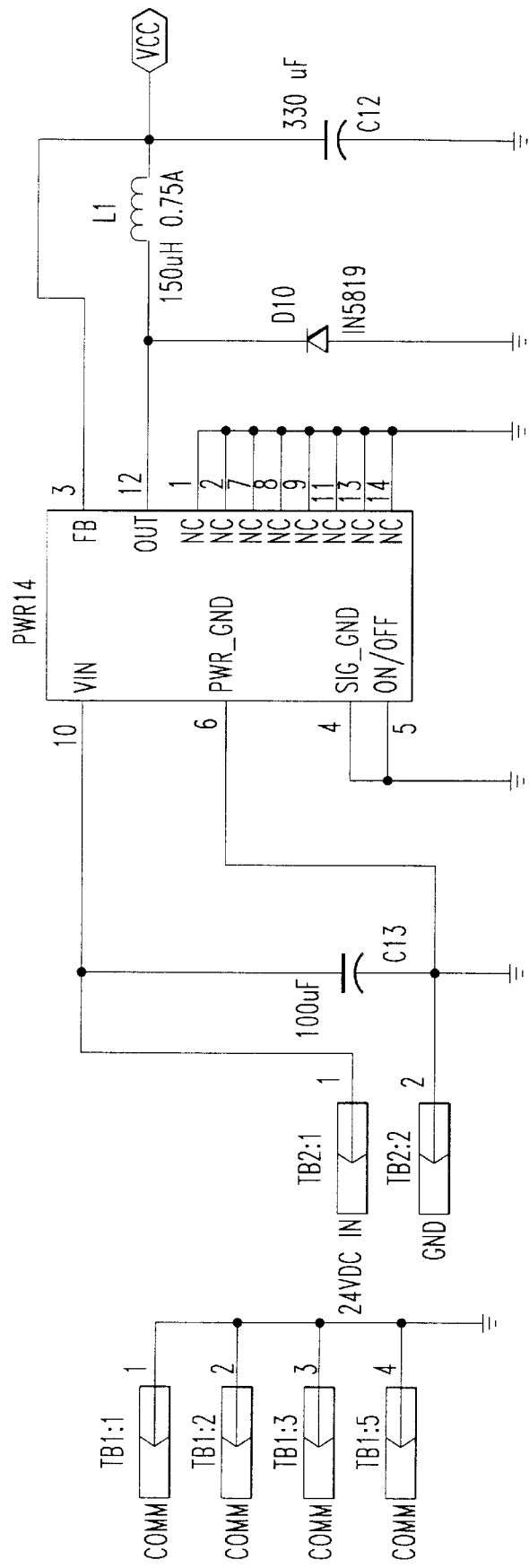

The intelligent pressure sensor is just one component that can be incorporated into a fume hood, laboratory, or clean room control strategy. FIG. 11 displays the major components of a common system and their flow of information.

Figure 12:
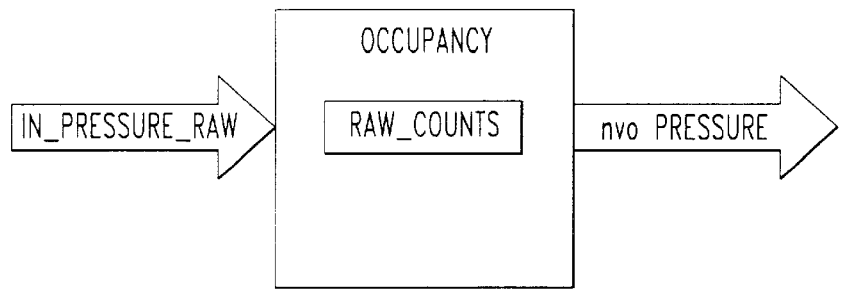
FIG. 12 shows Pressure Object's Inputs, Outputs, and Properties.

The pressure software object is used for determining the current pressure value. It contains properties that are used for computing the current value. These properties are a combination of configuration and calculated variables. FIG. 12 shows the properties, inputs, and outputs for the Pressure object.

The current pressure value is determined by an external measurement device. The device is wired to the pressure sensor's analog input. The measured value is presented to the analog input as a voltage (in_pressure_raw) that is converted to a raw digital value (raw_counts) through an analog to digital converter (ADC). The raw_counts value from the ADC is converted to pressure through a software calculation. The calculation is based on the characteristics of the measuring device. The current pressure value is then made available to the communications network through the nvoPressure property.

The Intelligent Pressure sensor measures the pressure in space. This is desirable because control actions can be taken to maintain the pressure at safe levels within an occupied spaced. An example of the typical configuration used with the pressure sensor is shown in FIG. 13.

The system incorporates a 3120 Neuron Processor that simplifies hardware and software development. The current design incorporates an analog input to measure the pressure. A program reads the pressure input and converts this into a current pressure value.

Figure 13:
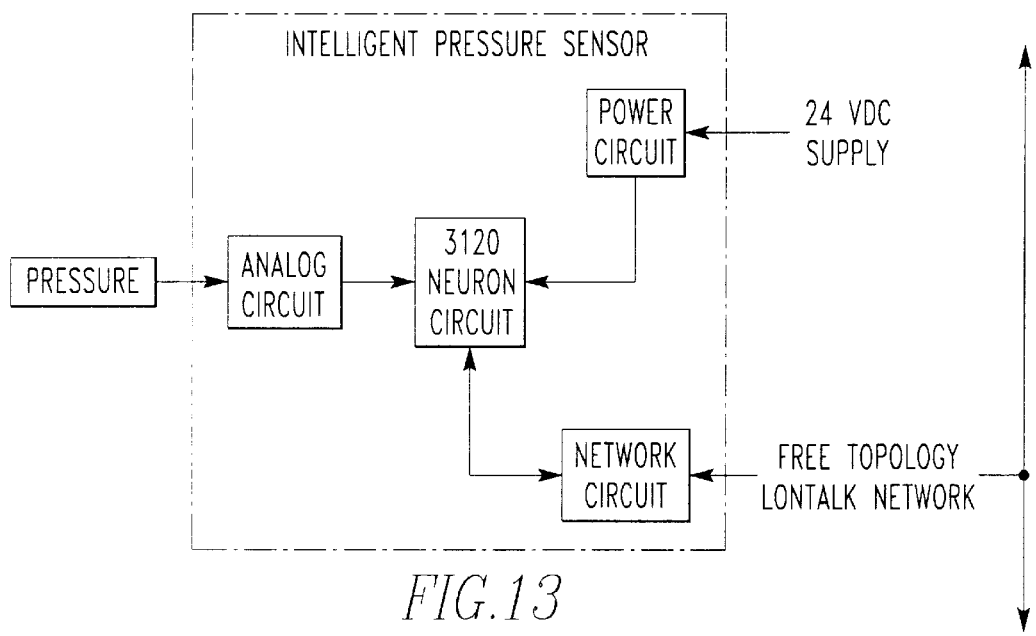
FIG. 13 shows Major Components of Intelligent Pressure sensor.

As FIG. 13 illustrates, there are 5 major components to the Intelligent Pressure sensor, the 3120 Neuron Processor Circuit, Power Circuit, Network Circuit, and the Analog Input Circuit. Each of these components is discussed in the following sub-sections.

The 3120 Neuron Processor Circuit is composed of the 3120 Neuron Processor and support for the clock, service pin, and reset.

The 3120 Neuron Processor is the major component of the occupancy sensor. The 3120 Neuron Processor is composed of three separate logical units, the Media Access Control (MAC) Processor, Network Processor, and the Application Processor.

The MAC Processor handles layers one and two of the seven-layer network protocol stack. This includes driving the communications subsystem hardware as well as executing the collision avoidance algorithm. The MAC Processor works in conjunction with the Network Processor and they communicate using network buffers located in the onboard shared memory.

The Network Processor implements layers three through six of the network protocol stack. It handles communication network variable processing, addressing, transaction processing, authentication, background diagnostics, software timers, network management, and routing functions. The Network Processor works in conjunction with the Application Processor and they communicate using application buffers located in the onboard shared memory.

The Application Processor implements layer seven of the network protocol stack and execute the operating system and the application code. The operating system consists of a built-in multitasking scheduler that allows for parallel events.

The Power Circuit is composed of a LM2574M-5V Switching Regulator, capacitors, a Zener Diode, a Diode, and an Inductor. This circuit is a common power supply circuit.

The Network Circuit is composed of a FTT-10A Free Topology Transceiver, capacitors, and surge protectors. This circuit is recommended by the Echelon Corporation for the FTT-10A Transceiver.

The Dual-Slope Integrating A/D is composed of OP Amps, resistors, capacitors, and a CD4016 Analog Switch. This circuit is recommended by the Echelon Corporation for supporting the Dual-Slope Integrating A/D object.

Figure 14A:
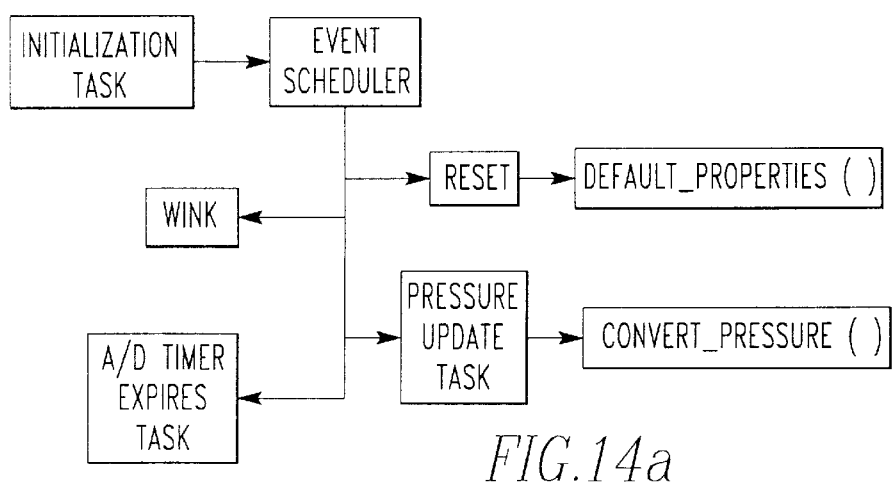
FIG. 14a shows Major Software Components of the Intelligent Pressure Sensor.

The 3120 Neuron simplifies software development, since many device drivers are pre-written as I/O objects. FIG. 14a illustrates the major components of the application program for the pressure sensor.

The Initialization Task is automatically run after the pressure sensor reset or powered on. The Initialization Task allocates memory and sets default values for Communication Network Variables, Input/Output Objects, Timer Objects, Global Variables, Network Buffers, and Application Buffers. After the Initialization Task executes it passes control over to the event scheduler.

Communication network variables are similar to Global Variables in 'C', but communication network variables can be sent or received by other LONWorks controllers on the LONTalk network. The Neuron Processor takes care of sending and receiving Communication Network Variables, but a Network Configuration Tool is necessary to link communication network variables between controllers. There are two basic types of communication network variables, input and output. Input communication network variables receive their values from other controllers on the network. Output communication network variables send their values to other controllers on the network.

The pressure sensor has the following system communication network variables:

| Name | Direction | Type | Description |
| --- | --- | --- | --- |
| nvoPressure | output | SNVT_press_p | Current Pressure |

The nvoPressure communication network variable is used for broadcasting the current pressure across the network. This communication network variable is updated when an analog to digital conversion is performed.

The Neuron processor has built-in input/output objects that simplify the development of controllers since the device drivers are pre-written. The Pressure sensor is using a dual slope A/D converter I/O object called ADConvertor. This A/D converter performs measurements with 16-bits of resolution for as little as a 13 ms integration period. The ADConvertor requires a millisecond timer to provide continuous A/D conversion.

The ConvertTimer millisecond timer object is provided for continuous reading of the A/D converter. This is repeating timer The UpdatePressure millisecond time object is provided for continually updating the nvoPressure communication network variable. This is a repeating timer.

The Event Scheduler allocates processor time to the application tasks. The Event Scheduler decides when it is time to run a task, and the higher priority tasks run first such as the Reset Task. The Event Scheduler passes control to a task and the completed task relinquishes control to the Event Scheduler. The Event Scheduler is responsible for updating the Watchdog timer.

The Reset Task is responsible for setting up the variables and I/O objects to a known state. All of the timer objects are set to their respective update rates. This causes the A/D I/O object, and Update Pressure object to be updated at the desired rate.

The A/D Timer Expires Task is responsible for starting the A/D conversion by writing the CONTROL_VALUE constant to ADConvertor I/O Object. This task is run when the ConvertTimer expires.

The A/D Update Task occurs when the A/D converter has completed its conversion of the unscaled pressure. This raw value must be converted to a pressure that has engineering units using the following algorithm:

min eng=minimum pressure max eng=maximum pressure min counts=minimum counts(voltage)

max counts=maximum counts(voltage)

$$pressure = \frac{(counts - min\,counts) \times (max\,eng - min\,eng)}{(max\,counts - min\,counts)} + min\,eng$$

After calculating the current pressure the output communication network variable nvoPressure is updated.

Referring to FIG. 14b, the Space Pressure Sensor monitors the pressure in a laboratory (or fume hood) for the control of spaces based on pressure differential (or flow) independently of face velocity.

Dual Slope Analog Input Circuit

The MC143120's IO1 (U2 pin 6) is connected to a CD4016 analog switch (U9) which along with the MC143120's IO4 (U2 pin 3) which is connected to an analog circuit consisting of an LM358 Operational Amplifier (U7) section utilized as a unity gain buffer, a second an LM358 Operational Amplifier (U6) utilized as an integrator, and an LM393 Comparator (U4) together comprising a dual-slope A/D converter. The 74HC04 inverter (U8) is used to convert the CD4016 analog switch into a single pole double throw switching function. Normally, the pressure or flow transducer produces either a (typical) 0 to +5 volt or 0 to 20 milliamp signal which is fed to the input connector (TB3 pin 2) which goes to a voltage divider (R17 and R16) which scales the 0 to +5V input to 0 to +1V. Note that the 249 ohm resistor (R18) is used only when the input signal is from a 0–20 mA current loop transducer.

The MC143120 firmware initiates an analog to digital conversion by calling the dual-slope I/O object within the Neuron firmware which performs the following steps; [ASSURE INTEGRATOR DISCHARGE] The MC143120's IO1 (U2 pin 6) is taken low (if not already low) to ensure that the CD4016 analog switch has connected the VREF input to the unity buffer which will cause the integrator output (U6) to slew negative via integral action and cause the comparator output (U4) to go high once its' threshold has been crossed. This is monitored via the MC143120's IO4 (U2 pin 3). [AUTO ZERO] Once this output level has or had occurred, the MC143120 then takes its' IO1 (U2 pin 6) high to cause the CD4016 analog switch to connect the input value (TB3 pin 2) to be measured to the analog circuit to integrate the input value. This causes the integrator output (U6) to slew positive. [INTEGRATE INPUT] Once the integrator output crosses the comparator threshold and the comparator output (U4) switches low indicating that the integrator output has crossed the zero count threshold going high, the MC143120, via an internal firmware-preset hardware down counter, then holds the analog switch connected to the input value for the firmware preset down counter period (integration period) which is the predetermined integration time. [DE-INTEGRATE AGAINST REFERENCE] Once this down counter has reached zero, hardware circuitry internal to the MC143120 then takes the IO1 (U2 pin 6) low immediately which switches the CD4016 analog switch (U9) and hence the input to the analog circuit back to the VREF causing the integrator output to now slew negative. At the same instant, the MC143120 begins incrementing the internal hardware counter and monitors the comparator output via IO4 until the output switches high indicating that the integrator has de-integrated to zero cross. The value in the MC143120 internal hardware counter now represents the analog input value which is used by the application firmware as the measured flow value.

Free Topology Transceiver Circuit

The MC143120's CP1, Transmit Data output (U2 pin 20) is connected to the FTT10 TXD input (U5 pin 5) and the CP0, Receive Data input (U2 pin 19) is connected to the FTT10 RXD output (U5 pin 4) on the FTT10 Free Topology Transceiver (U5) which converts the standard Neuron single ended mode Manchester data protocol levels to the data modulation scheme used on the Free Topology Network. The FTT10's CLK (U5 pin 6) is driven with the Neuron clock frequency from the MC143120's CLK2 (U2 pin 14). The FTT10's RES input is driven by the DS1233 Reset Controllers' output (U1 pin 1). The FTT10 produces its' output on the A (U5 pin 3) and B (U5 pin 2) pins which are coupled to the Free Topology network via the 47 uF 50 V capacitor to the FTT10 A and B output connections. This capacitor is used to block DC voltage components when the Free Topology network is used with network powered transceivers. The two 51 ohm resistors and switches are used to connect either a single point 51 ohm termination resistance for a free topology wired network or a 102 ohm termination resistance for each end of a daisy chain wired network. The BAV99 diodes on the A and B outputs are used in conjunction with the 0.001 uF 2000V capacitor and the PCB spark gaps to perform transient protection for the FTT10. The BAV99 diodes on the T1 (U5 pin 7) and the T2 (U5 pin 9) are used for transient protection on the FTTn0s, secondary side of its' internal coupling transformer.

System Clock Circuit

The 10 MHZ crystal (Y1) along with the two 33pF capacitors and the 270 and 100K ohm resistors connected to the MC143120's CLK1 (U2 pin 15) and CLK2 (U2 pin 14) form the system clock oscillator.

Service Pin Circuit

The Service LED (DS1) along with the 332 ohm resistor and the Service Button form the indication and actuation of the Service request/grant function which is connected to the MC143120's SER input (U2 pin 8) used by the Neuron for network object binding.

Processing Node Circuit

The MC143120 (U2) Single Chip Neuron has up to 2K Bytes of SRAM (Data and stack working memory) and up to 2K Bytes of EEPROM (Application Program and Data storage) in addition to 10K Bytes of on chip networking and kernal ROM. Note that this aforementioned device comprises a processing node that executes an application program in a manner well known to those skilled in Echelon circuit design.

System Reset Circuit

The DS1233 reset controller (U1) monitors the 5 volt power supply for an out of tolerance condition and as a result also generates the power on reset function. The reset output (U1 pin 2) is connected to the MC143120 (U2 pin 1) where it performs power on reset as well as the extension delay of a push button induced reset.

Power Supply Circuit

The LM2574M-5V step down switch mode regulator (U3) is used to develop the regulated +5 volts used for system power (VCC) from an unregulated input power of approximately 24 volts DC. The 220 uF 60 V input capacitor filters the input voltage. The 56V transzorb prevents transients on the input. The 330 uH inductor stores the switched energy via its magnetic field, the Shottky diode (D2) acts as a catch or free wheeling diode for negative excursions on the inductor, and the 330 uF 10 V capacitor filters the inductors output in order to supply a regulated +5 volt output. The 6.8V transorb (Z2) protects the +5 volt supply output against transients.

The system can also include an intelligent temperature sensor. The main purpose of the intelligent temperature sensor is to measure the temperature in a space or duct. This is desirable because certain actions can be taken to reduce energy costs and increase comfort to the occupants of a space. The temperature sensor only reports the current space or duct temperature and does not take any controlling actions.

The temperature sensor can accepts input from a Type 3 Precon thermistor operating in the range of -30.0 to 230.0 (F. The temperature sensor uses the thermistor to calculate the current temperature. The temperature sensor signals the current temperature reading on the LonTalk network through a communication network variable. Other intelligent products can receive the temperature reading by binding to the current temperature communication network variable.

The intelligent temperature sensor is commonly used in conjunction with the Laboratory Monitor. The supply air and heating valve are adjusted to maintain comfortable conditions within the lab.

Figure 15:
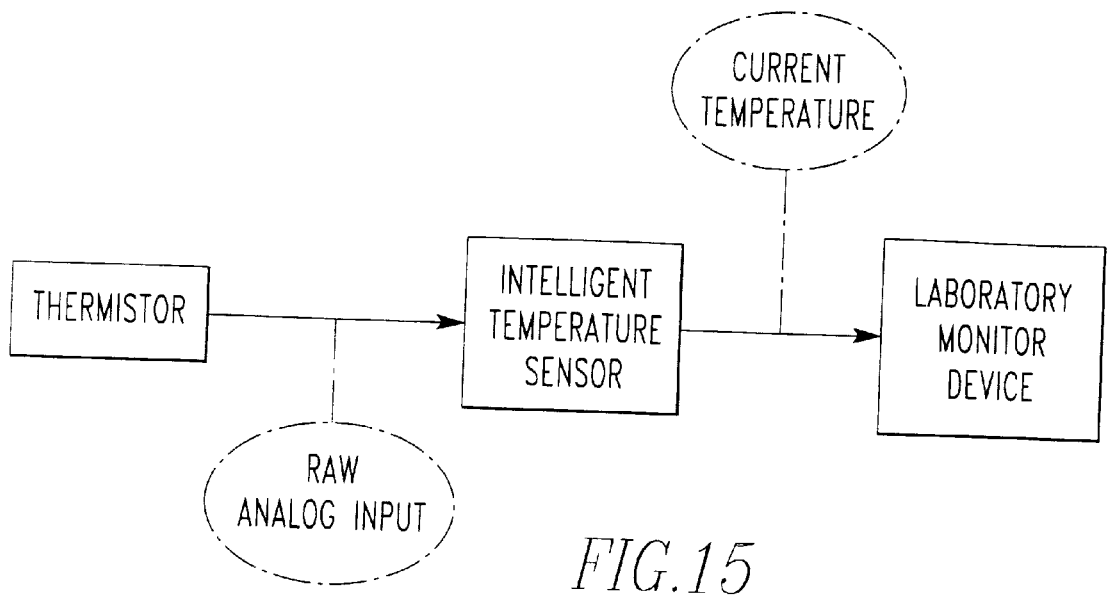
FIG. 15 is an Information Flow Diagram for the Intelligent Temperature Sensor.

The intelligent temperature sensor is just one component that can be incorporated into a fume hood, laboratory, or clean room control strategy. FIG. 15 displays the major components of a common system and their flow of information.

Figure 16:
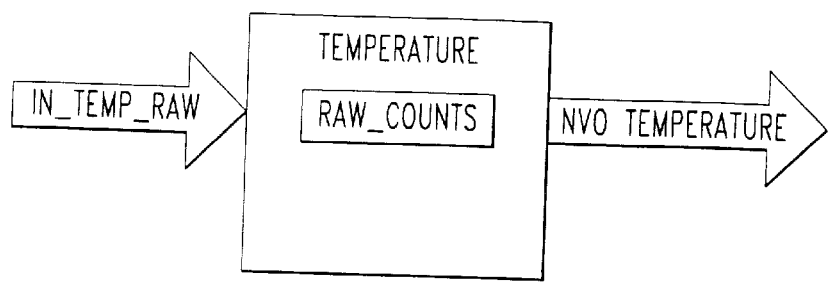
FIG. 16 shows Temperature Object's Inputs, Outputs, and Properties.

The temperature software object is used for determining the current temperature value. It contains properties that are used for computing the current value. These properties are a combination of configuration and calculated variables. FIG. 16 shows the properties, inputs, and outputs for the Temperature object.

The current temperature value is determined by an external sensing device. This device is usually a thermistor. One characteristic of a thermistor is that its resistance value changes with temperature. The thermistor is wired to the temperature sensor's analog input. The thermistor value is presented to the analog input as a voltage (in_temp_raw) that is converted to a raw digital value (raw_counts) through an analog to digital converter (ADC). As the resistance of the thermistor changes with temperature the in_temp_raw value presented at the analog input changes. The raw_counts value from the ADC is converted to temperature through a software calculation. The calculation is based on the characteristic curve of the thermistor. A simple table look up and linear interpolation are performed to arrive at the current temperature value. The current temperature value is then made available to the communications network through the nvoTemperature property.

The Intelligent Temperature Sensor measures the temperature in space or duct. This is desirable because control actions can be taken to reduce energy costs and/or increase comfort in an occupied space. An example of the typical configuration used with the temperature sensor is shown in FIG. 17.

The system incorporates a 3120 Neuron Processor that simplifies hardware and software development. The current design incorporates an analog input to measure the temperature. A program reads the temperature input and converts this into a current temperature value.

Figure 17:
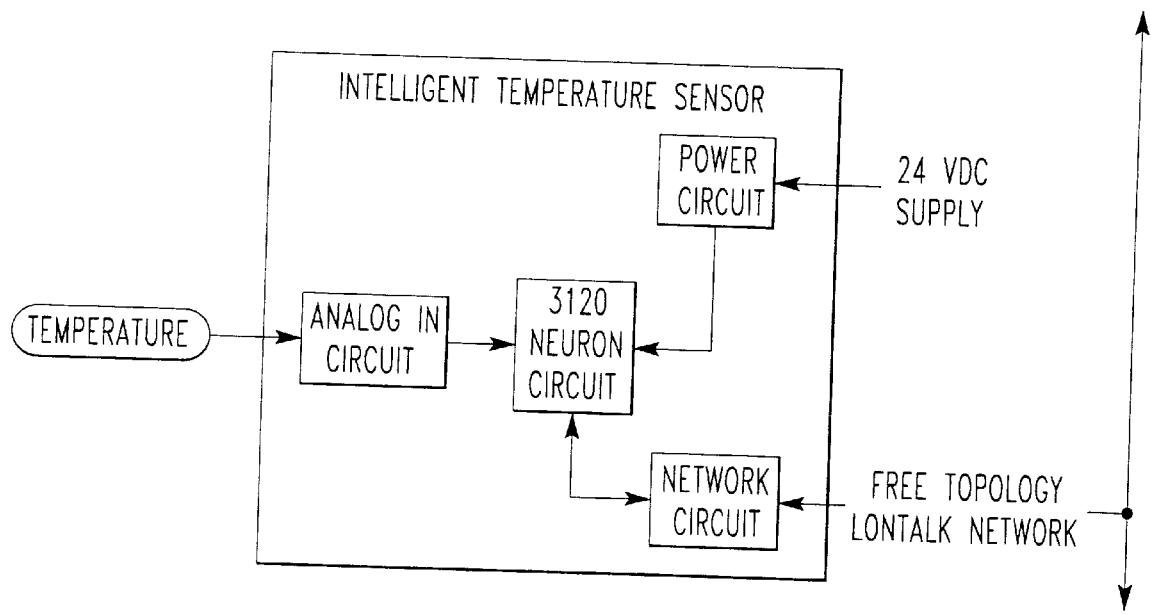
FIG. 17 shows Major Components of Intelligent Temperature Sensor.

As FIG. 17 illustrates, there are 6 major components to the Intelligent Temperature Sensor, the 3120 Neuron Processor Circuit, Power Circuit, Network Circuit, and the Analog Input Circuit. Each of these components is discussed in the following sub-sections.

The 3120 Neuron Processor Circuit is composed of the 3120 Neuron Processor and support for the clock, service pin, and reset.

The 3120 Neuron Processor is the major component of the occupancy sensor. The 3120 Neuron Processor is composed of three separate logical units, the Media Access Control (MAC) Processor, Network Processor, and the Application Processor.

The MAC Processor handles layers one and two of the seven-layer network protocol stack. This includes driving the communications subsystem hardware as well as executing the collision avoidance algorithm. The MAC Processor works in conjunction with the Network Processor and they communicate using network buffers located in the onboard shared memory.

The Network Processor implements layers three through six of the network protocol stack. It handles communication network variable processing, addressing, transaction processing, authentication, background diagnostics, software timers, network management, and routing functions. The Network Processor works in conjunction with the Application Processor and they communicate using application buffers located in the onboard shared memory.

The Application Processor implements layer seven of the network protocol stack and execute the operating system and the application code. The operating system consists of a built-in multitasking scheduler that allows for parallel events.

The Power Circuit is composed of a LM2574M-5V Switching Regulator, capacitors, a Zener Diode, a Diode, and an Inductor. This circuit is a common power supply circuit.

The Network Circuit is composed of a FTT-10A Free Topology Transceiver, capacitors, and surge protectors. This circuit is recommended by the Echelon Corporation for the FTT-10A Transceiver.

The Dual-Slope Integrating A/D is composed of OP Amps, resistors, capacitors, and a CD4016 Analog Switch. This circuit is recommended by the Echelon Corporation for supporting the Dual-Slope Integrating A/D object.

Figure 18:
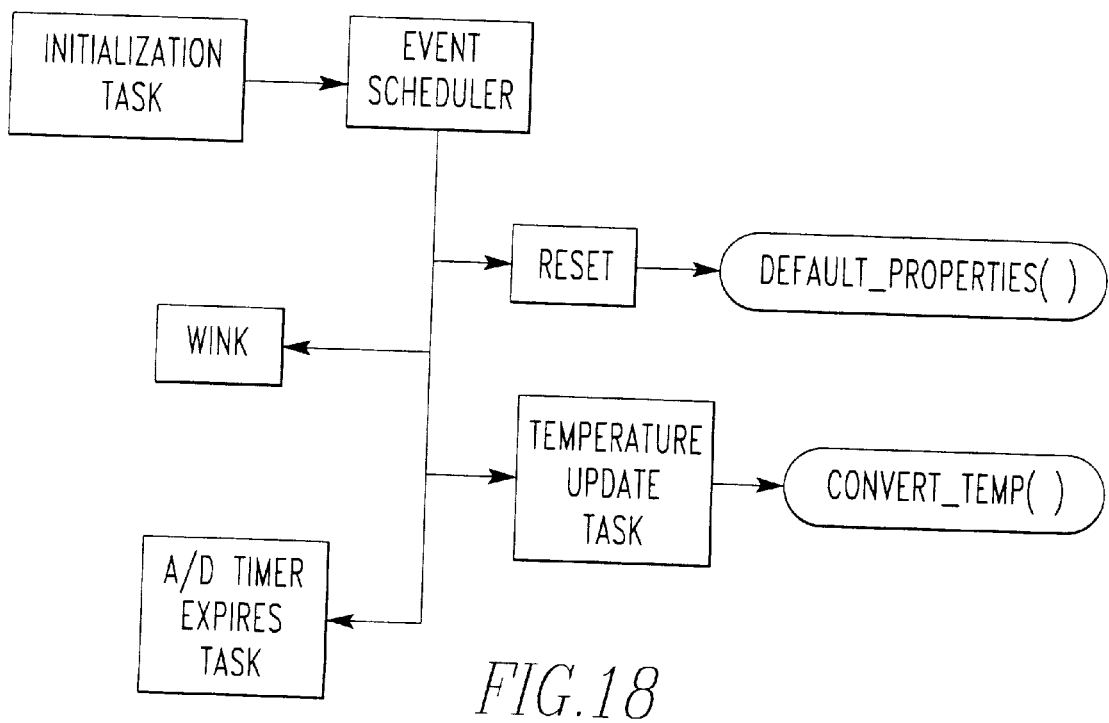
FIG. 18 Major Software Components of the Intelligent Temperature Sensor.

The 3120 Neuron simplifies software development, since many device drivers are pre-written as I/O objects. FIG. 18 illustrates the major components of the application program for the temperature sensor.

The Initialization Task is automatically run after the temperature sensor reset or powered on. The Initialization Task allocates memory and sets default values for Communication Network Variables, Input/Output Objects, Timer Objects, Global Variables, Network Buffers, and Application Buffers. After the Initialization Task executes it passes control over to the event scheduler.

The temperature sensor has the following system communication network variables:

| Name | Direction | Type | Description |
|---|---|---|---|
| nvoTemperature | output | SNVT_temp_p | Current Temperature |

The nvoTemperature communication network variable is us ed for broadcasting the current temperature across the network. This communication network variable is updated when an analog to digital conversion is performed.

The Neuron processor has built-in input/output objects that simplify the development of controllers since the device drivers are pre-written. The Temperature Sensor is using a dual slope A/D converter I/O object called ADConvertor. This A/D converter performs measurements with 16-bits of resolution for as little as a 13 ms integration period. The ADConvertor requires a millisecond timer to provide continuous A/D conversion.

The ConvertTimer millisecond timer object is provided for continuous reading of the A/D converter. This is repeating timer The UpdateTemp millisecond time object is provided for continually updating the nvoTemperature communication network variable. This is a repeating timer.

The Event Scheduler allocates processor time to the application tasks. The Event Scheduler decides when it is time to run a task, and the higher priority tasks run first such as the Reset Task. The Event Scheduler passes control to a task and the completed task relinquishes control to the Event Scheduler. The Event Scheduler is responsible for updating the Watchdog timer.

The Reset Task is responsible for setting up the variables and I/O objects to a known state. All of the timer objects are set to their respective update rates. This causes the A/D I/O object, and Update Temperature object to be updated at the desired rate.

The A/D Timer Expires Task is responsible for starting the A/D conversion by writing the CONTROL-VALUE constant to ADConvertor I/O Object. This task is run when the ConvertTimer expires.

The A/D Update Task occurs when the A/D converter has completed its conversion of the unscaled temperature. This raw value must be converted to a temperature that has engineering units using the following algorithm:
1. Look up the minimum and maximum counts in the thermistor characteristic table based on the raw count value.

```
for(i=1; i<=10; i++)                //find the correct spline
{
    if(counts < table[i].raw)       //i = high value of spline
        break;
}
min counts = table[i-1].raw;
max counts = table[i].raw;
min eng = table[i-1].eng
max eng = table[i].eng
```

2. Calculate the current temperature in engineering units.

$$\text{temperature} = \frac{(\text{counts} - \text{min counts}) \times (\text{max eng} - \text{min eng})}{(\text{max counts} - \text{min counts})} + \text{min eng}$$

After calculating the current temperature the output communication network variable nvoTemperature is updated.

The Temperature Sensor monitors the temperature in a space for applications such as temperature control loops for conditioned air typically within a laboratory.

Dual Slope Analog Input Circuit

The MC143120's IO1 (U2 pin 6) is connected to a CD4016 analog switch (U9) which along with the MC143120's IO4 (U2 pin3) which is connected to an analog circuit consisting of an LM358 Operational Amplifier (U7) section utilized as a unity gain buffer, a second an LM358 Operational Amplifier (U6) utilized as an integrator, and an LM393 Comparator (U4) together comprising a dual-slope A/D converter. The 74HC04 inverter (U8) is used to convert the CD4016 analog switch into a single pole double throw switching function. Normally, the temperature sensor will be a 10K ohm thermistor used as a ratiometric device excited from the +5 V supply (TB3 pin 1) to the input (TB3 pin 2). The output of the thermistor is translated through a lookup table from the voltage divider created by the thermistor resistance in conjunction with the 10K ohm series pair (R17 and R16) which scales the 0 to +5V input to 0 to +1V. A shield, if used, would be connected to the return (TB3 pin 3) Note that the 249 ohm resistor (R18) is used only when the input signal is from a 0–20 mA current loop transducer.

The MC143120 firmware initiates an analog to digital conversion by calling the dual-slope I/O object within the Neuron firmware which performs the following steps; [ASSURE INTEGRATOR DISCHARGE] The MC143120's IO1 (U2 pin 6) is taken low (if not already low) to ensure that the CD4016 analog switch has connected the VREF input to the unity buffer which will cause the integrator output (U6) to slew negative via integral action and cause the comparator output (U4) to go high once its' threshold has been crossed. This is monitored via the MC143120's IO4 (U2 pin 3). [AUTO ZERO] Once this output level has or had occurred, the MC143120 then takes its' IO1 (U2 pin 6) high to cause the CD4016 analog switch to connect the input value (TB3 pin 2) to be measured to the analog circuit to integrate the input value. This causes the integrator output (U6) to slew positive. [INTEGRATE INPUT] Once the integrator output crosses the comparator threshold and the comparator output (U4) switches low indicating that the integrator output has crossed the zero count threshold going high, the MC143120, via an internal firmware-preset hardware down counter, then holds the analog switch connected to the input value for the firmware preset down counter period (integration period) which is the predetermined integration time. [DE-INTEGRATE AGAINST REFERENCE] Once this down counter has reached zero, hardware circuitry internal to the MC143120 then takes the IO1 (U2 pin 6) low immediately which switches the CD4016 analog switch (U9) and hence the input to the analog circuit back to the VREF causing the integrator output to now slew negative. At the same instant, the MC143120 begins incrementing the internal hardware counter and monitors the comparator output via IO4 until the output switches high indicating that the integrator has de-integrated to zero cross. The value in the MC143120 internal hardware counter now represents the analog input value which is used by the application firmware as the measured flow value.

Free Topology Transceiver Circuit

The MC143120's CP1, Transmit Data output (U2 pin 20) is connected to the FTT10 TXD input (U5 pin 5) and the CP0, Receive Data input (U2 pin 19) is connected to the FTT10 RXD output (U5 pin 4) on the FTT10 Free Topology Transceiver (U5) which converts the standard Neuron single ended mode Manchester data protocol levels to the data modulation scheme used on the Free Topology Network. The FTT10's CLK (U5 pin 6) is driven with the Neuron clock frequency from the MC143120's CLK2 (U2 pin 14). The FTT10's RES input is driven by the DS1233 Reset Controllers' output (U1 pin 1). The FTT10 produces its' output on the A (U5 pin 3) and B (U5 pin 2) pins which are coupled to the Free Topology network via the 47 uF 50 V capacitor to the FTT10 A and B output connections. This capacitor is used to block DC voltage components when the Free Topology network is used with network powered transceivers. The two 51 ohm resistors and switches are used to connect either a single point 51 ohm termination resistance for a free topology wired network or a 102 ohm termination resistance for each end of a daisy chain wired network. The BAV99 diodes on the A and B outputs are used in conjunction with the 0.001 uF 2000V capacitor and the PCB spark gaps to perform transient protection for the FTT10. The BAV99 diodes on the T1 (U5 pin 7) and the T2 (U5 pin 9) are used for transient protection on the FTT10s' secondary side of its' internal coupling transformer.

System Clock Circuit

The 10 MHZ crystal (Y1) along with the two 33 pF capacitors and the 270 and 100K ohm resistors connected to the MC143120's CLK1 (U2 pin 15) and CLK2 (U2 pin 14) form the system clock oscillator.

Service Pin Circuit

The Service LED (DS1) along with the 332 ohm resistor and the Service Button form the indication and actuation of the Service request/grant function which is connected to the MC143120's SER input (U2 pin 8) used by the Neuron for network object binding.

Processing Node Circuit

The MC143120 (U2) Single Chip Neuron has up to 2K Bytes of SRAM (Data and stack working memory) and up to 2K Bytes of EEPROM (Application Program and Data storage) in addition to 10K Bytes of on chip networking and kernal ROM. Note that this aforementioned device comprises a processing node that executes an application program in a manner well known to those skilled in Echelon circuit design.

System Reset Circuit

The DS1233 reset controller (U1) monitors the 5 volt power supply for an out of tolerance condition and as a result also generates the power on reset function. The reset output (U1 pin 2) is connected to the MC143120 (U2 pin 1) where it performs power on reset as well as the extension delay of a push button induced reset.

Power Supply Circuit

The LM2574M-5V step down switch mode regulator (U3) is used to develop the regulated +5 volts used for system power (VCC) from an unregulated input power of approximately 24 volts DC. The 220 uF 60 V input capacitor filters the input voltage. The 56V transzorb prevents transients on the input. The 330 uH inductor stores the switched energy via its magnetic field, the Shottky diode (D2) acts as a catch or free wheeling diode for negative excursions on the inductor, and the 330 uF 10 V capacitor filters the inductors output in order to supply a regulated +5 volt output. The 6.8V transorb (Z2) protects the +5 volt supply output against transients.

The system can also include an intelligent humidity sensor. The main purpose of the intelligent humidity sensor is to measure the humidity in a space or duct. This is desirable because certain actions can be taken to reduce energy costs and increase comfort to the occupants of a space. The humidity sensor only reports the current space or duct humidity and does not take any controlling actions.

The humidity sensor can accepts input from a humidity easuring device operating in the range of 0.0 to 100.0% RH. The umidity sensor signals the current humidity reading on the LonTalk etwork through a communication network variable. Other intelligent products can receive the humidity reading by binding to the current humidity communication network variable.

The intelligent humidity sensor is commonly used in conjunction with the Laboratory Monitor. The supply air and heating valve are adjusted to maintain comfortable conditions within the lab.

Figure 20:
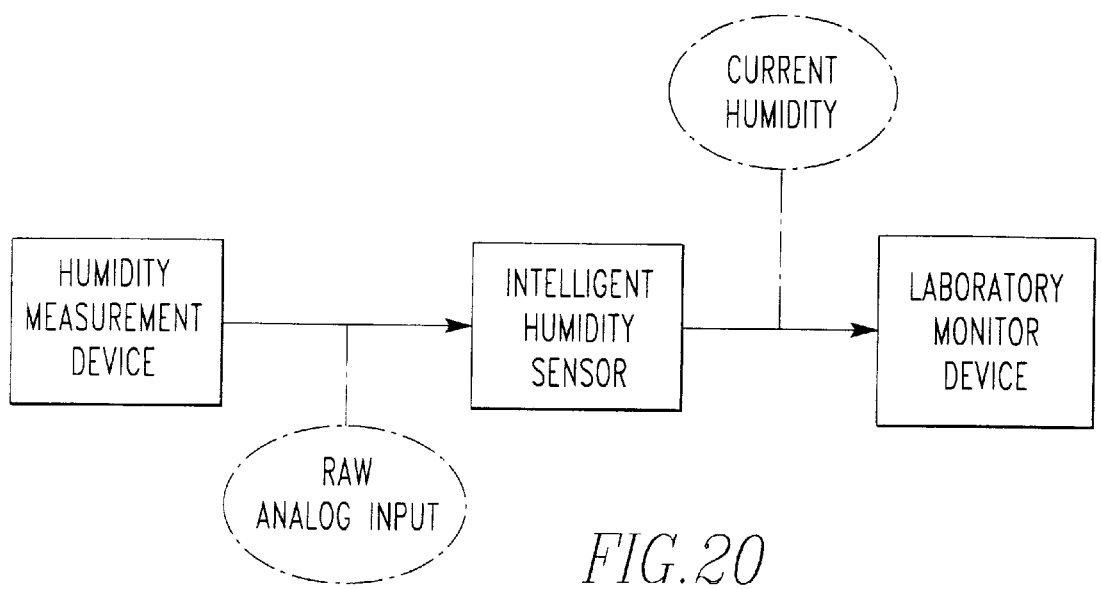
FIG. 20 is an Information Flow Diagram for the Intelligent Humidity Sensor.

The intelligent humidity sensor is just one component that can be incorporated into a fume hood, laboratory, or clean room control strategy. FIG. 20 displays the major components of a common system and their flow of information.

Figure 21:
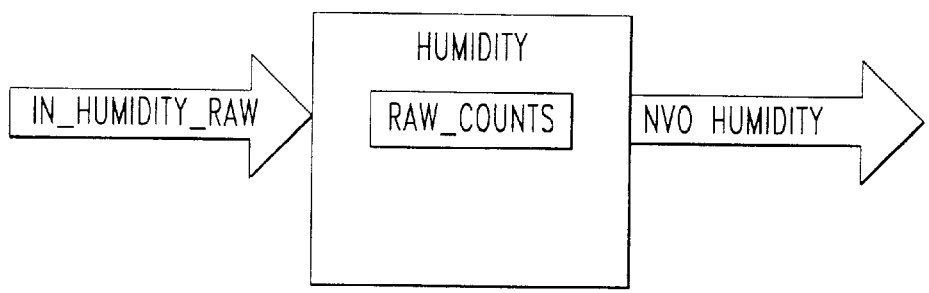
FIG. 21 shows Humidity Object's Inputs, Outputs, and Properties.

The humidity software object is used for determining the current humidity value. It contains properties that are used for computing the current value. These properties are a combination of configuration and calculated variables. FIG. 21 shows the properties, inputs, and outputs for the Humidity object.

The current humidity value is determined by an external measurement device. The device is wired to the humidity sensor's analog input. The measured value is presented to the analog input as a voltage (in_humidity_raw) that is converted to a raw digital value (raw_counts) through an analog to digital converter (ADC). The raw_counts value from the ADC is converted to humidity through a software calculation. The calculation is based on the characteristics of the measuring device. The current humidity value is then made available to the communications network through the nvoHumidity property.

The Intelligent Humidity sensor measures the humidity in space or duct. This is desirable because control actions can be taken to reduce energy costs and/or increase comfort in an occupied space. An example of the typical configuration used with the humidity sensor is shown in FIG. 22.

The system incorporates a 3120 Neuron Processor that simplifies hardware and software development. The current design incorporates an analog input to measure the humidity. A program reads the humidity input and converts this into a current humidity value.

Figure 22:
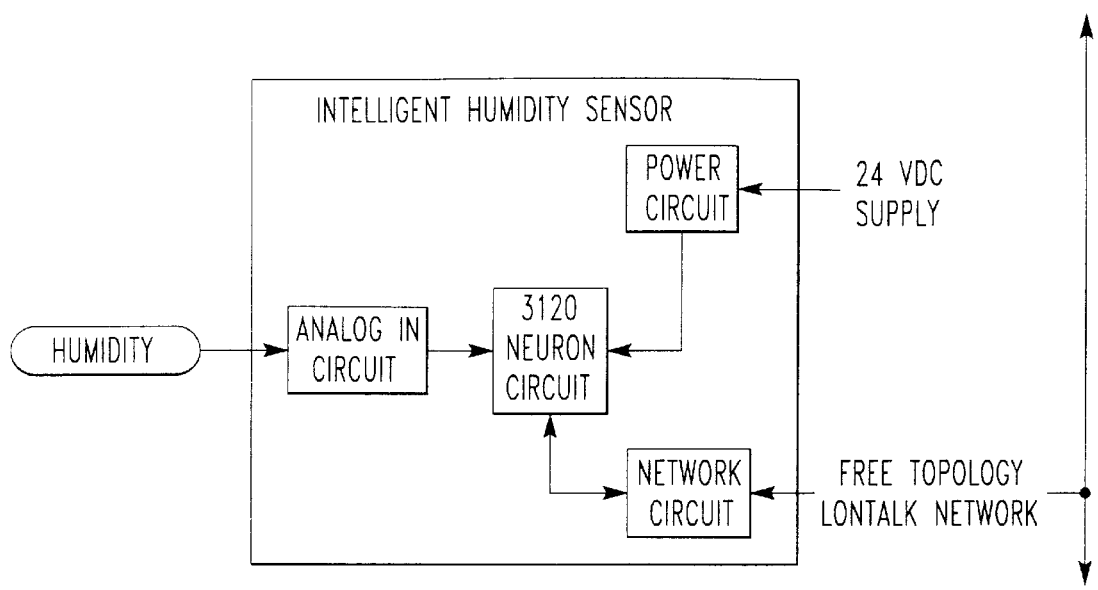
FIG. 22 shows Major Components of Intelligent Humidity sensor.

As FIG. 22 illustrates there are 5 major components to the Intelligent Humidity sensor, the 3120 Neuron Processor Circuit, Power Circuit, Network Circuit, and the Analog Input Circuit. Each of these components is discussed in the following sub-sections.

The 3120 Neuron Processor Circuit is composed of the 3120 Neuron Processor and support for the clock, service pin, and reset.

The 3120 Neuron Processor is the major component of the occupancy sensor. The 3120 Neuron Processor is composed of three separate logical units, the Media Access Control (MAC) Processor, Network Processor, and the Application Processor.

The MAC Processor handles layers one and two of the seven-layer network protocol stack. This includes driving the communications subsystem hardware as well as executing the collision avoidance algorithm. The MAC Processor works in conjunction with the Network Processor and they communicate using network buffers located in the onboard shared memory.

The Network Processor implements layers three through six of the network protocol stack. It handles communication network variable processing, addressing, transaction processing, authentication, background diagnostics, software timers, network management, and routing functions. The Network Processor works in conjunction with the Application Processor and they communicate using application buffers located in the onboard shared memory.

The Application Processor implements layer seven of the network protocol stack and execute the operating system and the application code. The operating system consists of a built-in multitasking scheduler that allows for parallel events.

The Power Circuit is composed of a LM2574M-5V Switching Regulator, capacitors, a Zener Diode, a Diode, and an Inductor. This circuit is a common power supply circuit.

The Network Circuit is composed of a FTT-10A Free Topology Transceiver, capacitors, and surge protectors. This circuit is recommended by the Echelon Corporation for the FTT-10A Transceiver.

The Dual-Slope Integrating A/D is composed of OP Amps, resistors, capacitors, and a CD4016 Analog Switch. This circuit is recommended by the Echelon Corporation for supporting the Dual-Slope Integrating A/D object.

Figure 23:
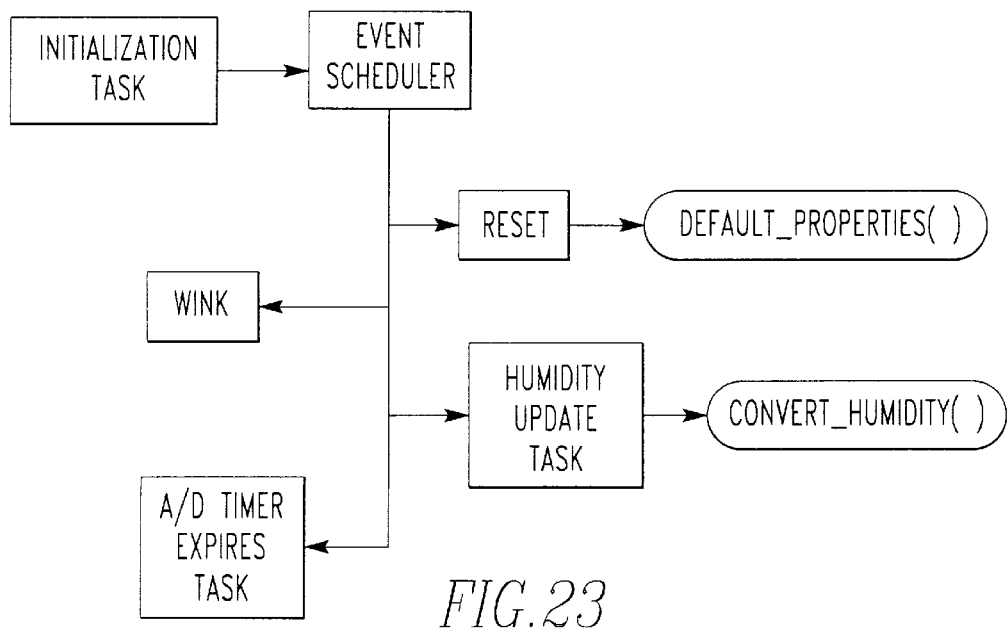
FIG. 23 Major Software Components of the Intelligent Humidity Sensor.

The 3120 Neuron simplifies software development, since many device drivers are pre-written as I/O objects. FIG. 23 illustrates the major components of the application program for the humidity sensor.

The Initialization Task is automatically run after the humidity sensor reset or powered on. The Initialization Task allocates memory and sets default values for Communication Network Variables, Input/Output Objects, Timer Objects, Global Variables, Network Buffers, and Application Buffers. After the Initialization Task executes it passes control over to the event scheduler.

The humidity sensor has the following system communication network variables:

| Name | Direction | Type | Description |
| --- | --- | --- | --- |
| nvoHumidity | output | SNVT_lev_percent | Current Humidity |

The nvoHumidity communication network variable is used for broadcasting the current humidity across the network. This communication network variable is updated when an analog to digital conversion is performed.

The Neuron processor has built-in input/output objects that simplify the development of controllers since the device drivers are pre-written. The Humidity sensor is using a dual slope A/D converter I/O object called ADConvertor. This A/D converter performs measurements with 16-bits of resolution for as little as a 13 ms integration period. The ADConvertor requires a millisecond timer to provide continuous A/D conversion.

The ConvertTimer millisecond timer object is provided for continuous reading of the A/D converter. This is repeating timer The UpdateHumidity millisecond time object is provided for continually updating the nvoHumidity communication network variable. This is a repeating timer.

The Event Scheduler allocates processor time to the application tasks. The Event Scheduler decides when it is time to run a task, and the higher priority tasks run first such as the Reset Task. The Event Scheduler passes control to a task and the completed task relinquishes control to the Event Scheduler. The Event Scheduler is responsible for updating the Watchdog timer.

The Reset Task is responsible for setting up the variables and I/O objects to a known state. All of the timer objects are set to their respective update rates. This causes the A/D I/O object, and Update Humidity object to be updated at the desired rate.

The A/D Timer Expires Task is responsible for starting the A/D conversion by writing the CONTROL_VALUE constant to ADConvertor I/O Object. This task is run when the ConvertTimer expires.

The A/D Update Task occurs when the A/D converter has completed its conversion of the unscaled humidity. This raw value must be converted to a humidity that has engineering units using the following algorithm:

min eng=minimum humidity max eng=maximum humidity min counts=minimum counts(voltage)

max counts=maximum counts(voltage)

$$humidity = \frac{(counts - min\,counts) \times (max\,eng - min\,eng)}{(max\,counts - min\,counts)} + min\,eng$$

After calculating the current humidity the output communication network variable nvoHumidity is updated.

The Humidity Sensor neuron monitors the humidity of the air for integration into control strategies which require the knowledge of such for applications such as enthalpy calculations.

Dual Slope Analog Input Circuit

The MC143120's IO1 (U2 pin 6) is connected to a CD4016 analog switch (U9) which along with the MC143120's IO4 (U2 pin3) which is connected to an analog circuit consisting of an LM358 Operational Amplifier (U7) section utilized as a unity gain buffer, a second an LM358 Operational Amplifier (U6) utilized as an integrator, and an LM393 Comparator (U4) together comprising a dual-slope A/D converter. The 74HC04 inverter (U8) is used to convert the CD4016 analog switch into a single pole double throw switching function. Normally, the humidity sensor will be a ratiometric device excited from the +5 V supply (TB3 pin 1) to the return (TB3 pin 3). The output of the sensor is connected to the input (TB3 pin 2) which goes to a voltage divider (R17 and R16) which scales the 0 to +5V input to 0 to +IV. Note that the 249 ohm resistor (R18) is used only when the input signal is from a 0–20 mA current loop transducer.

The MC143120 firmware initiates an analog to digital conversion by calling the dual-slope I/O object within the Neuron firmware which performs the following steps; [ASSURE INTEGRATOR DISCHARGE] The MC143120's IO1 (U2 pin 6) is taken low (if not already low) to ensure that the CD4016 analog switch has connected the VREF input to the unity buffer which will cause the integrator output (U6) to slew negative via integral action and cause the comparator output (U4) to go high once its' threshold has been crossed. This is monitored via the MC143120's IO4 (U2 pin 3). [AUTO ZERO] Once this output level has or had occurred, the MC143120 then takes its' IO1 (U2 pin 6) high to cause the CD4016 analog switch to connect the input value (T33 pin 2) to be measured to the analog circuit to integrate the input value. This causes the integrator output (U6) to slew positive. [INTEGRATE INPUT] Once the integrator output crosses the comparator threshold and the comparator output (U4) switches low indicating that the integrator output has crossed the zero count threshold going high, the MC143120, via an internal firmware-preset hardware down counter, then holds the analog switch connected to the input value for the firmware preset down counter period (integration period) which is the predetermined integration time. [DE-INTEGRATE AGAINST REFERENCE] Once this down counter has reached zero, hardware circuitry internal to the MC143120 then takes the IO1 (U2 pin 6) low immediately which switches the CD4016 analog switch (U9) and hence the input to the analog circuit back to the VREF causing the integrator output to now slew negative. At the same instant, the MC143120 begins incrementing the internal hardware counter and monitors the comparator output via IO4 until the output switches high indicating that the integrator has de-integrated to zero cross. The value in the MC143120 internal hardware counter now represents the analog input value which is used by the application firmware as the measured flow value.

Free Topology Transceiver Circuit

The MC143120's CP1, Transmit Data output (U2 pin 20) is connected to the FTT10 TXD input (U5 pin 5) and the CP0, Receive Data input (U2 pin 19) is connected to the FTT10 RXD output (U5 pin 4) on the FTT10 Free Topology Transceiver (U5) which converts the standard Neuron single ended mode Manchester data protocol levels to the data modulation scheme used on the Free Topology Network. The FTT10's CLK (U5 pin 6) is driven with the Neuron clock frequency from the MC143120's CLK2 (U2 pin 14). The FTT10's RES input is driven by the DS1233 Reset Controllers' output (U1 pin 1). The FTT10 produces its' output on the A (U5 pin 3) and B (U5 pin 2) pins which are coupled to the Free Topology network via the 47 uF 50 V capacitor to the FTT10 A and B output connections. This capacitor is used to block DC voltage components when the Free Topology network is used with network powered transceivers. The two 51 ohm resistors and switches are used to connect either a single point 51 ohm termination resistance for a free topology wired network or a 102 ohm termination resistance for each end of a daisy chain wired network. The BAV99 diodes on the A and B outputs are used in conjunction with the 0.001 uF 2000V capacitor and the PCB spark gaps to perform transient protection for the FTT10. The BAV99 diodes on the T1 (U5 pin 7) and the T2 (U5 pin 9) are used for transient protection on the FTT10s' secondary side of its' internal coupling transformer.

System Clock Circuit

The 10 MHZ crystal (Y1) along with the two 33 pF capacitors and the 270 and 100K ohm resistors connected to the MC143120's CLK1 (U2 pin 15) and CLK2 (U2 pin 14) form the system clock oscillator.

Service Pin Circuit

The Service LED (DS1) along with the 332 ohm resistor and the Service Button form the indication and actuation of the Service request/grant function which is connected to the MC143120's SER input (U2 pin 8) used by the Neuron for network object binding.

Processing Node Circuit

The MC143120 (U2) Single Chip Neuron has up to 2K Bytes of SRAM (Data and stack working memory) and up to 2K Bytes of EEPROM (Application Program and Data storage) in addition to 10K Bytes of on chip networking and kernal ROM. Note that this aforementioned device comprises a processing node that executes an application program in a manner well known to those skilled in Echelon circuit design.

System Reset Circuit

The DS1233 reset controller (U1) monitors the 5 volt power supply for an out of tolerance condition and as a result also generates the power on reset function. The reset output (U1 pin 2) is connected to the MC143120 (U2 pin 1) where it performs power on reset as well as the extension delay of a push button induced reset.

Power Supply Circuit

The LM2574M-5V step down switch mode regulator (U3) is used to develop the regulated +5 volts used for system power (VCC) from an unregulated input power of approximately 24 volts DC. The 220 uF 60 V input capacitor filters the input voltage. The 56V transzorb prevents transients on the input. The 330 uH inductor stores the switched energy via its magnetic field, the Shottky diode (D2) acts as a catch or free wheeling diode for negative excursions on the inductor, and the 330 uF 10 V capacitor filters the inductors output in order to supply a regulated +5 volt output. The 6.8V transorb (Z2) protects the +5 volt supply output against transients.

Figure 25:
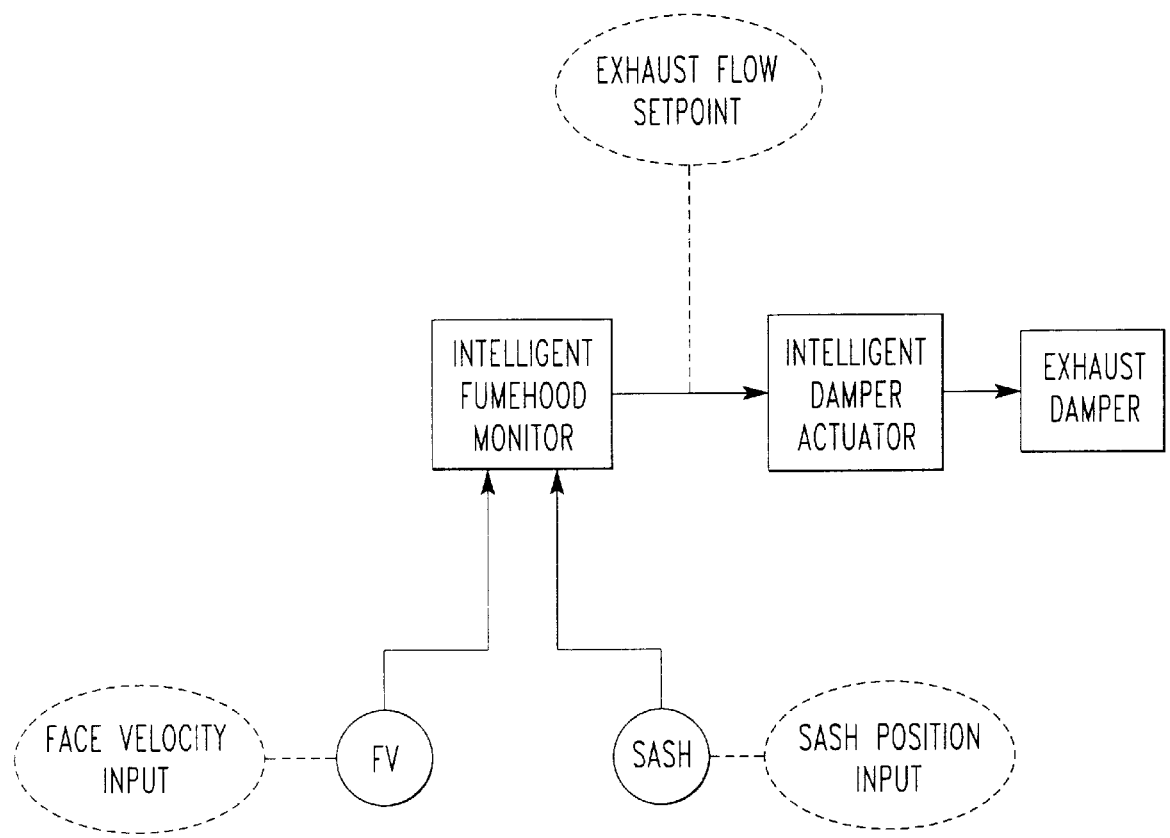
FIG. 25 is an Information Flow Diagram for the Intelligent Fumehood Monitor.

The system can also include an intelligent Fumehood Monitor. The intelligent Fumehood Monitor is just one component necessary to measure and control a fumehood. An Intelligent Damper Actuator is also required. FIG. 25 displays the major components and their flow of information.

The Intelligent Fumehood Monitor performs setpoint calculations for the fumehood exhaust actuator. The type of calculation performed will depend upon whether the fumehood is to be controlled based on face velocity or exhaust flow.

The Fumehood Monitor has analog inputs available for monitoring the face velocity and sash position. In addition, the fumehood exhaust flow is made available over the network from the Intelligent Actuator. The face velocity and/or sash position are used to calculate the air flow setpoints for the fumehood exhaust damper. The setpoints is sent over the network to the Intelligent Actuator.

In face velocity control mode the exhaust damper is used to maintain the face velocity setpoint within the fumehood. The Fumehood Monitor provides this setpoint to the exhaust damper actuator over the network. The Fumehood Monitor uses a face velocity sensor connected to an analog input to monitor the current face velocity.

In flow control mode the exhaust damper is used to maintain the exhaust flow setpoint. The Fumehood Monitor provides the setpoint to the damper actuators over the network. The Fumehood monitor uses a sash position sensor connected to analog input to monitor the current sash open area. The sash area along with the face velocity setpoint are used to calculate the exhaust damper setpoint The Fumehood Monitor uses a face velocity sensor connected to an analog input to monitor the current face velocity.

The Fumehood Monitor contains an Operator Interface (OI) comprised of a LCD display and an eight key keypad. The OI is capable of dynamically displaying all of the various lab sensor readings. The setpoints and configuration parameters for the Intelligent Fumehood Monitor can be programmed through the OI.

Figure 26:
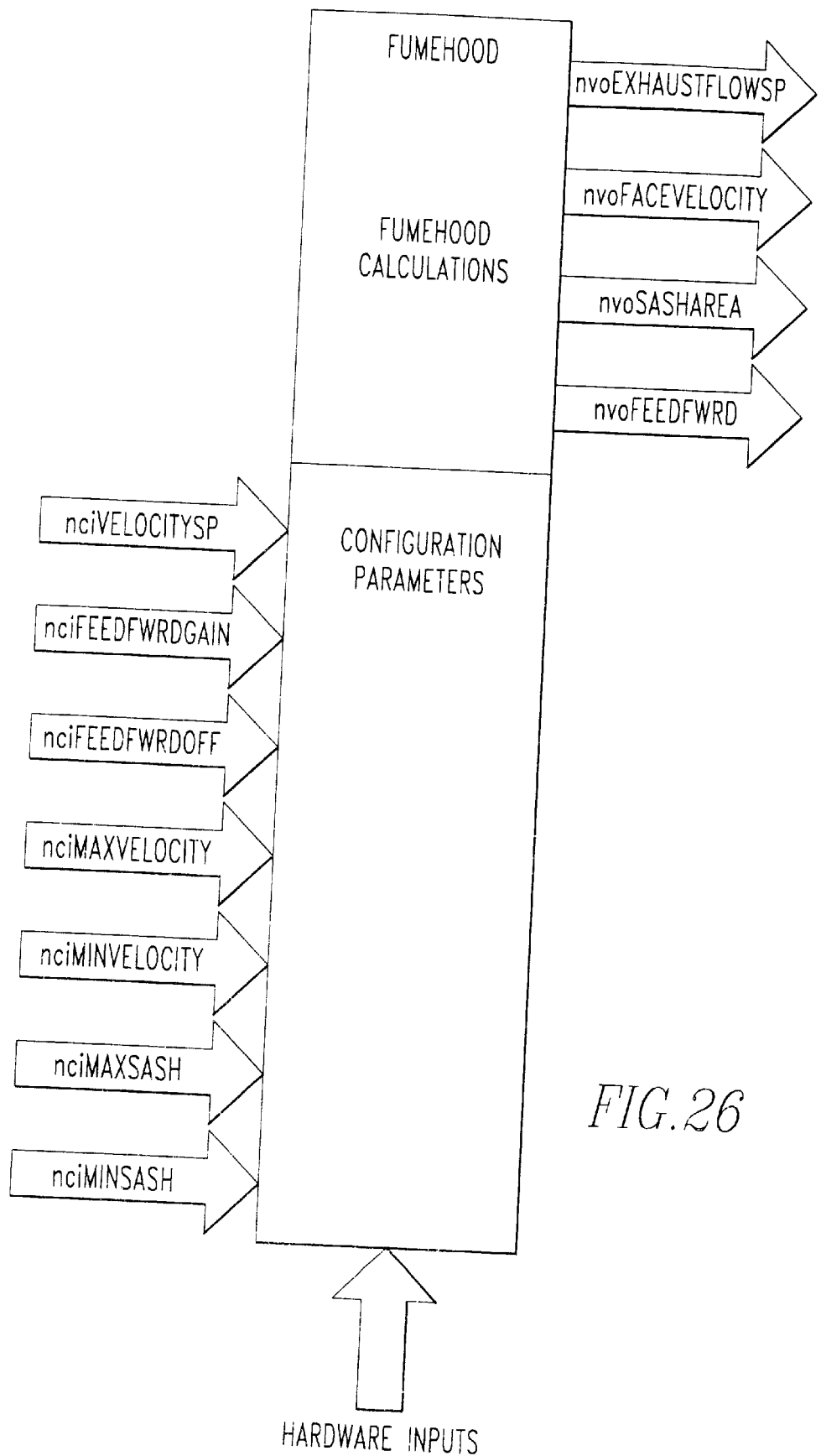
FIG. 26 shows the Intelligent Fumehood Monitor Object.

The analog face velocity signal is received by the Dual-Slope Integrating A/D circuit. This circuit is recommended by the Echelon Corporation and it performs A/D measurements with 16 bits of resolution at a sample rate of 13 milliseconds. Control of this A/D converter is quite simple, because the Dual Slope A/D Converter I/O object is provided by the Neuron Processor. This A/D converter is discussed in detail in the Neuron C Reference Guide. The A/D Timer Expires Task and the A/D Update Task in the application program handles the A/D conversion. The A/D Update Task reads the raw count face velocity signal and converts it to engineering units. The scaling values are adjustable through the network to provide flexibility with choosing the velocity transmitters. The sash position is converted in a similar fashion. FIG. 26 shows the Intelligent Fumehood Monitor Object.

Figure 27:
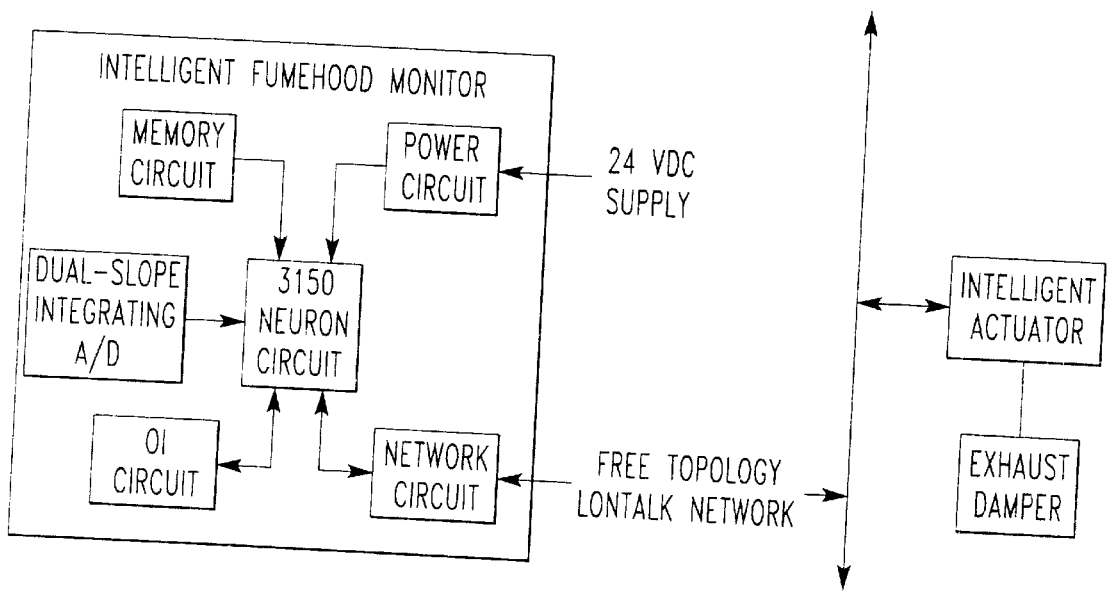
FIG. 27 shows major components of Intelligent Fumehood Monitor.

The Intelligent Fumehood Monitor calculates the exhaust flow setpoints for a fumehood. It is capable of performing the required calculations for both face velocity controlled and exhaust flow controlled fumehoods. In addition to performing calculations the Intelligent Fumehood Monitor provides an operator interface (OI) for monitoring fumehood sensors values and modifying setpoints. An example of the typical configuration used with the Intelligent Fumehood Monitor is shown in FIG. 27.

Figure 28:
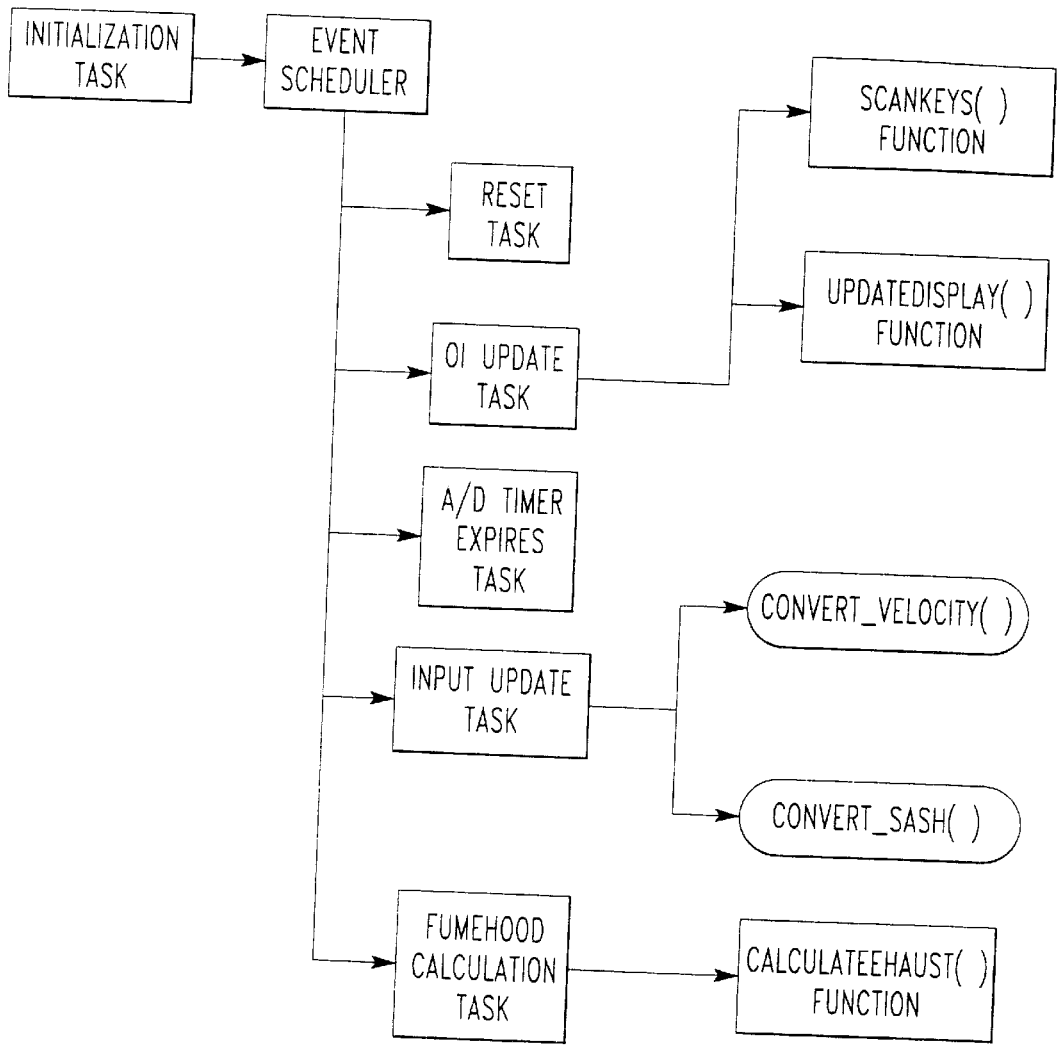
FIG. 28 shows major software components of Intelligent Fumehood Monitor.

The system incorporates a 3150 Neuron Processor that simplifies hardware and software development. A program calculates required setpoints based on configuration parameters and current fumehood conditions. The calculated setpoints are then sent to the Intelligent Actuators over the network. The Fumehood Monitor receives the current fumehood exhaust flow conditions and sensor readings over the network The 3150 Neuron simplifies software development, since many device drivers are pre-written as I/O objects. FIG. 28 illustrates the major components of the application program for the Face Velocity Sensor.

Configuration communication network variables are stored in non-volatile memory within the 3150 processor. The Intelligent Fumehood Monitor has the following system communication network variables:

| Name | Direction | Type | Description |
| --- | --- | --- | --- |
| nviExhaustFlow | input | SNVT_flow | Fumehood Exhaust Flow |
| nvoExhaustFlowSP | output | SNVT_flow | Calculated Exhaust Flow Setpoint |
| nciVelocitySp | config | SNVT_speed_mil | Face Velocity Setpoint |
| nciFeedFwrdGain | config | SNVT_multiplier | Feed Forward Gain |
| nciFeedFwrdOff | config | SNVT_lev_cont | Feed Forward Offset |
| nciMinVelocity | config | SNVT_speed_mil | Maximum Velocity Input |
| nciMaxVelocity | config | SNVT_speed_mil | Minimum Velocity Input |
| nciMinSash | config | SNVT_area | Maximum Sash Area |
| nciMaxSash | config | SNVT_area | Minimum Sash Area |

The nviExhaustFlow communication network variable is used for receiving the current fumehood exhaust flow. The exhaust flow will be sent on the network from an Intelligent Actuator Sensor.

The nvoExhaustFlowSP communication network variable is used for sending the fumehood exhaust flow setpoint. An Intelligent Actuator will receive the exhaust flow setpoint from the network.

The nciVelocitySP network configuration variable is used for setting the face velocity setpoint in the Intelligent Fumehood Monitor. This is an internal value used in the fumehood calculations.

The nciFeedFwrdGain network configuration variable is used for setting the feed forward gain in the Intelligent Fumehood Monitor. This is an internal value used in the fumehood calculations.

The nciFeedFwrdOff network configuration variable is used for setting the feed forward offset in the Intelligent Fumehood Monitor. This is an internal value used in the fumehood calculations.

The nciMaxVelocity network configuration variable is used for scaling the velocity input the Intelligent Fumehood Monitor. This is an internal value used in the fumehood calculations.

The nciMinVelocity network configuration variable is used for scaling the velocity input the Intelligent Fumehood Monitor. This is an internal value used in the fumehood calculations.

The nciMaxSash network configuration variable is used for scaling the sash input the Intelligent Fumehood Monitor. This is an internal value used in the fumehood calculations.

The nciMinSash network configuration variable is used for scaling the sash input the Intelligent Fumehood Monitor. This is an internal value used in the fumehood calculations.

The Neuron processor has built-in input/output objects that simplify the development of controllers since the device drivers are pre-written. The Fumehood Monitor is using a dual slope A/D converter I/O object called ADConvertor. This A/D converter performs measurements with 16-bits of resolution for as little as a 13 ms integration period. The ADConvertor requires a millisecond timer to provide continuous A/D conversion.

The OIUpdateTimer millisecond timer object is provided for the continuous scanning of the keypad and updating of the display. When this timer expires the OI Update Task is run.

The FumehoodTimer millisecond timer object is provided for the continuous calculation of the fumehood exhaust flow setpoints. When this timer expires the Fumehood Calculation Task is run.

The Initialization Task is automatically run after the Intelligent Fumehood Monitor is reset or powered on. The Initialization Task allocates memory and sets default values for Communication Network Variables, Input/Output Objects, Timer Objects, Global Variables, Network Buffers, and Application Buffers. After the Initialization Task executes it passes control over to the event scheduler.

The Event Scheduler allocates processor time to the application tasks. The Event Scheduler decides when it is time to run a task, and the higher priority tasks run first such as the Reset Task. The Event Scheduler passes control to a task and the completed task relinquishes control to the Event Scheduler. The Event Scheduler is responsible for updating the Watchdog timer.

The Reset Task is responsible for setting up the variables and I/O objects to a know state. The timer object OIUpdateTimer is set to the scan rate of the keypad. The LadTimer is set to the update rate for the fumehood calculations. This is the rate at which the supply and exhaust flow setpoints will be updated.

The timer object OIUpdateTimer is a repeating timer that expires at the keypad update rate. The OI Update Task responsible for scanning the keypad and updating the display if required. The function ScanKeyso is called form this task to perform the keypad scanning. The function UpdateDiaplay() is called to refresh the display if required.

The A/D Timer Expires Task is responsible for starting the A/D conversion by writing a control value to the ADConvertor I/O Object. This task is run when the ConvertTimer expires.

The A/D Update Task occurs when the A/D converter has completed its conversion of the unscaled face velocity and sash position. These raw values must be converted to a engineering units using the following algorithms:

counts=velocity input counts max counts=velocity max counts min counts=velocity counts $$nvoFaveVelocity = \frac{(counts - mincounts) \times (nciMaxVelocity - nciMinVelocity)}{(maxcounts - mincounts)} + nciMinVelocity$$

counts=sash input counts max counts=sash max counts min counts=sash min counts $$nvoSashArea = \frac{(\text{counts} - \text{min counts}) \times (nciMaxSash - nciMinSash)}{(\text{max counts} - \text{min counts})} + nciMinSash$$

After calculating the current engineering values the output communication network variables nvoFaceVelocity and nvoSashArea are updated.

The timer object FumehoodTimer is a repeating timer that expires at the fumehood calculation update rate. The Fumehood Calculation Task is responsible for calculating the fumehood operating setpoints based on the current fumehood conditions. The function CalculateExhausto is called to update the exhaust air flow setpoint.

Exhaust flow setpoint calculations are performed using a sash position sensor connected to an analog input on the fumehood monitor. The Fumehood Monitor calculates the exhaust flow setpoint required to maintain the fumehood face velocity setpoint and outputs it on the network. The exhaust damper is responsible for maintaining the exhaust flow.

nvoExhaustFlowSP=nciVelocitySPxnvoSashArea nvoFeedFeedFwrd=(nvoExhaustFlowSPxnciFeedFwrdGain)+nciFeedFwrdOff A feed-forward component is calculated to position the damper close to setpoint quickly. Final positioning is performed by the damper control algorithm based on the exhaust flow setpoint provided by the Intelligent Fumehood monitor.

Figure 29:
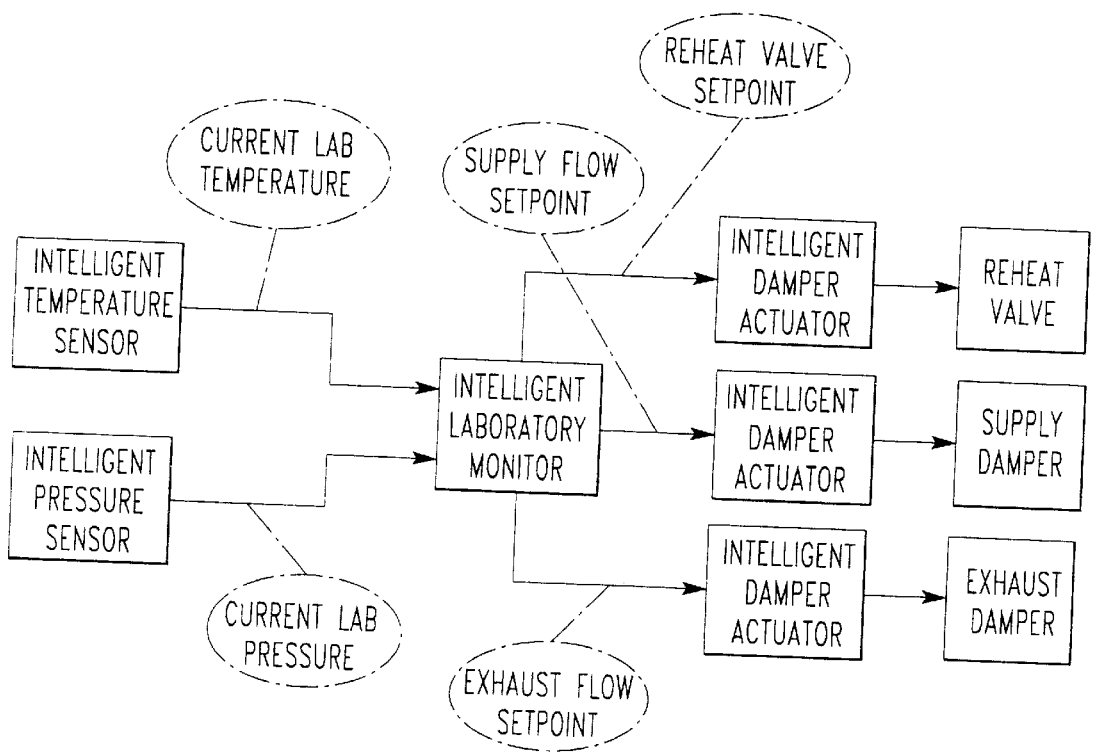
FIG. 29 is an Information Flow Diagram for the Intelligent Laboratory Monitor.

The system can also include an intelligent laboratory monitor. The intelligent laboratory monitor is just one component necessary to measure and control a laboratory. An Intelligent Pressure Sensor and Intelligent Damper Actuator are also required. All of the other devices are optional. FIG. 29 displays the major components and their flow of information.

The Intelligent Lab Monitor performs setpoint calculations for the exhaust and supply actuators. The type of calculation performed will depend upon whether the lab is to be controlled based on static pressure or flow differential.

The lab monitor receives the space static pressure and space temperature over the network from the Intelligent Pressure Sensor and Intelligent Temperature. In addition, the supply and exhaust flows are made available over the network from their associated Intelligent Actuators. The static pressure, space temperature, and supply flow are used to calculate the air flow setpoints for the exhaust damper, and supply dampers. The setpoints are sent over the network to each of the Intelligent Damper Actuators.

In pressure control mode the supply damper is used to maintain the static pressure setpoint within the lab. The Lab Monitor provides this setpoint to the supply damper actuator over the network. The Lab Monitor receives the current static pressure over the network form the Intelligent Pressure Sensor.

The Lab Monitor derives the exhaust damper setpoint from the minimum and maximum supply flow setpoints. If temperature control is required the minimum supply flow setpoint will be reset based on the current space temperature and supply air temperature. The space and supply temperatures are received from the network. The exhaust flow setpoint is sent to the exhaust actuator over the network.

In flow tracking control the supply damper in conjunction with the exhaust damper are used to maintain required differential flow setpoint. The Lab Monitor provides these setpoints to the damper actuators over the network.

The supply flow setpoint is derived from the minimum supply flow setpoint. If temperature control is required the supply flow setpoint is reset based on the current space temperature and supply air temperature. The space and supply temperatures are received from the network. In the case where fumehoods are installed the tracking control will take into account the makeup air required for the fumehoods when calculating the supply setpoint. The fumehood exhaust flows are received over the network.

The general exhaust flow setpoint calculation is based on the difference between the current supply flow and the differential flow required for maintaining pressurization in the lab. The current supply flow value is received over the network. The exhaust flow setpoint sent to the exhaust actuator over the network.

Figure 30:
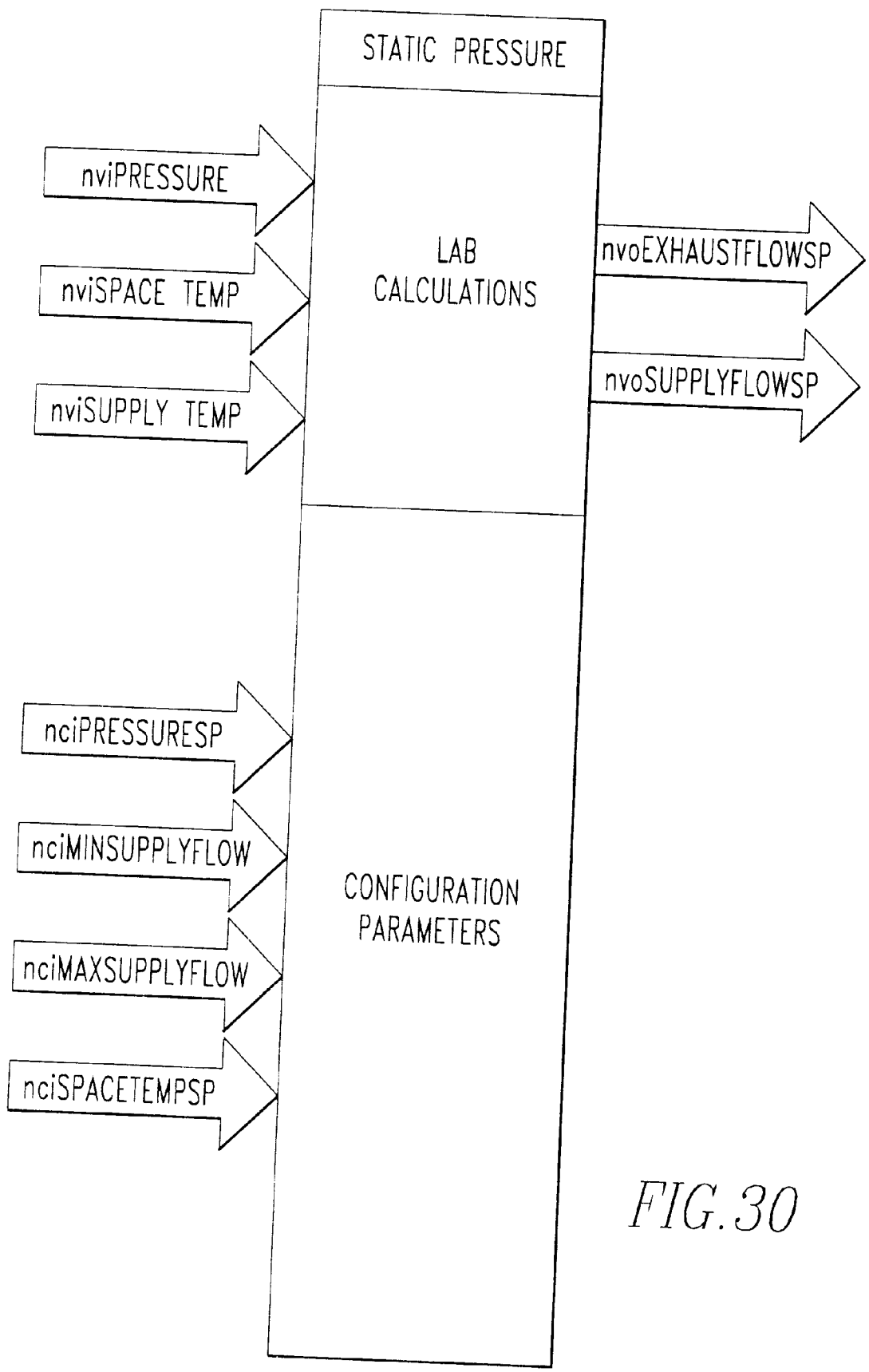
FIG. 30 show an Intelligent Lab monitor Pressure Object.
Figure 31:
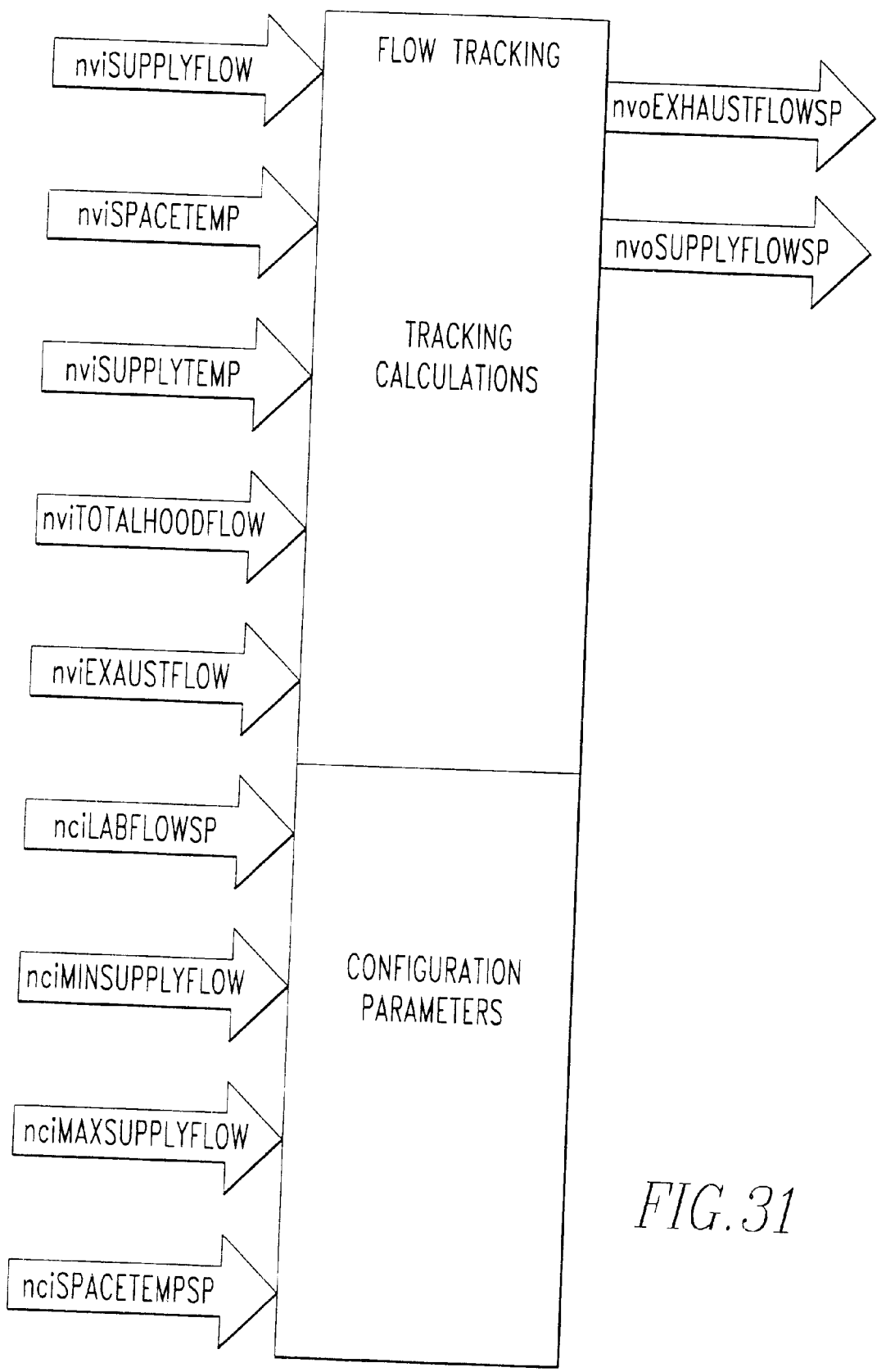
FIG. 31 shows an Intelligent Lab Monitor Flow Tracking Object.

The Lab Monitor contains an Operator Interface (OI) comprised of a LCD display and an eight key keypad. The OI is capable of dynamically displaying all of the various lab sensor readings. The setpoints and configuration parameters for the Intelligent Lab Monitor can be programmed through the OI. FIGS. 30 and 31 show an Intelligent Lab monitor Pressure Object and an Intelligent Lab Monitor Flow Tracking Object, respectively.

Figure 32:
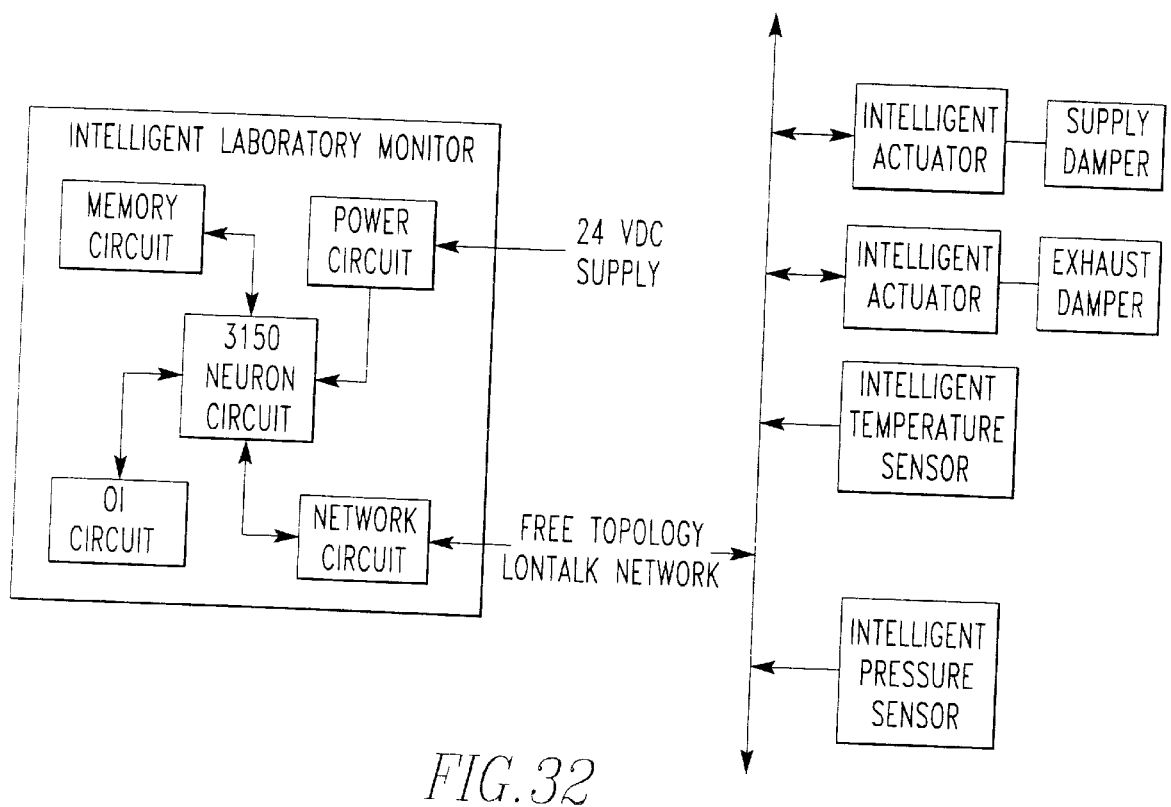
FIG. 32 shows Major Components of Intelligent Laboratory Monitor.

The Intelligent Laboratory Monitor calculates supply and exhaust flow setpoints for a laboratory. It is capable of performing the required calculations for both static pressure controlled and flow tracking controlled labs. In addition to performing calculations the Intelligent Laboratory Monitor provides an operator interface (OI) for monitoring lab sensors values and modifying setpoints. An example of the typical configuration used with the Intelligent Laboratory Monitor is shown in FIG. 32.

The system incorporates a 3150 Neuron Processor that simplifies hardware and software development. A program calculates required setpoints based on configuration parameters and current lab conditions. The calculated setpoints are then sent to the appropriate Intelligent Actuators over the network. The lab monitor receives the current lab conditions and sensor readings over the network.

Figure 33:
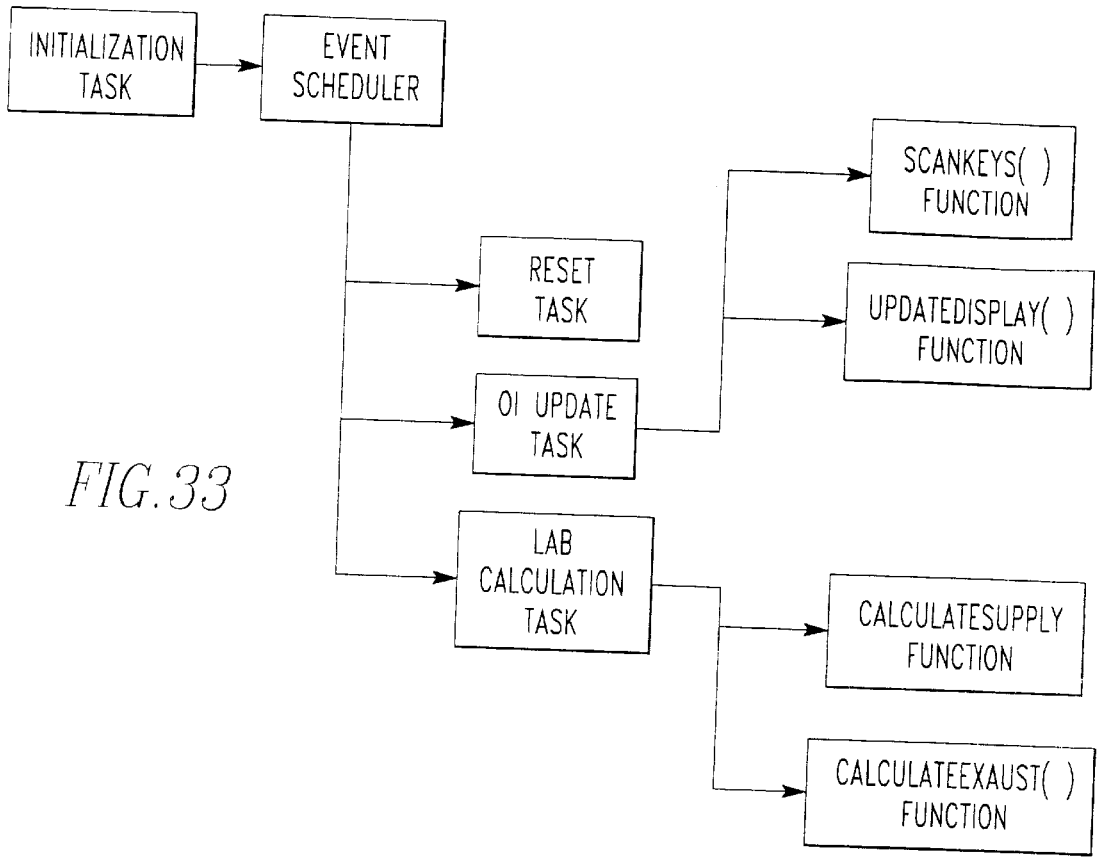
FIG. 33 shows Major Software Components of Intelligent Laboratory Monitor.

The 3150 Neuron simplifies software development, since many device drivers are pre-written as I/O objects. FIG. 33 illustrates the major components of the application program for the Face Velocity Sensor.

The Intelligent Laboratory Monitor has the following system communication network variables:

| Name | Direction | Type | Description |
| --- | --- | --- | --- |
| nviPressure | input | SNVT_press_p | Lab Static Pressure |
| nviSupplyFlow | input | SNVT_flow | Lab Supply Flow |
| nviExhaustFlow | input | SNVT_flow | Lab Exhaust Flow |
| nviSpaceTemp | input | SNVT_temp_p | Lab Space Temperature |
| nviSupplyTemp | input | SNVT_temp_p | Supply Air Temperature |
| nvoSupplyFlowSp | output | SNVT_flow | Calculated Supply Flow Setpoint |
| nvoExhaustFlowSp | output | SNVT_flow | Calculated Exhaust Flow Setpoint |
| nciPressureSp | config | SNVT_press_p | Static Pressure Setpoint |
| nciLabFlowSp | config | SNVT_flow | Differential Flow |

-continued

| Name | Direction | Type | Description |
|---|---|---|---|
| nciMinSupplyFlow | config | SNVT_flow | Setpoint Minimum Supply Flow |
| nciMaxSupplyFlow | config | SNVT_flow | Maximum Supply Flow |
| nciMinExhaustFlow | config | SNVT_flow | Minimum Exhaust Flow |
| nciMaxExhaustFlow | config | SNVT_flow | Maximum Exhaust Flow |
| nciSpaceTempSP | config | SNVT_temp_p | Space Temperature Setpoint |

The nviPressure communication network variable is used for receiving the current static pressure in the lab. The static pressure will be sent on the network from an Intelligent Pressure Sensor.

The nviSupplyFlow communication network variable is used for receiving the current supply flow. The supply flow will be sent on the network from an Intelligent Actuator Sensor.

The nviExhaustFlow communication network variable is used for receiving the current exhaust flow. The exhaust flow will be sent on the network from an Intelligent Actuator Sensor.

The nviSpaceTemp communication network variable is used for receiving the current space temperature. The space temperature will be sent on the network from an Intelligent Temperature Sensor.

The nviSupplyTemp communication network variable is used for receiving the current supply air temperature. The supply air temperature will be sent on the network from an Intelligent Temperature Sensor.

The nvoSupplyFlowSP communication network variable is used for sending the supply flow setpoint. An Intelligent Actuator will receive the supply flow setpoint from the network.

The nvoExhaustFlowSP communication network variable is used for sending the exhaust flow setpoint. An Intelligent Actuator will receive the exhaust flow setpoint from the network.

The nciPressureSP network configuration variable is used for setting the static pressure setpoint in the Intelligent Laboratory Monitor. This is an internal value used in the lab calculations.

The nciLabFlowSP network configuration variable is used for setting the lab flow setpoint in the Intelligent Laboratory Monitor. This is an internal value used in the lab calculations.

The nciMinSupplyFlow network configuration variable is used for setting the minimum supply flow in the Intelligent Laboratory Monitor. This is an internal value used in the lab calculations.

The nciMaxSupplyFlow network configuration variable is used for setting the maximum supply flow in the Intelligent Laboratory Monitor. This is an internal value used in the lab calculations.

The nciMinExhaustFlow network configuration variable is used for setting the minimum exhaust flow in the Intelligent Laboratory Monitor. This is an internal value used in the lab calculations.

The nciMaxExhaustFlow network configuration variable is used for setting the maximum exhaust flow in the Intelligent Laboratory Monitor. This is an internal value used in the lab calculations.

The nciSpaceTempSP network configuration variable is used for setting the space temperature setpoint in the Intelligent Laboratory Monitor. This is an internal value used in the lab calculations.

The OIUpdateTimer millisecond timer object is provided for the continuous scanning of the keypad and updating of the display. When this timer expires the OI Update Task is run.

The LabTimer millisecond timer object is provided for the continuous calculation of the exhaust and supply flow setpoints. When this timer expires the Lab Calculation Task is run.

The Initialization Task is automatically run after the Intelligent Laboratory Monitor is reset or powered on. The Initialization Task allocates memory and sets default values for Communication Network Variables, Input/Output Objects, Timer Objects, Global Variables, Network Buffers, and Application Buffers. After the Initialization Task executes it passes control over to the event scheduler.

The Event Scheduler allocates processor time to the application tasks. The Event Scheduler decides when it is time to run a task, and the higher priority tasks run first such as the Reset Task. The Event Scheduler passes control to a task and the completed task relinquishes control to the Event Scheduler. The Event Scheduler is responsible for updating the Watchdog timer.

The Reset Task is responsible for setting up the variables and I/O objects to a know state. The timer object OIUpdateTimer is set to the scan rate of the keypad. The LadTimer is set to the update rate for the lab calculations. This is the rate at which the supply and exhaust flow setpoints will be updated.

The timer object OIUpdateTimer is a repeating timer that expires at the keypad update rate. The OI Update Task responsible for scanning the keypad and updating the display if required. The function ScanKeys( ) is called form this task to perform the keypad scanning. The function UpdateDiaplay( ) is called to refresh the display if required.

The timer object LabTimer is a repeating timer that expires at the lab calculation update rate. The Lab Calculation Task is responsible for calculating the lab operating setpoints based on the current lab conditions. The function CalculateSupply( ) is called to update the supply air flow setpoint. The function CalculateExhaust ( ) is called to update the exhaust air flow setpoint.

The Intelligent Laboratory Monitor is capable of calculating the lab operating setpoints based on static pressure or flow tracking. Both of these techniques maintain lab pressure to a specified setpoint, In the case of static pressure the setpoint is pressure. In the case of flow tracking the setpoint is differential flow.

Static pressure calculations are performed using a static pressure sensor and space temperature. The current static pressure is measured by an Intelligent Pressure sensor and sent to the lab monitor over the network. An Intelligent Temperature Sensor provides the space temperature. The lab monitor calculates the supply and exhaust flow setpoints required to maintain the lab static pressure setpoint and outputs them on the network.

The supply damper is responsible for maintaining the static pressure. The supply setpoint in this case is the static pressure setpoint.

nvoSupplyFlowSP=nciPressureSP

The exhaust damper is responsible for maintaining the minimum amount of airflow through the lab for the required amount of air changes per hour. This accomplished by using the minimum supply low setpoint as the setpoint for the exhaust damper. Furthermore, if temperature control is required the supply setpoint is reset based on the current space temperature.

$$nvoExhaustFlowSp = \frac{(nviSpaceTemp - MinTemp) \times (nciMaxSupplyFlow - nciMinSupplyFlow)}{(MaxTemp - MinTemp)} + nciMinSupplyFlow$$

Flow tracking calculations are performed using the supply flow, space temperature and total fumehood exhaust. The supply flow is measured by an Intelligent Actuator and sent to the lab monitor over the network. An Intelligent Fumehood Monitor mounted to the fumehood measures the fumehood exhaust flow. An Intelligent Temperature Sensor provides the space temperature. The lab monitor calculates the supply and exhaust flow setpoints required to maintain the lab differential flow setpoint and outputs them on the network.

The supply damper is responsible for maintaining the minimum supply. The supply flow setpoint in this case is the minimum flow required to maintain the differential flow setpoint. If temperature control is required the space temperature will reset the minimum supply flow. In the case when there are fumehoods in the lab a makeup air calculation is perfumed. The supply flow setpoint will be the greater of the minimum supply flow reset by temperature or the makeup air flow.

Reset the minimum supply based on space temperature:

$$SupplyFlowReset = \frac{(nviSpaceTemp - MinTemp) \times (nciMaxSupplyFlow - nciMinSupplyFlow)}{(MaxTemp - MinTemp)} + nciMinSupplyFlow$$

Calculate makeup air for fumehoods if required:

Makeup=nciTotalHoodFlow−nciMinExhaustFlow−ncilabFlowSP

Supply setpoint is the greater of SupplyFlowReset or Makeup:

nvoSupplyFlowSP=SupplyFlowReset if(Makeup>SupplyFlowReset) then nvoSupplyFlowSP=Makeup The exhaust damper is responsible for maintaining the differential flow setpoint for the lab. The setpoint is calculated base on the current supply flow, fumehood exhaust and differential flow setpoint.

nvoExhaustFlowSP=nviSupplyFlow+nciLabFlowSP−nciTotalHoodFlow

Figure 34A:
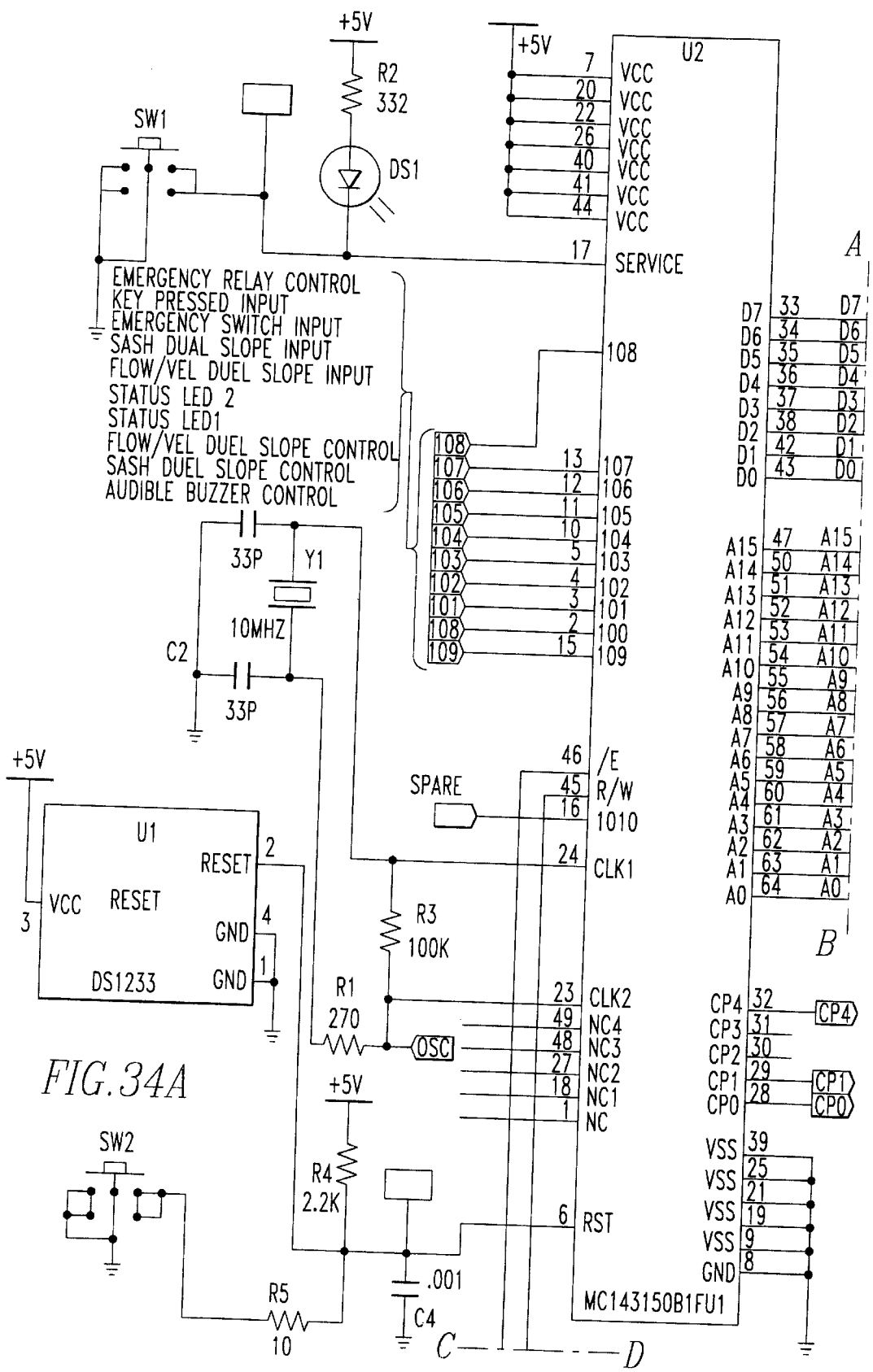
FIGS. 34a, 34b, 34c, 35a, 35b, 35c, 36a and 36b are schematic representations of a lab/hood monitor.
Figure 34B:
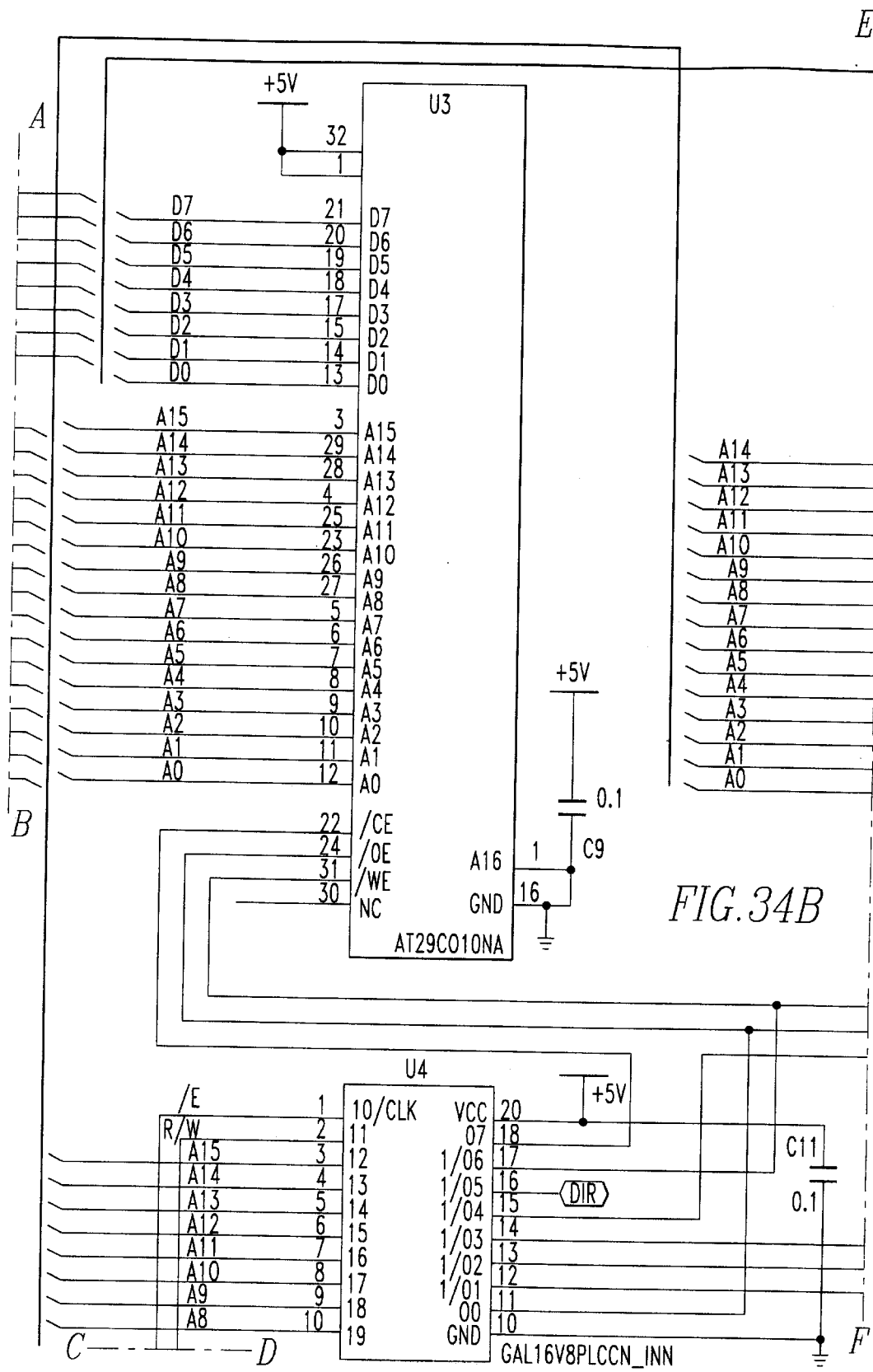
Figure 34C:
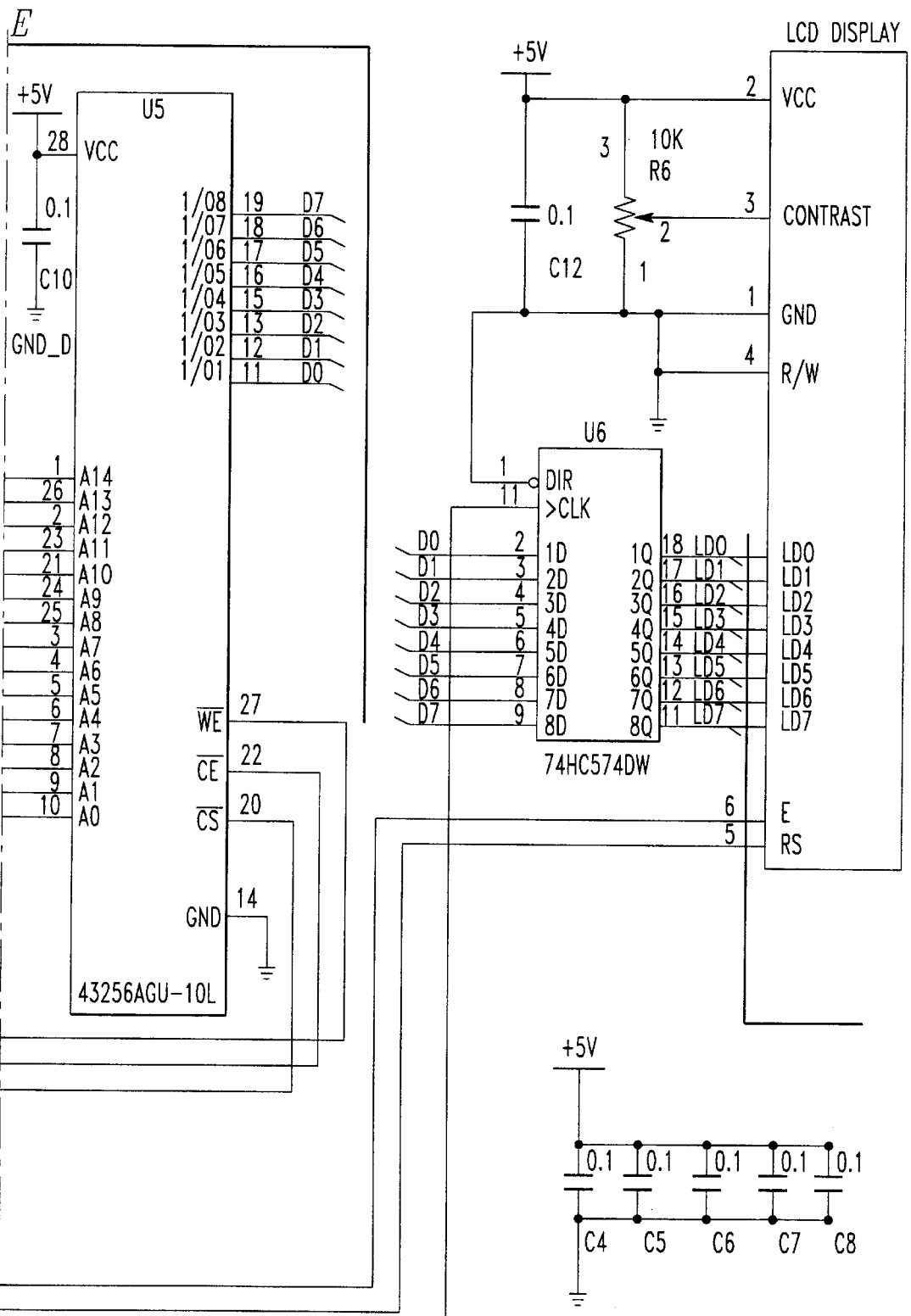
Figure 35A:
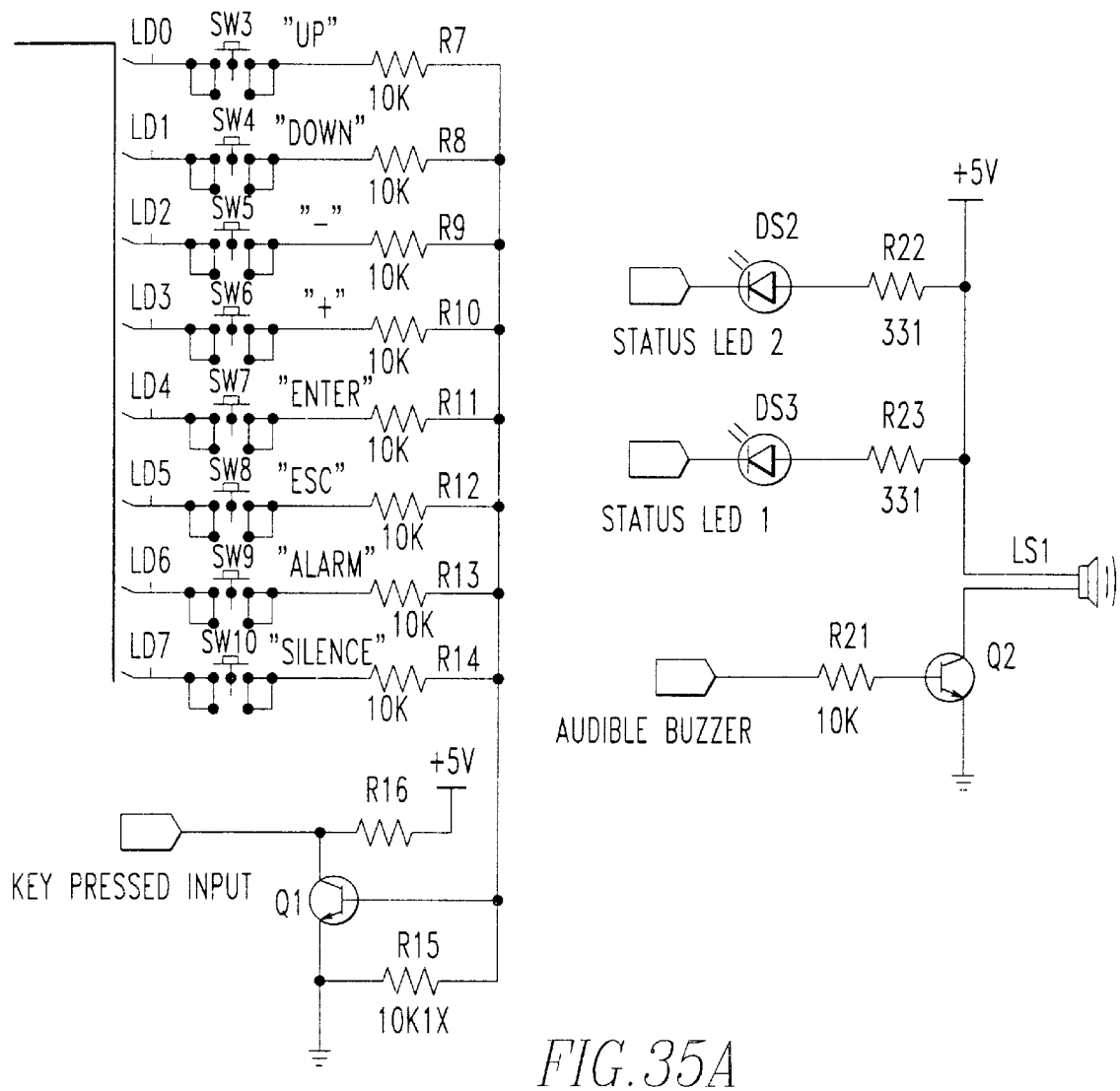
Figure 35B:
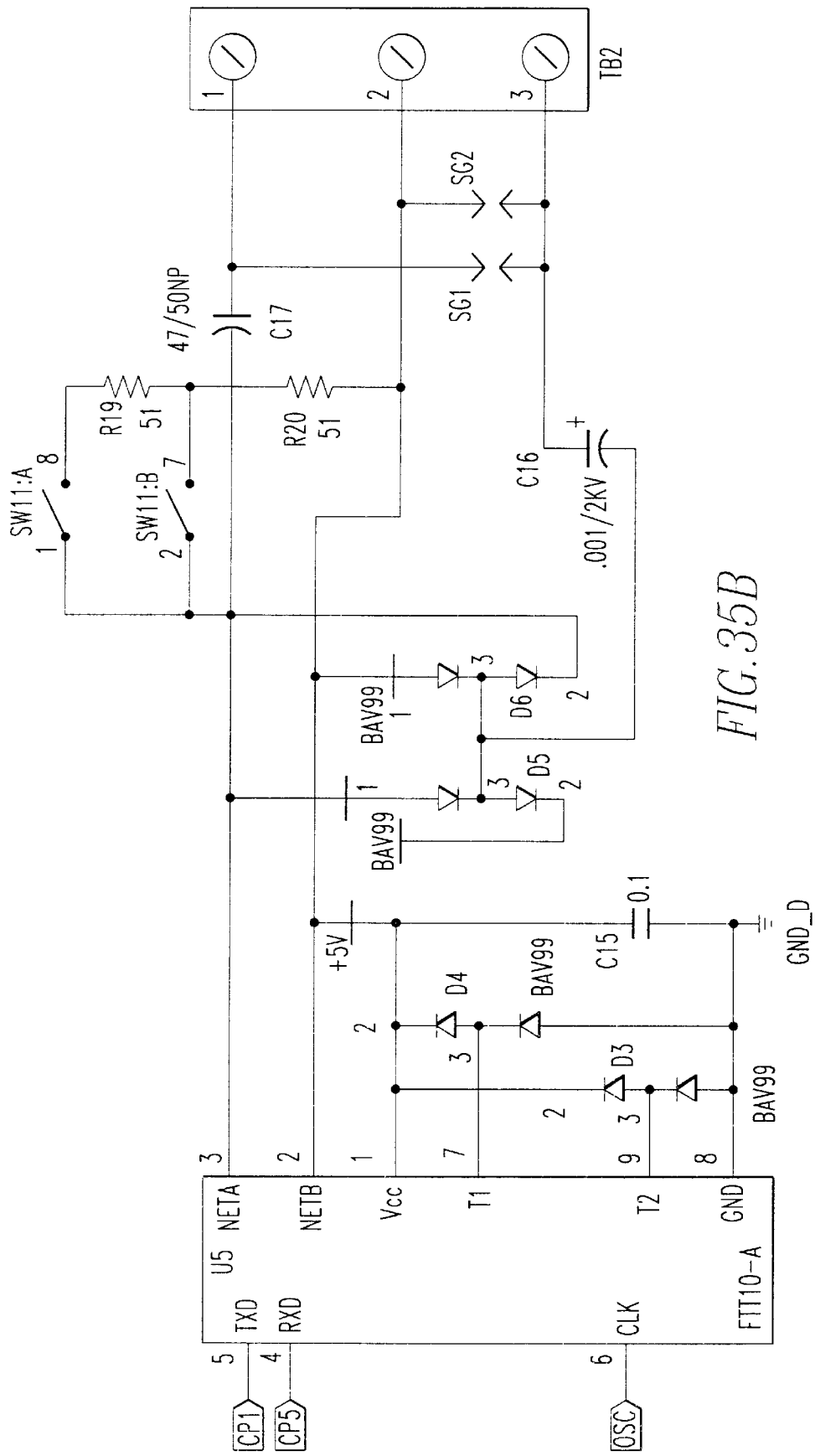
Figure 35C:
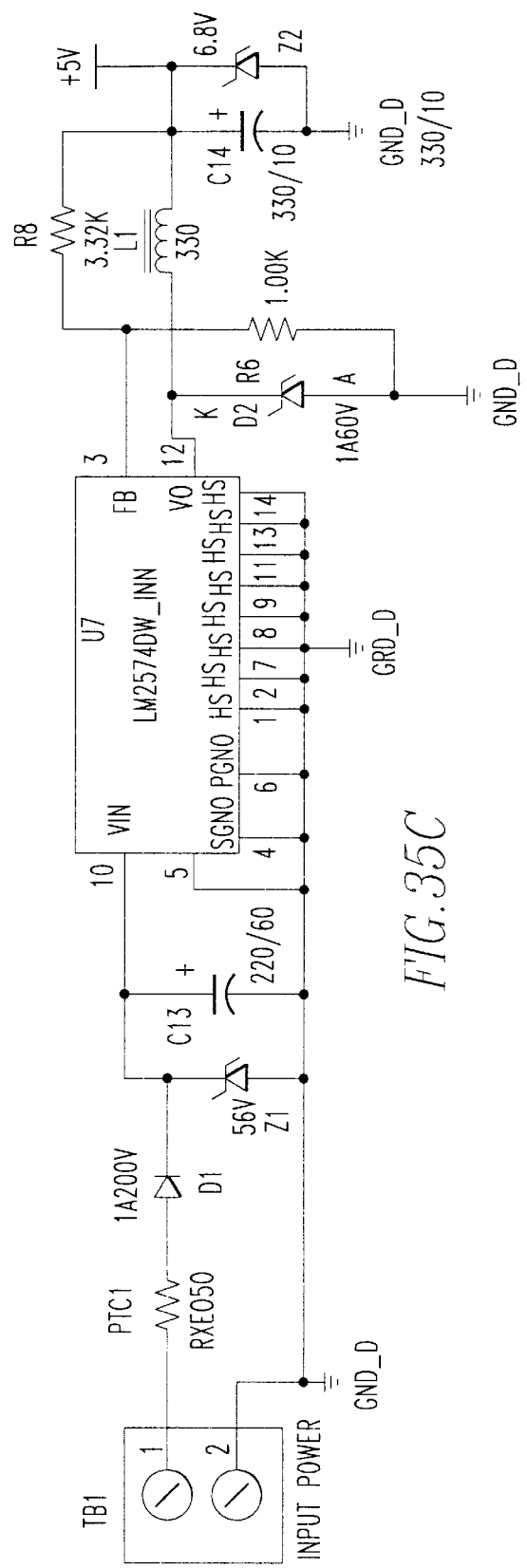
Figure 36A:
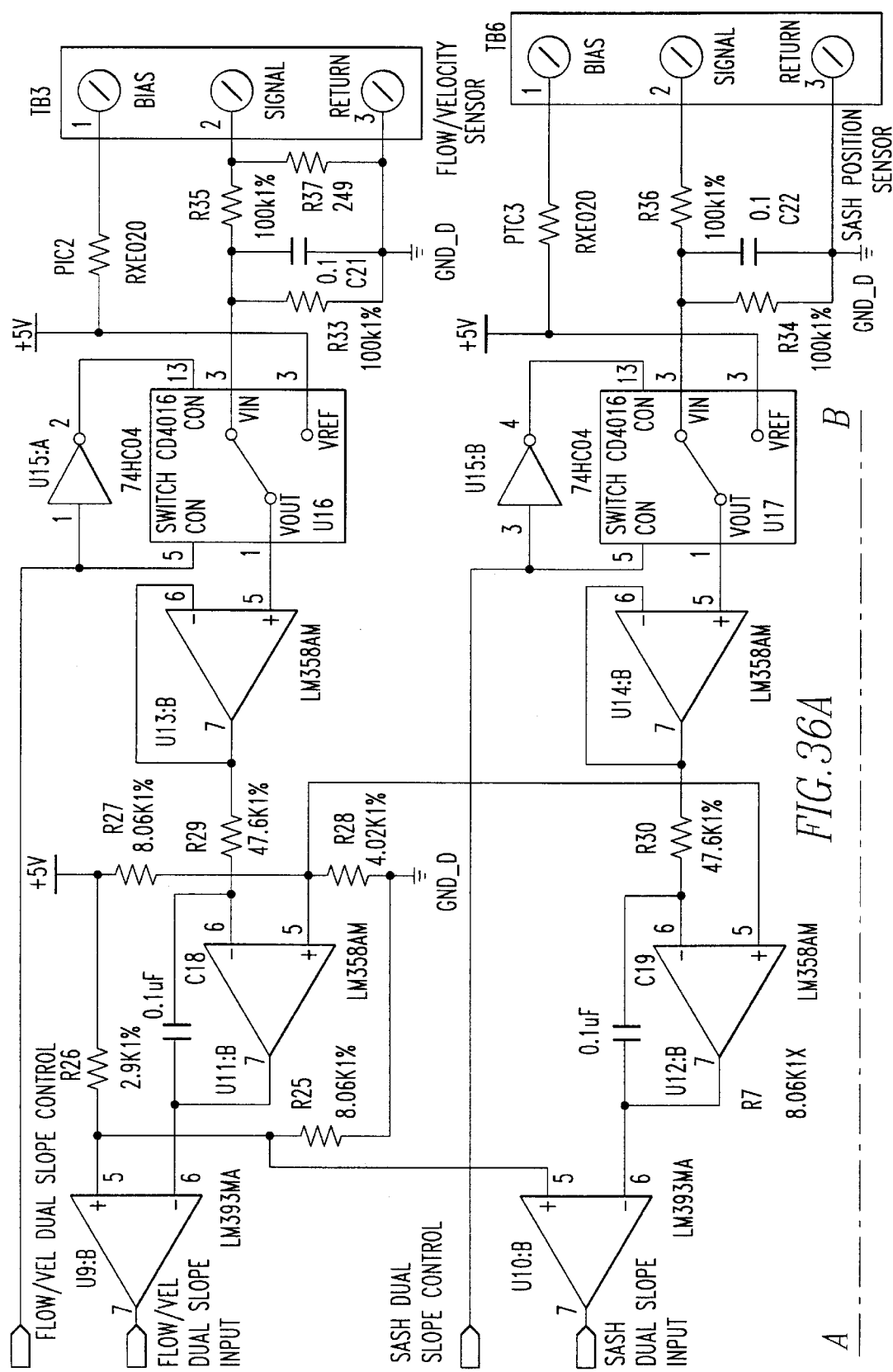
Figure 36B:
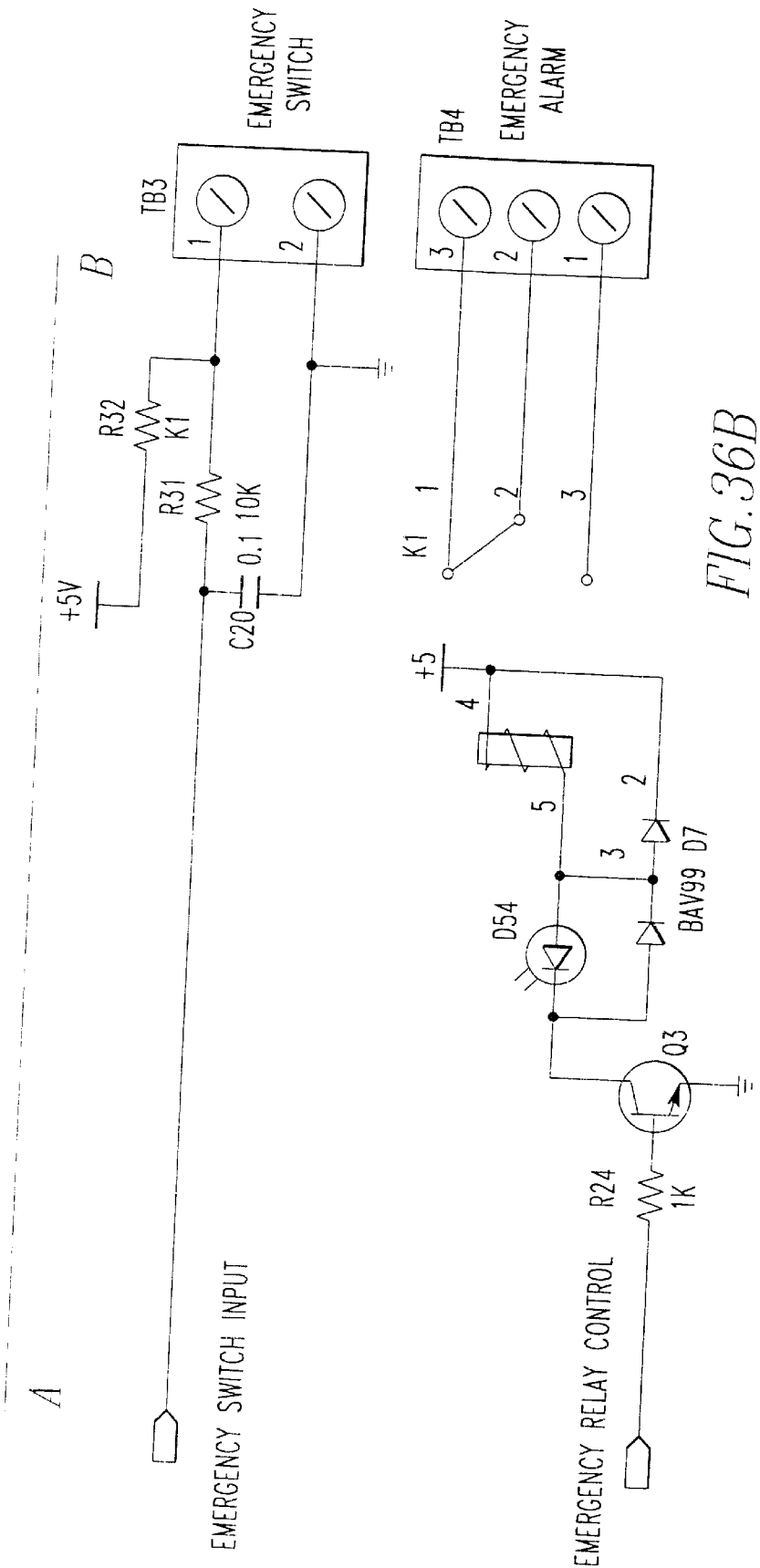

Referring to FIGS. 34, 35 and 36, a Lab/Hood Monitor is described. This can be used for either the fume hood or laboratory monitor.

Dual Slope Analog Input Circuits

The MC143150's IO1 (U2 pin 3) is connected to a CD4016 analog switch (U16) which along with the MC143150's IO4 (U2 pin 10) which is connected to an analog circuit consisting of an LM358 Operational Amplifier (U13) section utilized as a unity gain buffer, a second an LM358 Operational Amplifier (U11) utilized as an integrator, and an LM393 Comparator (U9) together comprising a dual-slope A/D converter. The 74HC04 inverter (U15) is used to convert the CD4016 analog switch into a single pole double throw switching function. Normally, the temperature sensor will be a pressure or flow transducer producing either a (typical) 0 to +5 volt or 0 to 20 milliamp signal which is fed to the input connector (TB5 pin 2). This signal is divided by the series pair (R33 and R35) which scales the 0 to +5V input to 0 to +1V. Note that the 249 ohm resistor (R37) is used only when the input signal is from a 0–20 mA current loop transducer.

The MC143150 firmware initiates an analog to digital conversion by calling the dual-slope I/O object within the Neuron firmware which performs the following steps; [ASSURE INTEGRATOR DISCHARGE] The MC143150's IO1 (U2 pin 3) is taken low (if not already low) to ensure that the CD4016 analog switch has connected the VREF input to the unity buffer which will cause the integrator output (U11) to slew negative via integral action and cause the comparator output (U9) to go high once its' threshold has been crossed. This is monitored via the MC143150's IO4 (U2 pin 10). [AUTO ZERO] Once this output level has or had occurred, the MC143150 then takes its' IO1 (U2 pin 3) high to cause the CD4016 analog switch to connect the input value (TB5 pin 2) to be measured to the analog circuit to integrate the input value. This causes the integrator output (U11) to slew positive. [INTEGRATE INPUT] Once the integrator output crosses the comparator threshold and the comparator output (U9) switches low indicating that the integrator output has crossed the zero count threshold going high, the MC143150, via an internal firmware-preset hardware down counter, then holds the analog switch connected to the input value for the firmware preset down counter period (integration period) which is the predetermined integration time. [DE-INTEGRATE AGAINST REFERENCE] Once this down counter has reached zero, hardware circuitry internal to the MC143150 then takes the IO1 (U2 pin 3) low immediately which switches the CD4016 analog switch (U16) and hence the input to the analog circuit back to the VREF causing the integrator output to now slew negative. At the same instant, the MC143150 begins incrementing the internal hardware counter and monitors the comparator output via IO4 until the output switches high indicating that the integrator has de-integrated to zero cross. The value in the MC143150 internal hardware counter now represents the analog input value which is used by the application firmware as the measured flow value.

Both dual slope circuits operate in an identical manner and may or may not be used on every application of the device.

Emergency Digital Output Circuit

The MC143150's IO8 (U2 pin 14) is connected to digital output circuitry for driving the emergency relay. The IO8 line is connected to an NPN transistor relay driver (Q3) who's collector switch the coil of the relay (K1). The BAV99 diode is for inductive coil kickback clamping and the LED (DS4) directly indicate the energized state of the relay. The relay is form C allowing the selection of either a normally open or normally closed switching function as desired for the field application. The emergency circuit is connected to TB4. The use of this circuit is not necessary limited to the emergency function.

Emergency Digital Input Circuit

The MC143150's IO6 (U2 pin 12) is connected to a digital input circuitry for monitoring the state of an emergency override switch. For example, an external normally closed (fail safe) contact closure (for example) would be connected between TB3 pin 1 and 2. Once the contact went open, the pull up resistor (R32) would pull the input high with the signal filtered for spurious noise by the RC combination of R31 and C20. Once the high level was detected by the MC143150, the associated application program would invoke the emergency sequence. The use of this circuit is not necessary limited to the emergency function.

Free Topology Transceiver Circuit

The MC143150's CP1, Transmit Data output (U2 pin 29) is connected to the FTT10 TXD input (U8 pin 5) and the CP0, Receive Data input (U2 pin 28) is connected to the FTT10 RXD output (U8 pin 4) on the FTT10 Free Topology Transceiver which converts the standard Neuron single ended mode Manchester data protocol levels to the data modulation scheme used on the Free Topology Network. The FTT10's CLK (U8 pin 6) is driven with the Neuron clock frequency from the MC143150's CLK2 (U2 pin 23). The FTT10 produces its' output on the A (U8 pin 3) and B (U8 pin 2) pins which are coupled to the Free Topology network via the 47 uF 50 V capacitor to the FTT10 A and B output connections (TB2 pins 2 and 3). This capacitor is used to block DC voltage components when the Free Topology network is used with network powered transceivers. The two 51 ohm resistors and switches are used to connect either a single point 51 ohm termination resistance for a free topology wired network or a 102 ohm termination resistance for each end of a daisy chain wired network. The BAV99 diodes on the A and B outputs are used in conjunction with the 0.001 uF 2000V capacitor and the PCB spark gaps to perform transient protection for the FTT10. The BAV99 diodes on the T1 (U8 pin 7) and the T2 (U8 pin 9) are used for transient protection on the FTT10s' secondary side of its' internal coupling transformer.

System Clock Circuit

The 10 MHZ crystal (Y1) along with the two 33 pF capacitors and the 270 and 100K ohm resistors connected to the MC143150's CLK1 (U2 pin 24) and CLK2 (U2 pin 23) form the system clock oscillator.

Service Pin Circuit

The Service LED (DS1) along with the 332 ohm resistor and the Service Button form the indication and actuation of the Service request/grant function which is connected to the MC143150's SER input (U2 pin 17) used by the Neuron for network object binding.

Processing Node Circuit

The MC143150 (U2) Neuron Processor is connected to the 43256AGU-10L SRAM (Data and stack working memory) (U5) and to the 29C010NA Flash ROM (Application Program and data storage) (U3). Note that most of the MC143150s' Address lines (A0 through A15) and the Data lines (D0 through D7) are connected common to each of these three devices. There is also a 74HC574DW data latch (U6) for LCD and keypad data storage.

The GAL16V8 (U4) decodes A8 through A15 for the SRAMs' active low Chip Enable (U4 pin 15 to U5 pin 20) for address space (typically hex C000 through hex DFFF), and the 29C257-12D Flash ROMs' active low Chip Enable (U4 pin 18 to U3 pin 22) for address space (hex 0000 through hex BFFF). The GAL16V8 (U4) is also used to decode the active low Write Enable (U4 pin 17) and the active low Output Enable (U4 pin 11) via the MC143150s' E (U2 pin 46) and RW (U2 pin 45), both of which are connected common to the SRAM and Flash ROM. Additionally, the GAL is used to develop the write strobe for the 74HC574 data latch (U6 pin 11), and the E (LCD enable) (U4 pin 14) and the RS (LCD register select) (U4 pin 13), all of which are initiated by address range writes and synchronized by an internal state machine due to the required cycle times of the LCD module.

| Address Map | Range |
|---|---|
| Flash Enable | 0000–BFFF |
| SRAM Enable | C000–DFFF |
| HC574 Enable | E000–E3FF |
| LCD E | E200–E3FF |
| LCD RS | E300–E3FF |

GAL equations

| | | |
|---|---|---|
| U4 pin 17 | Write Enable | = /E * /RW |
| U4 pin 15 | Output Enable | = /E * RW |
| U4 pin 18 | Flash Enable | = /A15 |
| | | + A15 * /A14 |
| U4 pin 15 | SRAM Enable | = A15 * A14 * /A13 |
| U4 pin 12 | HC574 Enable | = A15 * A14 * A13 */A12 * /A11 * /A10 |
| U4 pin 16 | Int. latch (IL) | \= A15 * A14 * A13 * /A12 * /A11 * /A10 * A9 |
| | | \+ IL * /LCD E |
| U4 pin 14 | LCD E | \= IL * /LCDE |
| U4 pin 13 | LCD RS | \= A15 * A14 * A13 * /A12 * /A11 * /A10 * A9 * A8 |
| | | \+ IL |

(\= or \+ denotes rising edge clocked (U4 pin 46 (E)) state machine logic.)

GAL waveforms

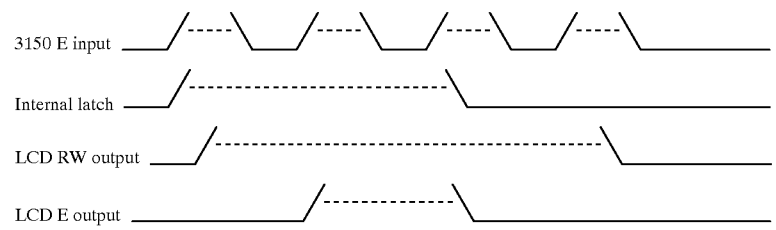

Note that these aforementioned devices comprise a processing node that executes an application program in a manner well known to those skilled in microprocessor design.

Keypad Circuit

The keypad interface circuit is comprised of 8 SPST switches which are driven from the output of the 74HC574DW data latch (U6) through 8 resistors (R7 through R14) to the base of an NPN transistor (Q1) whose base is held low when no key is pressed by R15. The collector of Q1 is pulled up by R16 and is connected to the MC143150s' IO7 (U2 pin13) where key states are detected by the application program after writing the desired key select data bits to the HC574 at address E000-E1FF for key detect scanning. The switch legends shown are for a typical application, however other definitions may be used.

LCD Circuit

The LCD circuit used is an industry standard commercial character mode LCD display as manufactured by many vendors and common throughout the electronics industry. Basically it is comprised of 8 bits of data, a register select (RS), a read/write (R/W) which is grounded for writing only in this example, and an enable strobe (E), as well as +5 volts and common and a contrast adjust potentiometer (R6). It is used by the application program for the display of face velocity and other such messages and parameters as needed in an installation.

Buzzer and LED Circuits

The buzzer is activated by the MC143150s' IO9 (U2 pin15) which drives the base of an NPN transistor (Q2) whose collector in turn pulls the (−) lead of the buzzer (LS1) whose (+) lead is connected to +5 V, to ground. It is used for key pressed indication (short beep) and alarm indication (long beep). The LED's (DS2 and 3) are dependent on the application program and typically used for fault and alarm indication. Both of them are directly connected to the MC143150s' IO2 and IO3 (U2 pin 4 and 5) which are each capable of sinking 20 mA. (limited to 10 mA. by the 332 ohm resistors (R22 and 23).

System Reset Circuit

The DS1233 reset controller (U1) monitors the 5 volt power supply for an out of tolerance condition and as a result also generates the power on reset function. The reset output (U1 pin 2) is connected to the MC143150 (U2 pin 6) where it performs power on reset as well as the extension delay of a push button induced reset.

Power Supply Circuit

The LM2574M-5V step down switch mode regulator (U7) is used to develop the regulated +5 volts used for system power (VCC) from an unregulated input power of approximately 24 volts DC. The 220 uF 60 V input capacitor filters the input voltage. The 56V transzorb (Z1) prevents transients on the input. The 330 uH inductor stores the switched energy via its magnetic field, the Shottky diode (D2) acts as a catch or free wheeling diode for negative excursions on the inductor, and the 330 uF 10 V capacitor filters the inductors output in order to supply a regulated +5 volt output. The 6.8V transorb (Z2) protects the +5 volt supply output against transients.

The main purpose of the Intelligent Sash Closure is to automatically close the sash of the fumehood during unoccupied periods. This is desirable since much of the conditioned air is lost through the sash opening. By closing the sash these losses can be reduced.

The Sash Closure can accepts input from an Intelligent Occupancy Sensor connected to the LonTalk network. When the occupancy sensor indicates an unoccupied condition the Intelligent Sash Closure will drive the sash closed.

Figure 37:
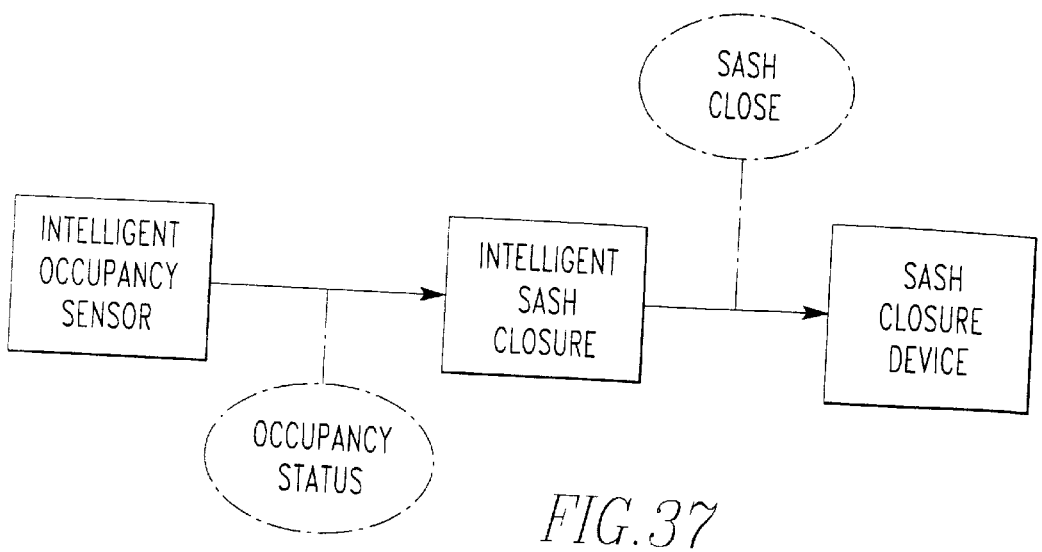
FIG. 37 shows an Information Flow Diagram for the Intelligent Sash Closure.

The Intelligent Sash Closure is just one component that can be incorporated into a fume hood, laboratory, or clean room control strategy. FIG. 37 displays the major components of a common system and their flow of information.

Figure 38:
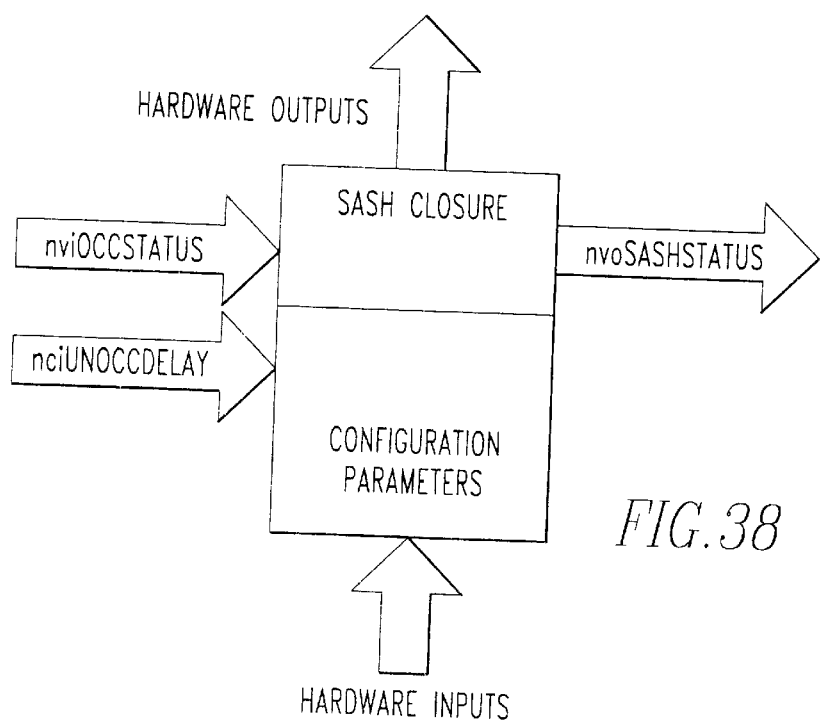
FIG. 38 shows the sash closure object.

The sash closure software receives the current occupancy status from an Intelligent Occupancy Sensor connected to the LonTalk network. During unoccupied periods the sash closure contact will be energized. The software will then monitor the sash closed digital input. When this input indicates that the sash is closed, the software de-energize the sash close contact. FIG. 38 shows the sash closure object.

Figure 39:
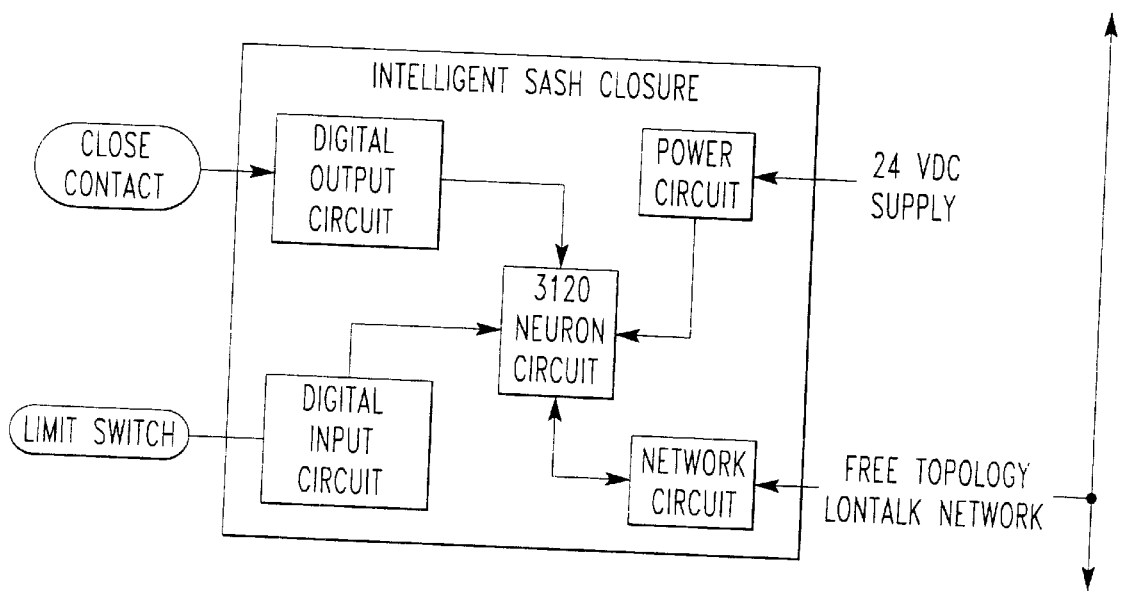
FIG. 39 shows Major Components of Intelligent Sash Closure.

The Intelligent Sash Closure automatically closes the fumehood sash during unoccupied periods. This is desirable because much of the conditioned air is vented out of the lab through the sash opening. An example of the typical configuration used with the Sash Closure is shown in FIG. 39.

The system incorporates a 3120 Neuron Processor that implifies hardware and software development. The current design incorporates a digital input to determine the state of the sash and a digital output to energize the sash closure mechanism. The current occupancy statues of the hood is received from an Intelligent Occupancy Sensor.

Figure 40:
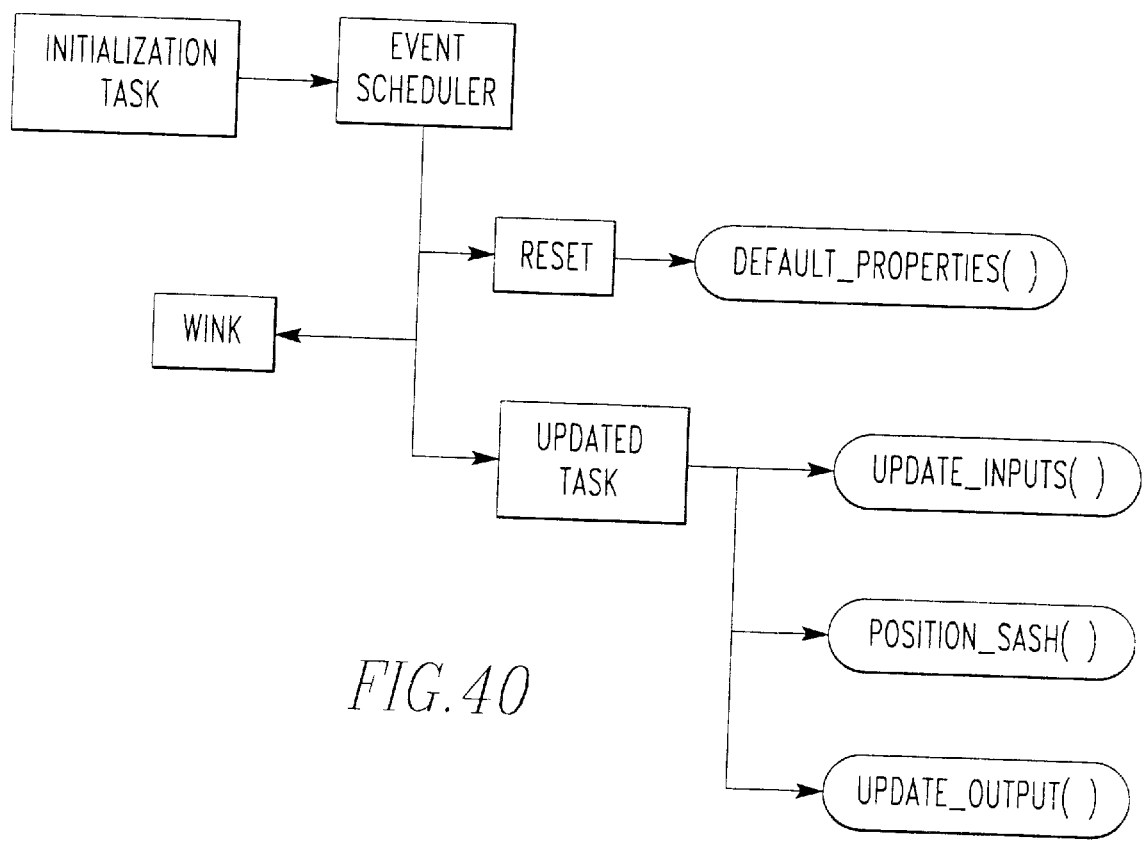
FIG. 40 shows Major Software Components of Intelligent Sash Closure.
Figure 41A:
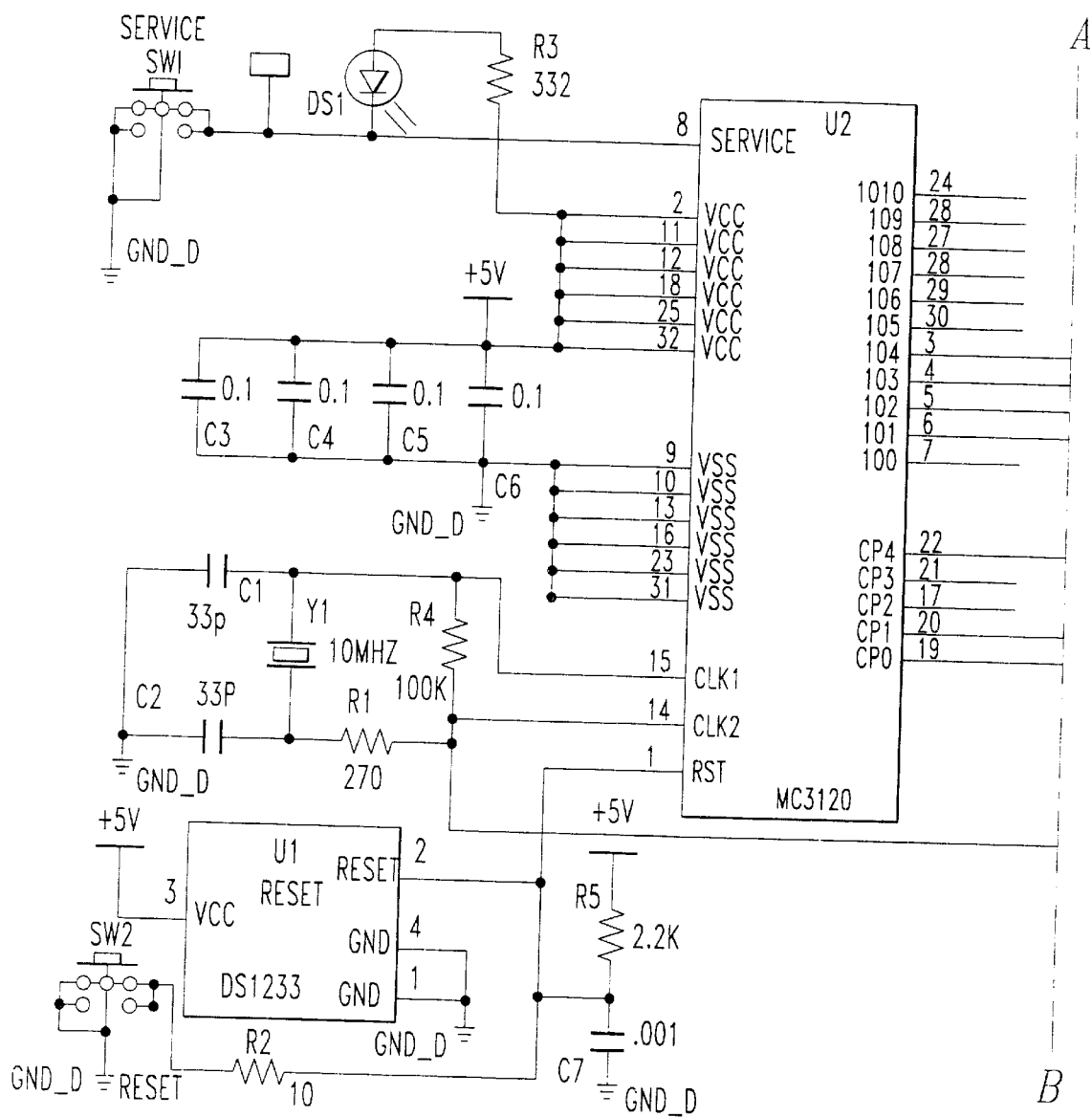
FIGS. 41a, 41b, 41c, and 41d are schematic representation of a sash open/closure actuator.
Figure 41B:
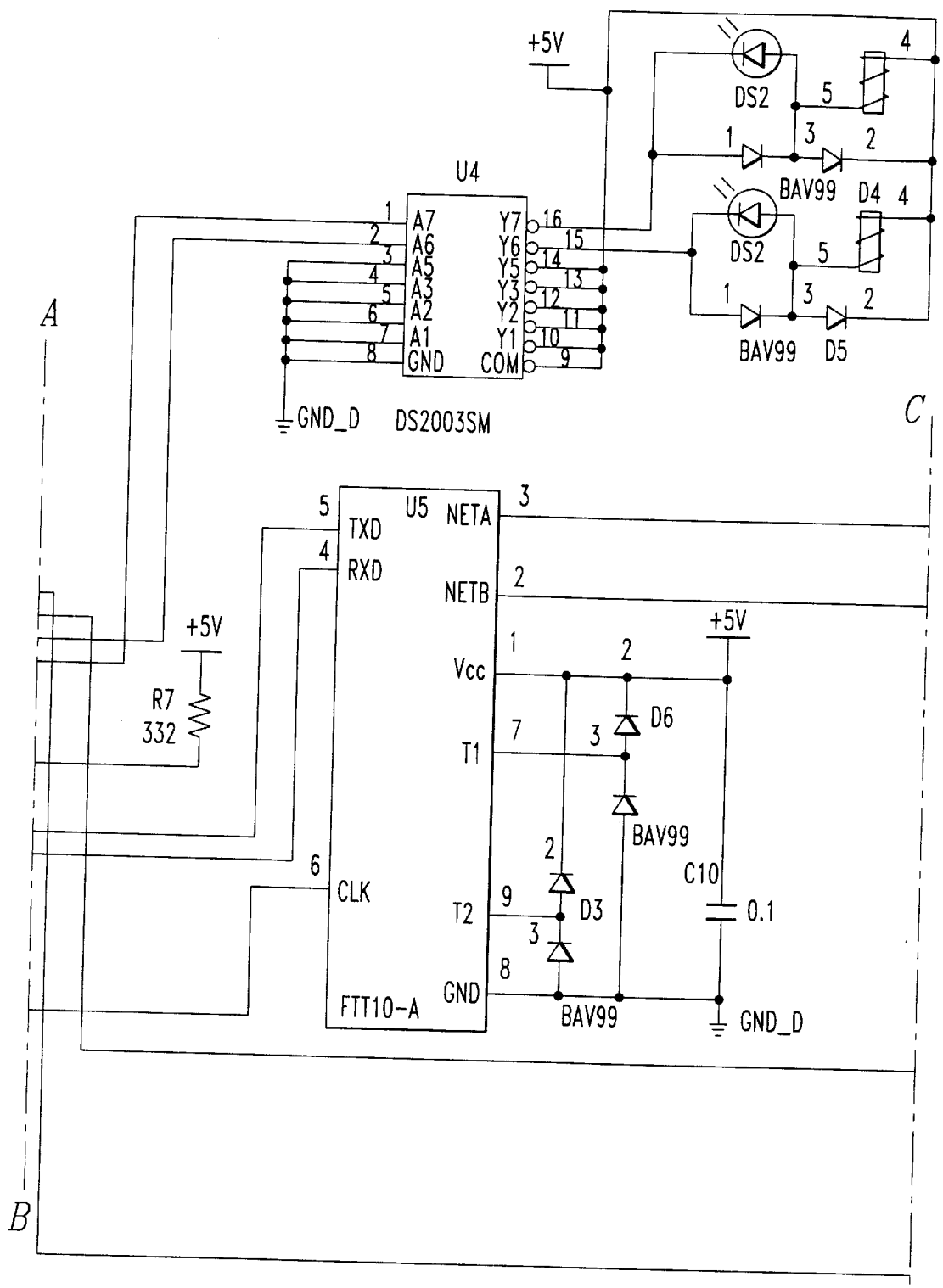
Figure 41C:
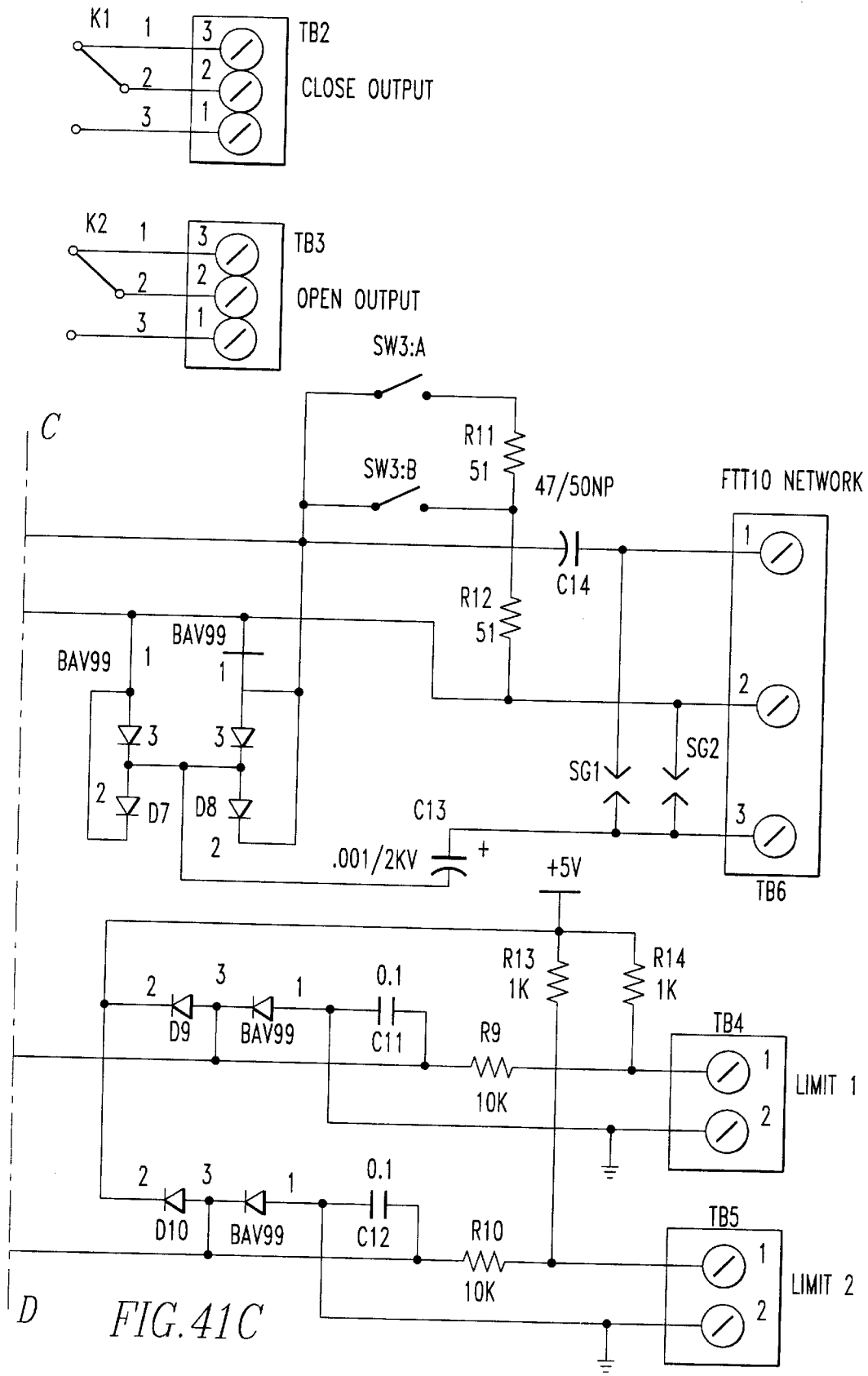
Figure 41D:
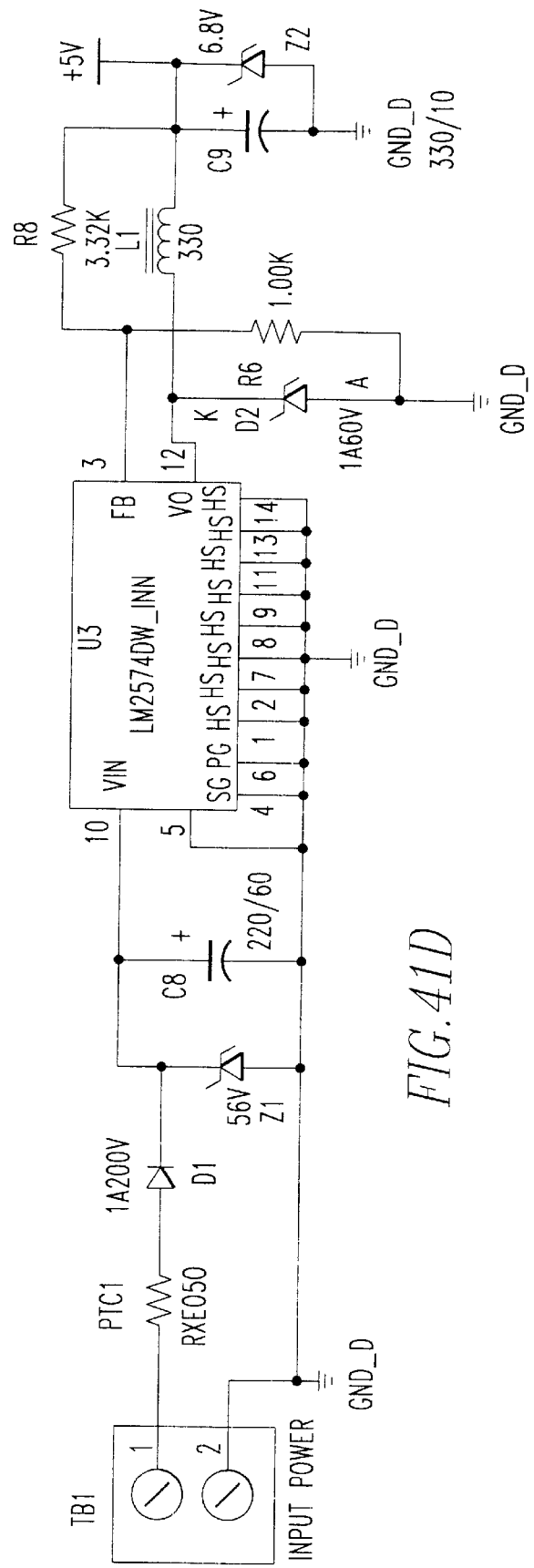

The 3120 Neuron simplifies software development, since many device drivers are pre-written as I/O objects. FIG. 40 illustrates the major components of the application program for the Sash Closure.

The Initialization Task is automatically run after the Sash Closure reset or powered on. The Initialization Task allocates memory and sets default values for Communication Network Variables, Input/Output Objects, Timer Objects, Global Variables, Network Buffers, and Application Buffers. After the Initialization Task executes it passes control over to the event scheduler.

The Sash Closure has the following system communication network variables:

| Name | Direction | Type | Description |
|---|---|---|---|
| nviOccStatus | input | SNVT_lev_disc | Current Occupancy Status |
| nvoSashStatus | output | SNVT_lev_disc | Current Sash Status |
| nciUnoccDelay | config | SNVT_time_sec | Delay fro Closing the Sash |

The nviOccStatus communication network variable is used or receiving the current occupancy status across the network.

The nvoSashStatus communication network variable is used or receiving the current occupancy status across the network.

The nciUnoccDelay communication network variable is used to configure the sash closure delay.

The UpdateTimer millisecond time object is provided for continually updating the digital input and output.

The Event Scheduler allocates processor time to the application tasks. The Event Scheduler decides when it is time to run a task, and the higher priority tasks run first such as the Reset Task. The Event Scheduler passes control to a task and the completed task relinquishes control to the Event Scheduler. The Event Scheduler is responsible for updating the Watchdog timer.

The Reset Task is responsible for setting up the variables and I/O objects to a known state. All of the timer objects are set to their respective update rates. This causes the A/D I/O object, and Update Pressure object to be updated at the desired rate.

The Update Task occurs when the UpdateTimer expires. It determines the current occupancy status from the nviOccStatus communication network variable. When the unoccupied period is first initiated the task starts a delay timer. Once the timer has expired the sash close contact is energized. The output will remain energized until the sash close limit input is reached at which time the close contact will be de-energized.

Referring to FIG. 41, the Sash Open/Closure Actuator monitors either the "stay as you are" command or the absence thereof and allows the neuron to implement the sash close or open function in order to enable the savings in exhausting conditioned air from the laboratory in the case where a particular fume hood is unused or the sash is inadvertently left open.

Dual Digital Output Circuit

The MC143120's IO0 (U2 pin 7) and IO1 (U2 pin 6) are both connected to digital output circuitry for driving the sash closed (or open if so equipped) based on either the reception of a specific explicit network object(s) directing the open or closing operation, or an implicit operation based on the lack of reception of specific explicit network object(s) (possibly in conjunction with an internal program and/or object imbedded delay) directing the postponement of the open and/or closing operation. The IO0 and IO1 lines are connected to a DS2003SM relay driver (U4) who's outputs switch the coils of the related relays (K1 and K2). The BAV99 diodes are for inductive coil kickback clamping and the LEDs (DS2 and DS3) directly indicate the energized state of the relays. The relays are form C allowing the selection of either a normally open or normally closed switching function as desired for the field application. The actual motor ratings and supply voltages are installation specific and the circuits are connected to TB2 and TB3.

Dual Digital Input Circuit

The MC143120's IO2 (U2 pin 5) and IO3 (U2 pin 4) are both connected to digital input circuitry for monitoring current limit and/or end of travel sensing. For one channel, an external normally closed (fail safe) contact closure (for example) would be connected between TB4 pin 1 and 2. Once the contact went open, the pull up resistor (R14) would pull the input high with the signal filtered for spurious noise by the RC combination of R9 and C11. The BAV99 diode pair is for over/under voltage protection. Once the high level was detected by the MC143120, the associated application program would cease the open or close operation. Alternatively, the limit and/or end of travel contacts could be directly wired in series with the actual motor excitation voltages, with the inputs free for other types of limiting functions or commands.

Analog sensing for direct current level monitoring would be an obvious extension of this invention and could be realized by an external current monitor with a contact closure/open or an integrated analog input circuit such as the Dual Slope circuit taught in other devices in this patent or any analog to digital converter commonly known to those skilled in the electronic design practice.

Free Topology Transceiver Circuit

The MC143120's CP1, Transmit Data output (U2 pin 20) is connected to the FTT10 TXD input (U5 pin 5) and the CPO, Receive Data input (U2 pin 19) is connected to the FTT10 RXD output (U5 pin 4) on the FTT10 Free Topology Transceiver (U5) which converts the standard Neuron single ended mode Manchester data protocol levels to the data modulation scheme used on the Free Topology Network. The FTT10's CLK (U5 pin 6) is driven with the Neuron clock frequency from the MC143120's CLK2 (U2 pin 14). The FTT10's RES input is driven by the DS1233 Reset Controllers' output (U1 pin 1). The FTT10 produces its' output on the A (U5 pin 3) and B (U5 in 2) pins which are coupled to the Free Topology network via the 47 uF 50 V capacitor to the FTT10 A and B output connections. This capacitor is used to block DC voltage components when the Free Topology network is used with network powered transceivers. The two 51 ohm resistors and switches are used to connect either a single point 51 ohm termination resistance for a free topology wired network or a 102 ohm termination resistance for each end of a daisy chain wired network. The BAV99 diodes on the A and B outputs are used in conjunction with the 0.001 uF 2000V capacitor and the PCB spark gaps to perform transient protection for the FTT10. The BAV99 diodes on the T1 (U5 pin 7) and the T2 (U5 pin 9) are used for transient protection on the FTT10s' secondary side of its' internal coupling transformer.

System Clock Circuit

The 10 MHZ crystal (Y1) along with the two 33 pF capacitors and the 270 and 100K ohm resistors connected to the MC143120's CLK1 (U2 pin 15) and CLK2 (U2 pin 14) form the system clock oscillator.

Service Pin Circuit

The Service LED (DS1) along with the 332 ohm resistor and the Service Button form the indication and actuation of the Service request/grant function which is connected to the MC143120's SER input (U2 pin 8) used by the Neuron for network object binding.

Processing Node Circuit

The MC143120 (U2) Single Chip Neuron has up to 2K Bytes of SRAM (Data and stack working memory) and up to 2K Bytes of EEPROM (Application Program and Data storage) in addition to 10K Bytes of on chip networking and kernal ROM. Note that this aforementioned device comprises a processing node that executes an application program in a manner well known to those skilled in Echelon circuit design.

System Reset Circuit

The DS1233 reset controller (U1) monitors the 5 volt power supply for an out of tolerance condition and as a result also generates the power on reset function. The reset output (U1 pin 2) is connected to the MC143120 (U2 pin 1) where it performs power on reset as well as the extension delay of a push button induced reset.

Power Supply Circuit

The LM2574M-5V step down switch mode regulator (U3) is used to develop the regulated +5 volts used for system power (VCC) from an unregulated input power of approximately 24 volts DC. The 220 uF 60 V input capacitor filters the input voltage. The 56V transzorb prevents transients on the input. The 330 uH inductor stores the switched energy via its magnetic field, the Shottky diode (D2) acts as a catch or free wheeling diode for negative excursions on the inductor, and the 330 uF 10 V capacitor filters the inductors output in order to supply a regulated +5 volt output. The 6.8V transorb (Z2) protects the +5 volt supply output against transients.

The system can also include an intelligent Actuator. (This intelligent Actuator is a different embodiment from the intelligent Actuator described above.) The main purpose of the intelligent Actuator is to maintain the desired actuator setpoint. A Proportional+Integral+Derivative (PID) loop calculates the actuator position required to maintain the setpoint. The desired setpoint is received from the network. The measured variable is read from an analog input built into the Intelligent Actuator. The output from the PID loop is sent to the actuator through an analog output. The Intelligent Actuator makes the measured variable accessible on the network through a communication network variable. Other intelligent products can receive the measured variable reading by binding to the communication network variable.

The intelligent Actuator is commonly used in conjunction with the Laboratory Monitor and Fumehood Monitor. The supply air damper and exhaust air damper are adjusted to maintain a safe level within the lab or fumehood.

Figure 42:
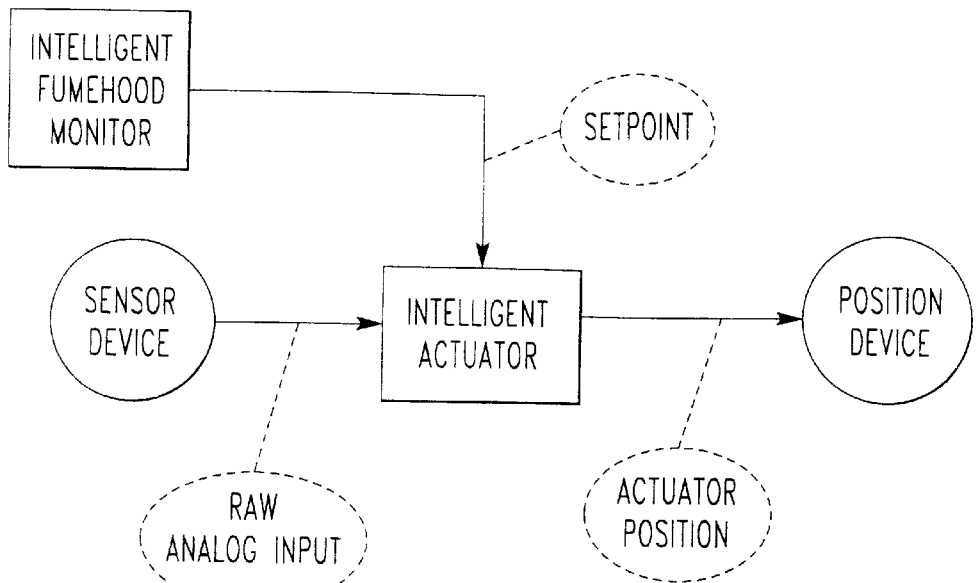
FIG. 42 shows an Information Flow Diagram for the Intelligent Actuator.

The intelligent Actuator is just one component that can be incorporated into a fume hood, laboratory, or clean room control strategy. FIG. 42 displays the major components of a common system and their flow of information.

The Intelligent Actuator performs calculations to maintain a desired setpoint. A PID calculation is performed using the setpoint and measured variable input. The calculation produces an actuator position signal, which is sent to an analog output. The setpoint for the PID lop is received from the network The setpoint is used by the PID function to position the damper actuator. The PID loop uses Proportional, Integral, and Derivative Control to modulate its output. The gains associated with the PID loop are programmable through the network. To help alleviate oscillation around the setpoint, there is a deadband. If the measured variable is with the deadband around the setpoint, the PID loops output remains the same. If the measured is outside the deadband, the PID loop calculates the output. To prevent the integral component from becoming too large, there is anti-wind up reset protection. This protection clamps the integral value when all of the components add up to more than 100% or less than 0%. The output from the PID loop is sent to an analog output connected to a positioning actuator An external measurement device determines the current measured variable value. The device is wired to the Actuator's analog input. The measured value is presented to the analog input as a voltage that is converted to a raw digital value through an analog to digital converter (ADC). The raw counts value from the ADC is converted to engineering units through a software calculation. The calculation is based on the characteristics of the measuring device. The measured variable value is then made available to the communications network through a communication network variable.

Figure 43:
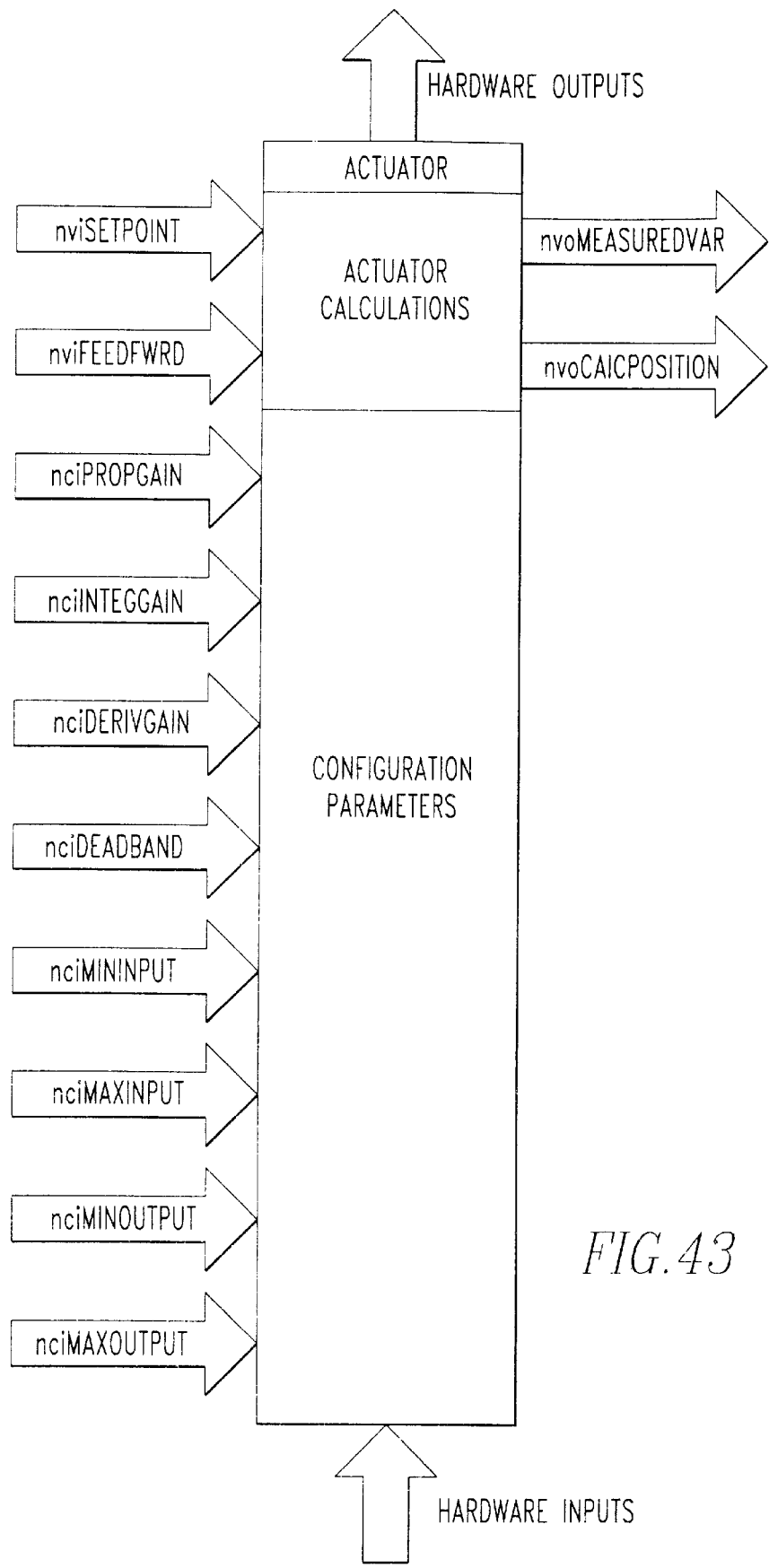
FIG. 43 shows the actuator object.

An external positioning device is wired to the Actuator's analog output. The PID output is presented to the device as a voltage that is converted from a raw digital value through a digital to analog converter (DAC). The calculation is based on the characteristics of the positioning device. The positioning value is then made available to the communications network through a communication network variable. FIG. 43 shows the actuator object.

Figure 44:
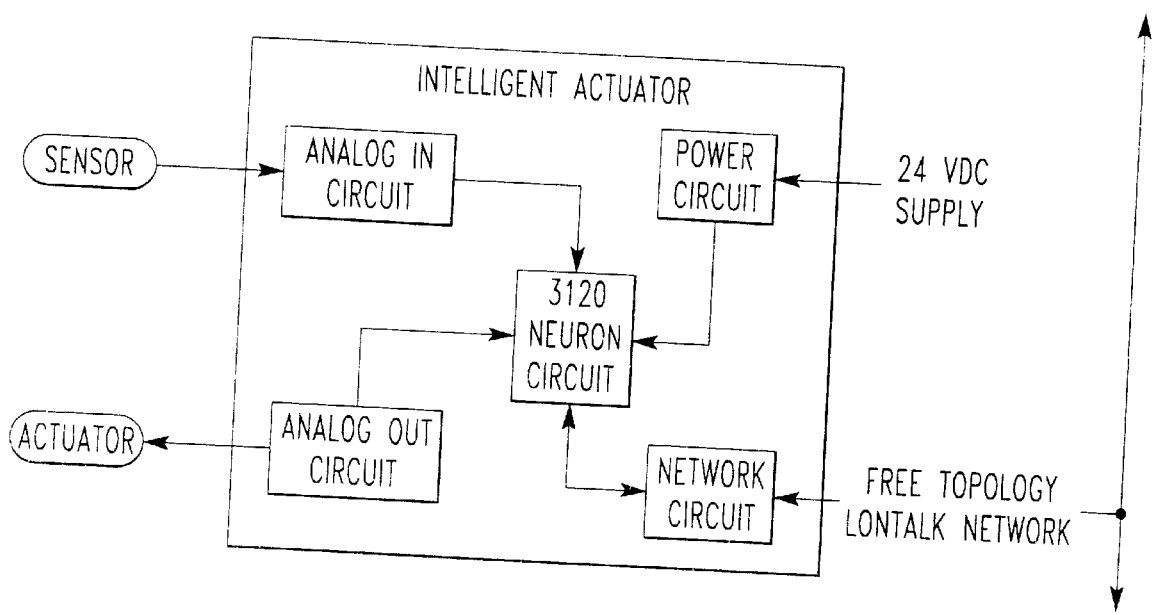
FIG. 44 shows the major components of the Intelligent Actuator.

The Intelligent Actuator calculates an actuator position based on a given setpoint and a measured variable. This is desirable because control actions are taken to maintain flow, pressure and temperature in laboratory or fumehood application. An example of the typical configuration used with the Actuator is shown in FIG. 44.

Figure 45:
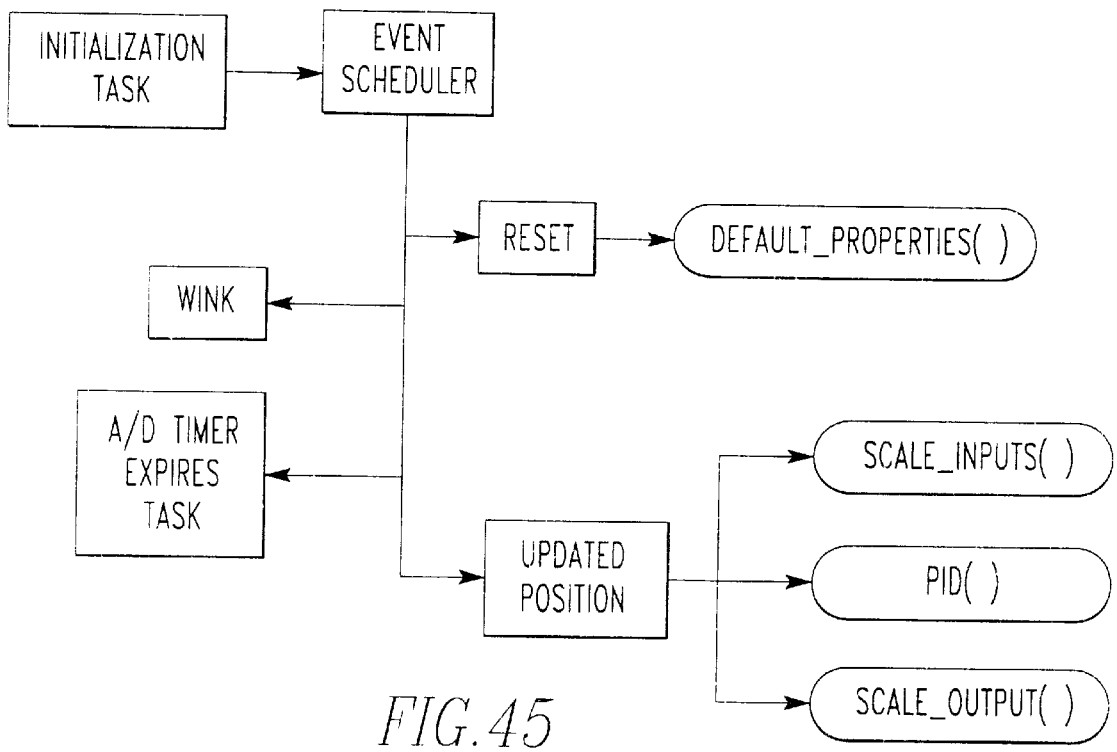
FIG. 45 shows the major software components of the Intelligent Actuator.

The system incorporates a 3120 Neuron Processor that simplifies hardware and software development. The current design incorporates an analog input for the measured variable and analog output for positioning the actuator. The desired setpoint is received from the network. A program reads the analog input and converts this into measured value. A Proportional+Integral+Derivative calculation is performed using the measured variable and desired setpoint. The results of the PID calculation are sent to the actuating device through an analog output The 3120 Neuron simplifies software development, since many device drivers are pre-written as I/O objects. FIG. 45 illustrates the major components of the application program for the Actuator.

The Initialization Task is automatically run after the Actuator reset or powered on. The Initialization Task allocates memory and sets default values for Communication network variables, Input/Output Objects, Timer Objects, Global Variables, Network Buffers, and Application Buffers. After the Initialization Task executes it passes control over to the event scheduler.

The Actuator has the following system communication network variables:

| Name | Direction | Type | Description |
| --- | --- | --- | --- |
| nviSetpoint | input | SNVT_lev_percent | Desired Setpoint |
| nviFeedFwrd | input | SNVT_lev_percent | Feed Forward Signal |
| nvoMeasuredVar | output | SNVT_lev_percent | Measured Variable |
| nvoCalcPosition | output | SNVT_lev_percent | Calculated Position |
| nciPropGain | config | SNVT_multiplier | Proportional Gain |
| nciIntegGain | config | SNVT_multiplier | Integral Gain |
| nciDerivGain | config | SNVT_multiplier | Derivative Gain |
| nciDeadband | config | SNVT_lev_percent | Deadband |
| nciMinInput | config | SNVT_lev_percent | Minimum Input Value |
| nciMaxInput | config | SNVT_lev_percent | Maximum Input Value |
| nciMinOutput | config | SNVT_lev_percent | Minimum Output Value |
| nciMaxOutput | config | SNVT_lev_percent | Maximum Output Value |

The nvisetpoint communication network variable is used for receiving the current setpoint across the network. This setpoint will be sent from an Intelligent Laboratory Monitor or Intelligent Fumehood Monitor.

The nviFeedFwrd communication network variable is used for receiving the current feed forward across the network. This setpoint will be sent from an Intelligent Laboratory Monitor or Intelligent Fumehood Monitor.

The nvoMeasuredVar communication network variable is used for sending the current measured variable value. This variable will be updated when the analog input is scaled.

The nvoCalcPosition communication network variable is used for sending the calculated actuator position. This variable will be updated when the analog output is scaled.

The nciPropGain network configuration variable is used for setting the Proportional gain in the Intelligent Actuator. This is an internal value used in the PID calculations.

The nciIntegGain network configuration variable is used for setting the Integral gain in the Intelligent Actuator. This is an internal value used in the PID calculations.

The nciDerivGain network configuration variable is used for setting the Derivative gain in the Intelligent Actuator. This is an internal value used in the PID calculations.

The nciDeadband network configuration variable is used for setting the deadband in the Intelligent Actuator. This is an internal value used in the PID calculations.

The nciMinInput network configuration variable is used for setting the minimum input value in the Intelligent Actuator. This is an internal value used in the input scaling calculations. The nciMaxInput network configuration variable is used for setting the maximum input value in the Intelligent Actuator. This is an internal value used in the input scaling calculations.

The nciMinOutput network configuration variable is used for setting the minimum output value in the Intelligent Actuator. This is an internal value used in the input scaling calculations.

The nciMaxOutput network configuration variable is used for setting the maximum output value in the Intelligent Actuator. This is an internal value used in the input scaling calculations.

The Neuron processor has built-in input/output objects that simplify the development of controllers since the device drivers are pre-written. The Actuator is using a dual slope A/D converter I/O object called ADConvertor to read the measured variable. This A/D converter performs measurements with 16-bits of resolution for as little as a 13 ms integration period. The ADConvertor requires a millisecond timer to provide continuous A/D conversion.

The Actuator is using a NeuroWire object to interface to the Analog to Digital Converter. The ADC converts the desired actuator position to an analog signal with 12 bits of resolution.

The ConvertTimer millisecond timer object is provided for continuous reading of the A/D converter. This is repeating timer The UpdatePosition millisecond time object is provided for continually updating the actuator position output. This is a repeating timer.

The Event Scheduler allocates processor time to the application tasks. The Event Scheduler decides when it is time to run a task, and the higher priority tasks run first such as the Reset Task. The Event Scheduler passes control to a task and the completed task relinquishes control to the Event Scheduler. The Event Scheduler is responsible for updating the Watchdog timer.

The Reset Task is responsible for setting up the variables and I/O objects to a known state. All of the timer objects are set to their respective update rates. This causes the A/D I/O object, and Update Pressure object to be updated at the desired rate.

The A/D Timer Expires Task is responsible for starting the A/D conversion by writing the CONTROL_VALUE constant to ADConvertor I/O Object. This task is run when the ConvertTimer expires.

The Position Update Task occurs when the UpdatePosition timer expires. This analog input raw value must be converted to engineering units for the PID control. The following calculations are performed to scale the input:

min eng=nciMinInput max eng=ncimaxInput min counts=minimum counts(voltage)

max counts=maximumcounts(voltage)

$$nvoMeasuredVar = \frac{(counts - mincounts) \times (maxeng - mineng)}{(maxcounts - mincounts)} + mineng$$

The calculated measured variable is used by the PID( ) function to control the damper actuator. PID loop control can be disabled through the network. The PID loop uses Proportional, Integral, and Derivative Control to modulate its output. To help alleviate oscillation around the setpoint, there is a deadband. If the measured variable is with the deadband around the setpoint, the PID loops output remains the same. If the face velocity is outside the deadband, the PID loop calculates the output. To prevent the integral component from becoming too large, there is anti-wind up reset protection. This protection clamps the integral value when all of the components add up to more than 100% or less than 0%. The output from the PID loop is broadcast on the network for the damper actuator controller to receive. The following equations are used for PID control:

Error=nviSetpoint−nvoMeasuredVar

Proportional Component=Error*Proportional Gain

Integral Component=Integral Component+(Integral Gain*Error)

Derivative Component=(Error−Previous Error)*Derivative Component

PID Output=Proportion Component+Integral Component+Derivative Component

Once the PID output has been calculated it must be scaled for the Analog to Digital Converter. The following calculations are performed to scale the output:

min eng=nciMinOutput max eng=nciMaxOutput min counts=minimum counts(voltage)

max counts=maximumcounts(voltage)

$$ADC\ Output = \frac{(PID\ Output - minEng) \times (maxcounts - mincounts)}{(maxeng - mineng)} + mincounts$$

Referring to FIG. 46, the Intelligent Actuator Controller is used to create a node capable of sensing the actual flow through or pressure dropped across the actuator enabling the reconciliation of the control action by the node to the actual units desired (commanded) by the other controlling neurons used in the invention. This in essence linearizes the actuator and removes the inherent delay that would be caused by the PID loop in a sensing/controlling neuron to recompute the commanded setpoint for the desired control action if the actuator effect was not as desired initially (for an open loop actuator controller).

Dual Slope Analog Input Circuit

The MC143120's IO1 (U2 pin 6) is connected to a CD4016 analog switch (U9) which along with the MC143120's IO4 (U2 pin3) which is connected to an analog circuit consisting of an LM358 Operational Amplifier (U7) section utilized as a unity gain buffer, a second an LM358 Operational Amplifier (U6) utilized as an integrator, and an LM393 Comparator (U4) together comprising a dual-slope A/D converter. The 74HC04 inverter (U8) is used to convert the CD4016 analog switch into a single pole double throw switching function. Normally, the pressure or flow feedback transducer produces either a (typical) 0 to +5 volt or 0 to 20 milliamp signal which is fed to the input connector (TB3 pin 2) which goes to a voltage divider (R17 and R16) which scales the 0 to +5V input to 0 to +1V. Note that the 249 ohm resistor (R18) is used only when the input signal is from a 0–20 mA current loop transducer.

The MC143120 firmware initiates an analog to digital conversion by calling the dual-slope I/O object within the Neuron firmware which performs the following steps; [ASSURE INTEGRATOR DISCHARGE] The MC143120's IO1 (U2 pin 6) is taken low (if not already low) to ensure that the CD4016 analog switch has connected the VREF input to the unity buffer which will cause the integrator output (U6) to slew negative via integral action and cause the comparator output (U4) to go high once its' threshold has been crossed. This is monitored via the MC143120's IO4 (U2 pin 3). [AUTO ZERO] Once this output level has or had occurred, the MC143120 then takes its' IO1 (U2 pin 6) high to cause the CD4016 analog switch to connect the input value (TB3 pin 2) to be measured to the analog circuit to integrate the input value. This causes the integrator output (U6) to slew positive. [INTEGRATE INPUT] Once the integrator output crosses the comparator threshold and the comparator output (U4) switches low indicating that the integrator output has crossed the zero count threshold going high, the MC143120, via an internal firmware-preset hardware down counter, then holds the analog switch connected to the input value for the firmware preset down counter period (integration period) which is the predetermined integration time. [DE-INTEGRATE AGAINST REFERENCE] Once this down counter has reached zero, hardware circuitry internal to the MC143120 then takes the IO1 (U2 pin 6) low immediately which switches the CD4016 analog switch (U9) and hence the input to the analog circuit back to the VREF causing the integrator output to now slew negative. At the same instant, the MC143120 begins incrementing the internal hardware counter and monitors the comparator output via IO4 until the output switches high indicating that the integrator has de-integrated to zero cross. The value in the MC143120 internal hardware counter now represents the analog input value which is used by the application firmware as the measured flow value.

Analog Output Circuit

The Analog Output circuit is comprised of an LTC1451 12 bit digital to analog converter (U10) which produces a 0 to +5 volt rail to rail output used to drive the actuator control electronics. The output is connected to TB4 pin 1. The converters' serial clock (SCK) input is connected to the MC143120 IO8 (U2 pin 27), the serial data output (SDO) input is connected to the MC143120 IO9 (U2 pin 26), and the chip select is connected to the MC143120 IO7 (U2 pin 28). The Echelon Neurowire firmware object is used to cause the transmission of the application program output value to the converter.

Free Topology Transceiver Circuit

The MC143120's CP1, Transmit Data output (U2 pin 20) is connected to the FTT10 TXD input (U5 pin 5) and the CP0, Receive Data input (U2 pin 19) is connected to the FTT10 RXD output (U5 pin 4) on the FTT10 Free Topology Transceiver (U5) which converts the standard Neuron single ended mode Manchester data protocol levels to the data modulation scheme used on the Free Topology Network. The FTT10's CLK (U5 pin 6) is driven with the Neuron clock frequency from the MC143120's CLK2 (U2 pin 14). The FTT10's RES input is driven by the DS1233 Reset Controllers' output (U1 pin 1). The FTT10 produces its' output on the A (U5 pin 3) and B (U5 pin 2) pins which are coupled to the Free Topology network via the 47 uF 50 V capacitor to the FTT10 A and B output connections. This capacitor is used to block DC voltage components when the Free Topology network is used with network powered transceivers. The two 51 ohm resistors and switches are used to connect either a single point 51 ohm termination resistance for a free topology wired network or a 102 ohm termination resistance for each end of a daisy chain wired network. The BAV99 diodes on the A and B outputs are used in conjunction with the 0.001 uF 2000V capacitor and the PCB spark gaps to perform transient protection for the FTT10. The BAV99 diodes on the T1 (U5 pin 7) and the T2 (U5 pin 9) are used for transient protection on the FTT10s' secondary side of its' internal coupling transformer.

System Clock Circuit

The 10 MHZ crystal (Y1) along with the two 33 pF capacitors and the 270 and 100K ohm resistors connected to the MC143120's CLK1 (U2 pin 15) and CLK2 (U2 pin 14) form the system clock oscillator.

Service Pin Circuit

The Service LED (DS1) along with the 332 ohm resistor and the Service Button form the indication and actuation of the Service request/grant function which is connected to the MC143120's SER input (U2 pin 8) used by the Neuron for network object binding.

Processing Node Circuit

The MC143120 (U2) Single Chip Neuron has up to 2K Bytes of SRAM (Data and stack working memory) and up to 2K Bytes of EEPROM (Application Program and Data storage) in addition to 10K Bytes of on chip networking and kernal ROM. Note that this aforementioned device comprises a processing node that executes an application program in a manner well known to those skilled in Echelon circuit design.

System Reset Circuit

The DS1233 reset controller (U1) monitors the 5 volt power supply for an out of tolerance condition and as a result also generates the power on reset function. The reset output (U1 pin 2) is connected to the MC143120 (U2 pin 1) where it performs power on reset as well as the extension delay of a push button induced reset.

Power Supply Circuit

The LM2574M-5V step down switch mode regulator (U3) is used to develop the regulated +5 volts used for system power (VCC) from an unregulated input power of approximately 24 volts DC. The 20 uF 60 V input capacitor filters the input voltage. The 56V transzorb prevents transients on the input. The 330 uH inductor stores the switched energy via its magnetic field, the Shottky diode (D2) acts as a catch or free wheeling diode for negative excursions on the inductor, and the 330 uF 10 V capacitor filters the inductors output in order to supply a regulated +5 volt output. The 6.8V transorb (Z2) protects the +5 volt supply output against transients.

The intelligent actuator can be used to interface with various equipment to operate the equipment based on communication network variables a given intelligent actuator receives. For instance, an intelligence actuator connected with an off the shelf heat valve HV can receive communication network variables from the intelligent temperature sensor which it translates into control signals for the heat valve. The heat valve produces heat (or turns off) which is introduced into the air flow based on the communication network variable from the temperature sensor. Similarly, for humidity, the communication network variable from the intelligent humidity sensor is received by an intelligent actuator connected to a cooling devices. The intelligent actuator converts the communication network variable from the humidity sensor into a control signal to cause the cooling device to cool the air flow more or less depending on the communication network variables received. Similarly, the pressure also is controlled through air flow from the communication network variables received from the intelligent pressure sensor at an intelligent actuator with for instance a damper that controls the amount of air being introduced into the room.

Figure 47:
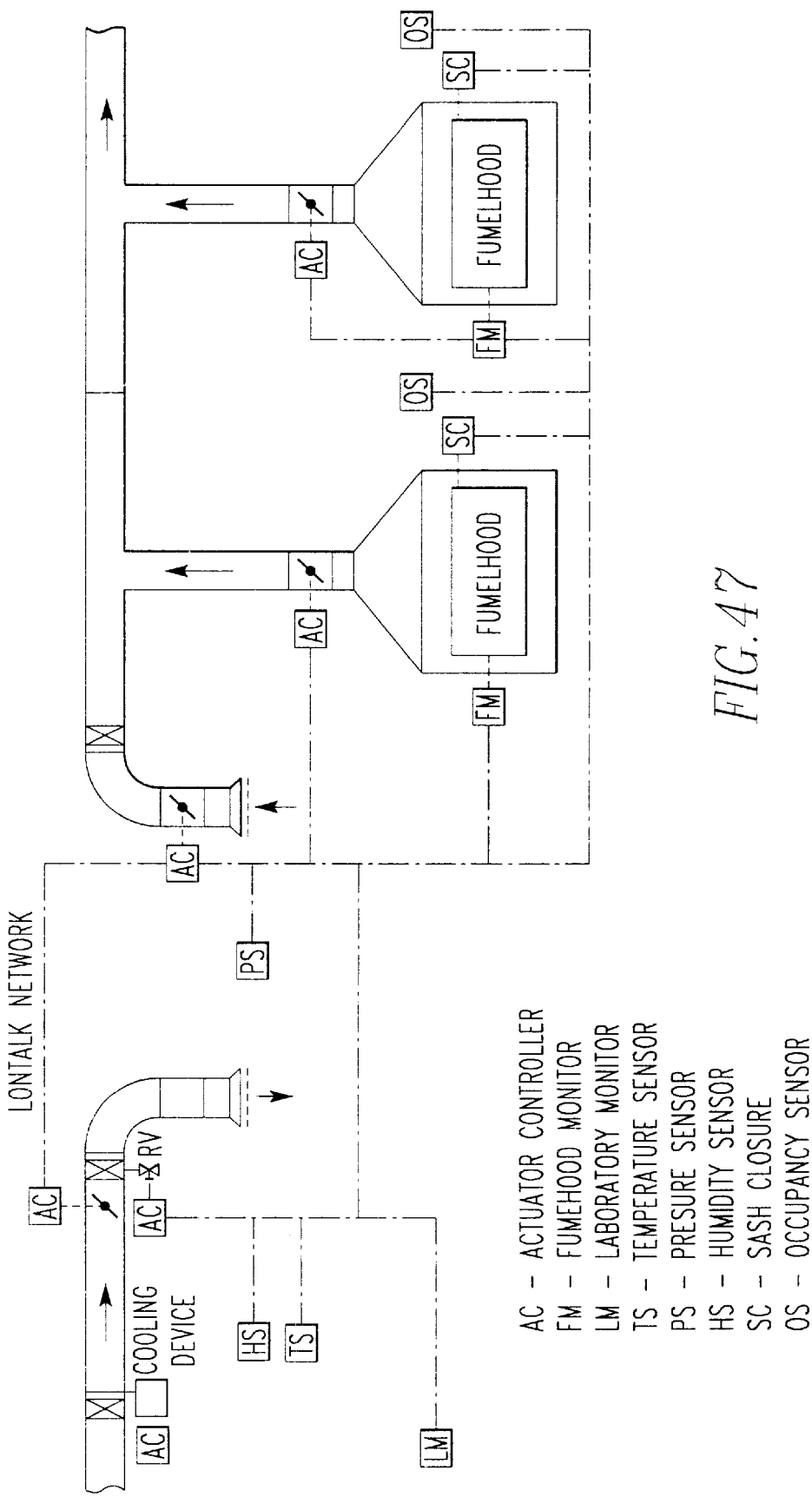
FIG. 47 is a schematic representation of a distributed laboratory/fumehood control system.

FIG. 47 shows a schematic representation of a distributed laboratory/fumehood control system.

The use of "means" herein is pursuant to 35 U.S.C. §112, while the use of "mechanism" herein is not subject to 35 U.S.C. §112.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

```
//------------------------------------------------------------------------
// Compiler Directives
//------------------------------------------------------------------------
#pragma relaxed_casting_on
//------------------------------------------------------------------------
// Include Files
//------------------------------------------------------------------------
#include <FLOAT.H>
#include <STRING.H>
#include <SNVT_AL.H>
#include <SNVT_PR.H>
//------------------------------------------------------------------------
// Network Variable Declarations
//------------------------------------------------------------------------
// SYSTEM
//                                              1234567890123456
network  input   onchip   SNVT_time_stamp  nviDateTime;
network  output  onchip   SNVT_alarm       nvoAlarmStatus;
network  input   onchip   SNVT_switch      nviEMergency;
network  output  onchip   SNVT_lev_cont_f  nviEmerPosition;
network  input   eeprom   SNVT_str_asc     nviName = ('H', 'o', 'o', 'd', '_', '2', '\0');
// FACE VELOCITY SENSOR
network  input   eeprom   SNVT_count       nviFVReadRate = 20;
network  input   eeprom   SNVT_speed_f     nviDPLowScale;
network  input   eeprom   SNVT_speed_f     nviDPHighScale;
network  input   eeprom   SNVT_speed_f     nviFVLowLimit;
network  input   eeprom   SNVT_speed_f     nviFVHighLimit;
network  output  onchip   SNVT_speed_f     nvoFaceVelocity;
// FACE VELOCITY CONTROL LOOP
network  input   eeprom   SNVT_speed_f     nviPIDSetpoint;
network  input   eeprom   SNVT_lev_cont_f  nviPIDProp;
network  input   eeprom   SNVT_lev_cont_f  nviPIDIntegral;
network  input   eeprom   SNVT_lev_cont_f  nviPIDDerivative;
network  input   eeprom   SNVT_speed_f     nviPIDDeadband;
network  input   eeprom   SNVT_count_inc   nviPIDSign;
network  input   eeprom   SNVT_switch      nviPIDEnable;
network  output  onchip   SNVT_lev_cont_f  nvoPIDOut;
//------------------------------------------------------------------------
// I/O Objects
//------------------------------------------------------------------------
IO_4 input dualslope ded clock(0) ADConvertor;
//------------------------------------------------------------------------
// Timers
//------------------------------------------------------------------------
mtimer repeating ConvertTimer;
//------------------------------------------------------------------------
// Defines
//------------------------------------------------------------------------
#define   LOW_COUNTS          00000UL
#define   HIGH_COUNTS         65535UL
#define   CONTROL_VALUE       45000UL
#define   ON                  1
#define   OFF                 0
#define   NO_ALARM            0U
#define   LOW_LIMIT_ALARM     1U
#define   HIGH_LIMIT_ALARM    2U
#define   OBJECT_ID           0UL
#define   SPEED_SNVT_INDEX    62UL
//------------------------------------------------------------------------
// Global Variable Declarations
//------------------------------------------------------------------------
// Regular Variables
unsigned long   RawCounts;         //Differential Pressure in Raw Counts
float_type      DiffPressure;      //Differential Pressure
float_type      Error;             //PID Error
float_type      PrevError;         //PID Previous Error
float_type      PPart;             //PID Proportional Component
float_type      IPart;             //PID Integral Component
float_type      DPart;             //PID Deriviative Component
// Floating Point Defines
float_type      AIR_COEF;          //Coefficient of Air
float_type      PID_MAX_OUT;       //PID Loop Maximum Output
float_type      PID_MIN_OUT;       //PID Loop Minimum Output
float_type      ZERO;              //A floating point zero
//------------------------------------------------------------------------
// Function Prototypes
//------------------------------------------------------------------------
     void   Alarm(void);
     int    CheckForAlarm(void);
```

APPENDIX-continued

```
        void    ReportAlarm(  unsigned long    object_id,
                              alarm_type_t     alarm_type,
                              priority_level_t priority_level,
                              unsigned long    index_to_SNVT,
                              unsigned         value[4],
                              usnigned         alarm_limit[4]);
        void    PID(void);
        boolean DeadBand(void);
        void    FillArray(    SNVT_speed_f * Speed_f,
                              unsigned * Value);
//------------------------------------------------------------------------
// Reset
//------------------------------------------------------------------------
when (reset)
{
    // Setup the Read Rate for the analog input
    ConvertTimer = (unsigned long) nviFVReadRate;
    // Evaluate the Coefficient of Air define
    f1_from_ascii("4.037", &AIR_COEF);
    // Evaluate the PID Loop's Maximum Output define
    f1_from_ascii("100", &PID_MAX_OUT);
    // Evaluate the PID Loop's Minimum Output define
    f1_from_ascii("0", &PID_MIN_OUT);
    // Evaluate the Zero Value define
    ZERO = f1_zero;
}
//------------------------------------------------------------------------
// Face Velocity Convertion Timer Expired
//------------------------------------------------------------------------
when (timer_expires(ConvertTimer))
{
    //Start the first integration period for the A/D convertor
    //(9ms @ 10MHz)
    io_in_request(ADConvertor, CONTROL_VALUE);
}
//------------------------------------------------------------------------
// The A/D convertor has a new value
//------------------------------------------------------------------------
when (io_update_occurs(ADConvertor))
{
    float_type    wr0_f;      //Tempory Float Variable 1
    float_type    wr1_f;      //Tempory Float Variable 2
    unsigned long wr0_u1;     //Tempory Long Integer Variable
    // The differential pressure input value is biased by the negative value
    // of the control value used. Correct this by adding it back
    RawCounts = input_value - CONTROL_VALUE;
    // Scale the Raw Counts to a Differential Pressure
    //         (RawCounts - LOW_COUNTS) * (nviDPHighScale - nviDPLowScale)
    // DP =    ------------------------------------------------------------ - nviDPLowScale
    //                       (HIGH_COUNTS - LOW_COUNTS)
    // Perform the above equation using the floating point library
    wr0_u1 = RawCounts - LOW_COUNTS;
    f1_from_ulong( wr0_u1, &wr0_f);
    f1_sub( (const float_type *) &nviDPHighScale,
            (const float_type *) &nviDPLowScale, &wr1_f);
    f1_mul( &wr0_f, &wr1_f, &DiffPressure);
    wr0_u1 = HIGH_COUNTS - LOW_COUNTS;
    f1_from_ulong( wr0_u1, &wr0_f);
    f1_mul( &wr0_f, &DiffPressure, &wr1_f);
    f1_add( &wr1_f, (const float_type *) &nviDPLowScale, &DiffPressure);
    // Convert the Differential Pressure to a Face Velocity
    // nviFaceVelocity = 4.037 sqr(DiffPressure)
    f1_sqrt( &DiffPressure, &wr0_f);
    f1_mul( &wr0_f, &AIR_COEF, &wr0_f);
    nvoFaceVelocity = * (SNVT_speed_f *) &wr0_f;
    //Perform the Alarming Task
    Alarm( );
    // Perform the PID Control Loop
    // Do PID control if its enabled
    if (nviPIDEnable.state == ON)
    {
        // Only Perform PID Control If were are not in Emergency
        if (nviEmergency.state == ON)
        {
            nvoPIDOut = nviEmerPosition;
        }
        // Only Perform PID Control If the face velocity is outside
        // the DeadBand
        else if (DeadBand)
```

APPENDIX-continued

```
            {
                PID( );
            }
        }
    }
}
//---------------------------------------------------------------------------------------
// Check for High or Low Limit Alarms
//---------------------------------------------------------------------------------------
int CheckForAlarm( )
{
    // Check if there is a high face velocity alarm
    if ( fl_gt( (const float_type *) &nvoFaceVelocity.
                (const float_type *) &nviFVHighLimit) )
    {
        return(HIGH_LIMIT_ALARM);
    }
    // Check if there is a low face velocity alarm
    else if ( fl_lt( (const float_type *) &nvoFaceVelocity,
                     (const float_type *) &nviFVLowLimit) )
    {
        return(LOW_LIMIT_ALARM);
    }
    return(NO_ALARM);
}
//---------------------------------------------------------------------------------------
// Alarm   Check for High and Low Limit Alarms and Clears
//---------------------------------------------------------------------------------------
void Alarm( )
{
    int             AlarmStatus;  // Current Alarm Status
    SNVT_speed_f    wr0_speed;    // Temp Variable of Speed Type
    unsigned        Speed[4];     // Copy of the face velocity
    unsigned        Limit[4];     // Copy of the alarm limit
    // Get the Current Alarm Status
    AlarmStatus = CheckForAlarm( );
    // Fill the Unsigned Face Velocity Array with the floating
    // point number
    wr0_speed = nvoFaceVelocity;
    Fill Array( &wr0_speed,
                (unsigned *) &Speed);
    // Set the alarm status to our previous alarm condition
    switch(nvoAlarmStatus.alarm_type)
    {
        // Previous alarm was a low limit clear
        case AL_LOW_LMT_CLR_1;
        case AL_HIGH_LMT_CLR_1;
        case AL_NO_CONDITION;
            // Set the alarm status accordingly
            switch(AlarmStatus)
            {
                // There is a low limit alarms
                case LOW_LIMIT_ALARM;
                    // Fill the Alarm Limit with the Low Limit value
                    FillArray(  &nviFVLowLimit,
                                (unsigned *) &Limit );
                    // Report the Alarm
                    ReportAlarm(    OBJECT_ID,
                                    AL_LOW_LMT_ALM_1,
                                    PR_LEVEL_3,
                                    SPEED_SNVT_INDEX,
                                    Speed,
                                    Limit );
                    break;
                // There is a high limit alrams
                case HIGH_LIMIT_ALARM;
                    // Fill the Alarm Limit with the High Limit value
                    FillArray(  &nviFVHighLimit,
                                (unsigned *) &Limit );
                    // Report the alarm
                    ReportAlarm(    OBJECT_ID,
                                    AL_HIGH_LMT_ALM_1,
                                    PR_LEVEL_3,
                                    SPEED_SNVT_INDEX,
                                    Speed,
                                    Limit );
                    break;
                // Default Condition
                default:
                    // Fill the Alarm LLimit with a zero value
```

APPENDIX-continued

```
                FillArray(  (SNVT_speed_f *) &ZERO,
                            (unsigned *) &Limit );
                // Report the alarm
                ReportAlarm(    OBJECT_ID,
                                AL_NO_CONDITION,
                                PR_LEVEL_3,
                                SPEED_SNVT_INDEX,
                                Speed,
                                Limit );
        }
        break;
// Previous alarm was a low limit alarm
case AL_LOW_LMT_ALM_1:
        // Set the alarm status accordingly
        switch(AlarmStatus)
        {
            // If there is a high limit alarm or no alarm
            // clear the low limit alarm
            case HIGH_LIMIT_ALARM:
            case NO_ALARM:
                // Fill the Alarm Limit with the Low Limit value
                FillArray(  &nviFVLowLimit,
                            (unsigned *) &Limit );
                // Report the alarm
                ReportAlarm(    OBJECT_ID,
                                AL_LOW_LMT_CLR_1,
                                PR_LEVEL_3,
                                SPEED_SNVT_INDEX,
                                Speed,
                                Limit );
                break
            // If there is still a low limit alarm do nothing
            case LOW_LIMIT_ALARM:
                break;
            // Default Condition
            default:
                // Fill the Alarm Limit with zero
                FillArray(  (SNVT_speed_f *) &ZERO,
                            (unsigned *) &Limit );
                // Report the alarm
                ReportAlarm(    OBJECT_ID,
                                AL_NO_CONDITION
                                PR_LEVEL_3,
                                SPEED_SNVT_INDEX,
                                Speed,
                                Limit );
        }
        break;
// Previous alarm was a high limit alarm
case AL_HIGH_LMT_ALM_1:
        // Set the alarm status accordingly
        switch(AlarmStatus)
        {
            // If there is a low limit alarm or no alarm clear
            // the high limit alarm
            case LOW_LIMIT_ALARM:
            case NO_ALARM:
                // Fill the Alarm Limit with the High Limit value
                FillArray(  &nviFVHighLimit,
                            (unsigned *) &Limit );
                // Report the alarm
                ReportAlarm(    OBJECT_ID,
                                AL_HIGH_LMT_CLR_1,
                                PR_LEVEL_3,
                                SPEED_SNVT_INDEX,
                                Speed,
                                Limit );
                break;
            // If there is still a high limit alarm, do nothing
            case HIGH_LIMIT_ALARM:
                break;
            // Default Condition
            default:
                // Fill the Alarm Limit with zero
                FillArray(  (SNVT_speed_f *) &ZERO,
                            (unsigned *) &Limit );
                // Report the alarm
                ReportAlarm     OBJECT_ID,
                                AL_NO_CONDITION,
```

APPENDIX-continued

```
                                    PR_LEVEL_3,
                                    SPEED_SNVT_INDEX,
                                    Speed,
                                    Limit );
            }
            break;
        }
    }
}
//-------------------------------------------------------------------------------
// Report Alarms
//-------------------------------------------------------------------------------
void    ReportAlarm(    unsigned long       objectID,
                        alarm_type_t        AlarmType,
                        priority_level_t    PriorityLevel,
                        unsigned long       IndexToSNVT,
                        unsigned            Value[4],
                        unsigned            AlarmLimit[4])
{
    // Fill the in the passed alarm information
    stropy( ( char *) &nvoAlarmStatus.location, (char *) &nviName);
    nvoAlarmStatus.object_id = ObjectID;
    nvoAlarmStatus.alarm_type = AlarmType;
    nvoAlarmStatus.priority_level = PriorityLevel;
    nvoAlarmStatus.index_to_SNVT = IndexToSNVT;
    // Fill the Current Face Velocity Value
    nvoAlarmStatus.value[0] = Value[0];
    nvoAlarmStatus.value[1] = Value[1];
    nvoAlarmStatus.value[2] = Value[2];
    nvoAlarmStatus.value[3] = Value[3];
    // Fill the Alarm Limit Value
    nvoAlarmStatus.alarm_limit[0] = AlarmLimit[0];
    nvoAlarmStatus.alarm_limit[1] = AlarmLimit[1];
    nvoAlarmStatus.alarm_limit[2] = AlarmLimit[2];
    nvoAlarmStatus.alarm_limit[3] = AlarmLimit[3];
    // Fill in the current time and date
    nvoAlarmStatus.year = nviDateTime.year;
    nvoAlarmStatus.month = nviDateTime.month;
    nvoAlarmStatus.day = nviDateTime.day;
    nvoAlarmStatus.hour = nviDateTime.hour;
    nvoAlarmStatus.minute = nviDateTime.minute;
    nvoAlarmStatus.second = nviDateTime.second;
}
//-------------------------------------------------------------------------------
// FillArray
// Taxes a floating point speed variable and fills an unsigned 4 byte
// array with it.
//-------------------------------------------------------------------------------
void FillArray(  SNVT_speed_f * value_f,
                 unsigned * value)
{
    char *ptr1, *ptr2;     // Set up some temp pointers
    // Asign the address for the pointers
    ptr1 = (char *) value_f;
    ptr2 = (char *) value;
    // Copy the floating point number to the unsigned array
    *ptr2+- = *ptr1+-;
    *ptr2+- = *ptr1+-;
    *ptr2+- = *ptr1+-;
    *ptr2 = *ptr1;
}
//-------------------------------------------------------------------------------
// DeadBand
// Returns TRUE if the Face Velocity is outside the deadband
// Returns FALSE if the Face Velocity is inside the deadband
//-------------------------------------------------------------------------------
boolean DeadBand( )
{
    float_type temp0_f;         // Tempory Floating Point Variable 1
    float_type temp1_f;         // Tempory Floating Point Variable 2
    // Get half of the DeadBand
    temp0_f = f1_half;
    f1_mul( (const float_type *) &nviPIDDeadBand, &temp0_f, &temp1_f);
    // Check the higher limit
    f1_add( (const float_type *) &nviPIDSetpoint, &temp1_f, &temp0_f);
    if (f1_gt( (const float_type *) &nvofaceVelocity, &temp0_f) )
    {
        return(TRUE);
    }
    // Check the lower limit
```

APPENDIX-continued

```
        f1_sub( (const float_type *) &nviPIDSetpoint, &temp1_f, &temp0_f);
        if (f1_lt( (const float_type *) &nvoFaceVelocity, &temp0_f) )
        {
            return(TRUE);
        }
        // The face velocity is inside the deadband
        return(FALSE);
}
//-------------------------------------------------------------------------------------
// PID Control Loop
//-------------------------------------------------------------------------------------
void PID( )
{
        float_type temp0_f;        // Tempory Floating Point Variable 1
        float_type temp1_f;        // Tempory Floating Point Variable 2
        // Calculate the error
        if (nviPIDSign >= 0)
        {
            // Normal Control Sign
            // Error = nviPIDSetpoint - nvoFaceVelocity
            f1_sub( (const float_type *) &nviPIDSetpoint,
                    (const float_type *) &nvofaceVelocity,
                    &Error);
        }
        else
        {
            // Reverse Control Sign
            // Error = nvoFaceVelocity - nviPIDSetpoint
            f1_sub( (const float_type *) &nvofaceVelocity,
                    (const float_type *) &nviPIDSetpoint,
                    &Error);
        }
        // Calculate the Proportion Component
        // PPart = Error * nviPIDProp
        f1_mul(  &Error,
                 (const float_type *) &nviPIDProp,
                 &PPart);
        // Calculate the Integral Component
        // IPart = IPart + nviPIDIntegral * Error
        f1_mul(  (const float_type *) &nviPIDIntegral,
                 &Error,
                 &temp0_f);
        f1_add(  &IPart,
                 temp0_f,
                 &IPart);
        // Calculate the Derivative Component
        // DPart = (Error - PrevError) * nviPIDDerivative
        f1_sub(  &Error,
                 &PrevError,
                 &temp0_f);
        f1_mul(  &temp0_f,
                 (const float_type *) &nviPIDDerivative,
                 &DPart);
        // Add all the PID components together
        // TemporyOut = PPart + IPart + DPart
        f1_add(  &PPart,
                 &IPart,
                 &temp0_f);
        f1_add(  &temp0_f,
                 &DPart,
                 &temp0_f);
        // Watch for positive anti-reset windup
        // if TemporyOut > PID_MAX_OUT then
        //      IPart = IPart + PID_MAX_OUT - TemporyOut
        //      TemporyOut = PID_MAX_OUT
        if ( f1_gt( &temp0_f, &PID_MAX_OUT) )
        {
            f1_add(&IPart, &PID_MAX_OUT, &temp1_f);
            f1_sub(&temp1_f, &temp0_f, &IPart);
            temp0_f = PID_MAX_OUT;
        }
        // Watch for negative anti-reset windup
        // if TemporyOut < PID_MIN_OUT then
        //      IPart = IPart + PID_MIN_OUT - TemporyOut
        //      TemporyOut = PID_MIN_OUT
        if ( f1_lt( &temp0_f, &PID_MIN_OUT) )
        {
            f1_add(&IPart, &PID_MIN_OUT , &temp1_f);
            f1_sub(&temp1_f, &temp0_f, &IPart);
```

APPENDIX-continued

```
        temp0_f = PID_MIN_OUT;
    }
    // Save the PID Output
    // nvoPIDOut = TemporyOut
    nvoPIDOut = * (SNVT_lev_cont_f *) &temp0_f;
    // Update the Previous Error
    PrevError = Error;
}
```

NETWORK VARIABLE TYPES

```
//------------------------------------------------------------------------
// Defines
//------------------------------------------------------------------------
#define   ON                          1
#define   OFF                         0
#define   ON_VAL              200U
#define   OFF_VAL             0U
#define   OCCUPIED            1
#define   UNOCCUPIED          0
#define   BIT_MON             0x01
#define   BIT_TUE             0x02
#define   BIT_WED             0x04
#define   BIT_THU             0x06
#define   BIT_FRI             0x10
#define   BIT_SAT             0x20
#define   BIT_SUN             0x40
#define   SCH_DISABLED    0xFF
#define   SCH_UNOCCUPIED  0x00
#define   SCH_OCCUPIED    0x01
#define   SCH_WARMUP          0x02
#define   SCH_SETBACK         0x03
#define   MAX_NAME                        16
#define   MAX_MANUFACTURER    16
#define   MAX_PRODUCT                     16
#define   MAX_VERSION                     8
#define   MAX_SERIAL_NUMBER   7
#define   MAX_BIRTHMARK       4
//------------------------------------------------------------------------
// Enumerations
//------------------------------------------------------------------------
typedef enum sensor_type
{
        ST_DISABLED,
        ST_NO,
        ST_NC
}SENSOR_TYPE;
typedef enum switch_type
{
        SW_DISABLED,
        SW_NO,
        SW_NC,
INNOVEX.h
        SW_NC_MOMENTARY,
        SW_NC_MOMENTARY
}SWITCH_TYPE;
//------------------------------------------------------------------------
// Structures
//------------------------------------------------------------------------
// Basic Types
typedef unsigned char BOOL;
typedef unsigned char UINT8;
typedef char INT8;
typedef unsigned long UINT16;
typedef long INT16;
// Schedule Innovex Network Variable Type
// Use either the day_bitmap or the month-day elements,
// do not use both, or the day_bitmap will take presidence.
// The schedules must be placed in array index if
// multiple schedules are desired. The lowest index schedule
// takes presendence oer toher schedules.
typedef struct invt_sched
{
        UINT8   state;       // State between start and stop times
                                     // Outside the times, the stat is 0
        UINT8   day_bitmap;  // Use BIT_MON thru BIT_SUN
        UINT8   month;
        UINT8   day;
        struct
```

APPENDIX-continued

```
            {
                    UINT8 hour;      // 0-24 hours
                    UINT8 minutes;   // 0-59 minutes
            } start;
            struct
            {
                    UINT8 hour;      // 0-48 hours, for second shifts
                    UINT8 minutes;   // 0-59 minutes
            } stop;
} INVX_SCHED;
```

INTELLIGENT OCCUPANCY MONITOR

```
//---------------------------------------------------------------------------
// Compiler Directives
//---------------------------------------------------------------------------
#pragma relaxed_casting_on
//---------------------------------------------------------------------------
// Include Files
//---------------------------------------------------------------------------
//#include <SNVT_AL.H>
//#include <SNVT_PR.H>
#include <INNOVEX.H>
//---------------------------------------------------------------------------
// Defines
//---------------------------------------------------------------------------
#define WINK_FLASH_TIME   1000
#define MAX_WINK_FLASH    5
#define MAX_SCHED         7
//---------------------------------------------------------------------------
// Function Prototypes
//---------------------------------------------------------------------------
void Occupancy_Try( BOOL desired_state );
void Override_Latch( void );
void Occupancy_Set( BOOL desired_state );
void Default_Properties( void );
//---------------------------------------------------------------------------
// Network Variable Declarations
//---------------------------------------------------------------------------
//                                            1234567890123456
// SYSTEM
network input    onchip  SNVT_time_stamp  nviDateTime;
newtork output   onchip  SNVT_alarm       nvoAlarmStatus;   // Not implemented
// OCCUPANCY STATUS
network output   onchip  SNVT_switch      nvoOccupancy;
// EMERGENCY
network input    onchip  SNVT_switch      nviEmergency;     // Not implemented
network output   onchip  SNVT_switch      nvoEmergency;     // Not implemented
network output   onchip  SNVT_lev_cont_f  nvoEmerPosition;  // Not implemented
// OCCUPANCY ALARMING
network output   onchip  SNVT_switch      nvoUnoccAlarm;    // Not implemented
//---------------------------------------------------------------------------
// I/O Objects
//---------------------------------------------------------------------------
IO_0 input   bit in_occ_sensor;   // Occupancy Sensor
IO_1 input   bit in_man_btn;      // Manual Occupancy Button
IO_2 input   bit in_emr_btn;      // Emergency Button
IO_3 input   bit in_sil_btn;      // Emergency Silence
IO_4 output  bit out_occ;         // Occupancy Status
IO_5 output  bit out_man;         // Current Override State
IO_6 output  bit out_emr;         // Emergency Siren
IO_7 output  bit out_wnk;         // Wink
IO_7 input   bit in_wnk;          // Wink status
//---------------------------------------------------------------------------
// Timers
//---------------------------------------------------------------------------
stimer tmr_oct;                   // Occupancy timer
stimer tmr_man;                   // Manual occupancy timer
mtimer tmr_wnk;                   // Wink flash timer
//---------------------------------------------------------------------------
// Properties
//---------------------------------------------------------------------------
// System Object Properties
UINT8  eeprom   name[MAX_NAME];
UINT8  const    manufacturer[MAX_MANUFACTURER] =
                {
                        'I', 'n', 'n', 'o', 'v', 'e', 'x', 0x00
                };
UINT8  const    product[MAX_PRODUCT] =
```

APPENDIX-continued

```
                    {
                            'I', 'A', 'M', 0x00
                    };
UINT8   const       version[MAX_VERSION] =
                    {
                            '0', '1', '-', '0', '0', 0x00
UINT8   eeprom      serial_number[MAX_SERIAL_NUMBER];
UINT8   const       birthmark[MAX_BIRTHMARK] =              // Not implemented
                    {
                            0x01, 0x02, 0x03, 0x04
                    };
UINT8   eeprom      ee_birthmark[MAX_BIRTHMARK];            // Not implemented
// Occupancy Object Properties
BOOL                occ_stat;
SENSOR_TYPE  eeprom occ_sensor_type;
UINT16       eeprom occ_time;
BOOL                occ_sensor;
BOOL         eeprom occ_override;                           // Not implemented
// Manual Occupancy Object Properties
BOOL                man_stat;
SWITCH_TYPE  eeprom man_btn_type;
UINT16       eeprom man_time;
BOOL                man_btn;
BOOL         eeprom man_override;                           // Not implemented
// Emergency Object Properties
BOOL                emr_stat;                               // Not implemented
SWITCH_TYPE         emr_btn_type;                           // Not implemented
SNVT_lev_cont_f eeprom emr_position;                        // Not implemented
BOOL                emr_btn;                                // Not implemented
BOOL         eeprom emr_override;                           // Not implemented
// Emergency Silence Object Properties
BOOL                sil_stat;                               // Not implemented
SWITCH_TYPE  eeprom sil_btn_type;                           // Not implemented
BOOL                sil_btn;                                // Not implemented
BOOL         eeprom sil_override;                           // Not implemented
// Occupancy Alarming Object Properties
BOOL                alm_stat;                               // Not implemented
BOOL                alm_sched_stat[MAX_SCHED];              // Not implemented
INVX_SCHED   eeprom alm_sched[MAX_SCHED];                   // Not implemented
BOOL         eeprom alm_override;                           // Not implemented
//--------------------------------------------------------------------------
// Global Variables
//--------------------------------------------------------------------------
UINT8   wnk_cnt;                // current wink flash count
//--------------------------------------------------------------------------
//--------------------------------------------------------------------------
//--------------------------------------------------------------------------
// Events
//--------------------------------------------------------------------------
//--------------------------------------------------------------------------
//--------------------------------------------------------------------------
//--------------------------------------------------------------------------
// Reset
//--------------------------------------------------------------------------
when (reset)
{
        // ------ Pool Input Network Variable ---------
        poll( nviEmergency );
        poll( nviDateTime );
        // ------ Default Output Network Variables --------
        // Default the occupancy status to occupied
        nvoOccupancy.value = ON_VAL;
        nvoOccupancy.state = ON;
        // Don't start in an emergency codition
        nvoEmergency.value = OFF_VAL;
        nvoEmergency.state = OFF;
        // Don't start in an unoccupied alarm condition
        nvoUnoccAlarm.value = OFF_VAL;
        nvoUnoccAlarm.state = OFF;
        // ---- Default I/O Objects ----------
        io_out( out_occ, ON );
        io_out( out_man, OFF );
        io_out( out_emr, OFF );
        io_out( out_wnk, OFF );
        // ------ Default Properties ----------
        occ_stat = ON;
        man_stat = OFF;
        emr_stat = OFF;
        sil_stat = OFF;
```

APPENDIX-continued

```
            alm_stat = OFF;
            // Use default values for now
            Default_Properties( );
            // Start out occupied
            Occupancy_Try( OCCUPIED );
}
//----------------------------------------------------------------------------------
// Wink messages Arrives
//----------------------------------------------------------------------------------
when( wink )
{
            wnk_cnt = 0;
            tmr_wnk = WINK_FLASH_TIME;
            io_out( out_wnk, ON );
}
//----------------------------------------------------------------------------------
// Occupancy Sensor Update
//----------------------------------------------------------------------------------
when( io_changes( in_occ_sensor ) )
{
            // Do nothing if it overridden
            if( occ_override == TRUE)
                        return;
            switch( occ_sensor_type )
            {
                        case ST_NO;
                                    if( input_value == OFF)
                                    {
                                                occ_sensor = ON;
                                                Occupancy_Try( OCCUPIED );
                                    }
                                    else
                                    {
                                                occ_sensor = OFF;
                                                Occupancy_Try( UNOCCUPIED );
                                    }
                                    break;
                        case ST_NC;
                                    if( input_value == ON )
                                    {
                                                occ_sensor = ON;
                                                Occupancy_Try( OCCUPIED );
                                    }
                                    else
                                    {
                                                occ_sensor = OFF;
                                                Occupancy_Try( UNOCCUPIED );
                                    }
                                    break;
                        case ST_DISABLED;
                        default:
                                    occ_stat = UNOCCUPIED;
                                    occ_sensor = OFF;
                                    tmr_occ = 0;
                                    Occupancy_Try( UNOCCUPIED );
                                    break;
            }
}
//----------------------------------------------------------------------------------
// Manual Occupancy Button Pressed
//----------------------------------------------------------------------------------
when( io_changes( in_man_btn ) )
{
            // Do nothing if it is overridden
            if( man_override == TRUE )
                        return;
            switch( man_btn_type )
            {
                        case SW_NO;
                                    if( input_value == OFF )
                                    {
                                                man_stat = ON;
                                                man_btn = ON;
                                    }
                                    else
                                    {
                                                man_stat = OFF;
                                                man_btn = OFF;
                                    }
```

APPENDIX-continued

```
                io_out( out_man, man_stat );
                Occupancy_Try( OCCUPIED );
                break;
            case SW_NC:
                if( input_value == ON )
                {
                    man_stat = ON;
                    man_btn = ON;
                }
                else
                {
                    man_stat = OFF;
                    man_btn = OFF;
                }
                io_out( out_man, man_stat );
                Occupancy_Try( OCCUPIED );
                break;
            case SW_NO_MOMENTARY:
                if( input_value == OFF )
                {
                    Override_Latch( );
                    Occupancy_Try( OCCUPIED );
                    man_btn = ON;
                }
                else
                {
                    man_btn = OFF;
                }
                break;
            case SW_NC_MOMENTARY:
                if( input_value == ON )
                {
                    Override_Latch( );
                    Occupancy_Try( OCCUPIED );
                    man_btn = ON;
                }
                else
                {
                    man_btn = OFF;
                }
                break;
            case SW_DISABLED:
            default:
                man_stat = OFF;
                man_btn = OFF;
                tmr_man = 0;
                Occupancy_Try( occ_stat );
                break;
        }
}
//------------------------------------------------------------------------
// Occupancy Timer Expires
//------------------------------------------------------------------------
when( timer_expires( tmr_occ ) )
{
    Occupancy_Try( UNOCCUPIED );
}
//------------------------------------------------------------------------
// Manual Occupancy Timer Expires
//------------------------------------------------------------------------
when( timer_expires( tmr_man ) )
{
    man_stat = OFF;
    io_out( out_man, OFF );
    Occupancy_Try( occ_stat );
}
//------------------------------------------------------------------------
// Wink flash timer Expires
//------------------------------------------------------------------------
when( timer_expires( tmr_wnk ) )
{
    if( io_in(in_wnk) == ON )
    {
        io_out( out_wnk, OFF );
        tmr_wnk = WINK_FLASH_TIME;
    }
    else
    {
        wnk_cnt**;
```

APPENDIX-continued

```
                io_out( out_wnk, ON );
                if( wnk_cnt < MAX_WINK_FLASH )
                {
                        tmr_wnk = WINK_FLASH_TIME;
                }
        }
}
//------------------------------------------------------------------------
//------------------------------------------------------------------------
//------------------------------------------------------------------------
// Functions
//------------------------------------------------------------------------
//------------------------------------------------------------------------
//------------------------------------------------------------------------
//------------------------------------------------------------------------
// Handle Manual Occupancy With a Latching Button
//------------------------------------------------------------------------
void Override_Latch( void )
{
        // Override is off, turn if on
        if( man_stat == OFF )
        {
                man_stat = ON;
                tmr_man = man_time;
                io_out( out_man, ON );
        }
        // Override is on, turn it off
        else
        {
                man_stat = OFF;
                tmr_man = 0;
                io_out( out_man, OFF );
        }
}
//------------------------------------------------------------------------
// Try to Set Occupancy
//------------------------------------------------------------------------
void Occupancy_Try( BOOL desired_state )
{
        // Occupancy Overridden
        if( man_stat == ON )
        {
                Occupancy_Set( OCCUPIED );
        }
        // Normal Control
        else
        {
                if( desired_state == OCCUPIED )
                {
                        Occupancy_Set( OCCUPIED );
                        tmr_occ = occ_time;
                }
                else
                {
                        Occupancy_Set( UNOCCUPIED );
                        tmr_occ = 0;
                }
        }
}
//------------------------------------------------------------------------
// Set the Occupancy Status
//------------------------------------------------------------------------
void Occupancy_Set( BOOL desired_state )
{
        if( desired_state == OCCUPIED )
        {
                if( ( nvoOccupancy.state != OCCUPIED) ||
                        ( nvoOccupancy.value != ON_VAL ) )
                {
                        nvoOccupancy.state = OCCUPIED;
                        nvoOccupancy.value = ON_VAL;
                }
                io_out( out_occ, ON );
        }
        else
        {
                if( ( nvoOccupancy.state != UNOCCUPIED ) ||
                        ( nvoOccupancy.value != OFF_VAL ) )
                {
```

APPENDIX-continued

```
                        nvoOccupancy.state = UNOCCUPIED;
                        nvoOccupancy.value = OFF_VAL;
                }
                io_out( out_occ. OFF );
        }
}
//--------------------------------------------------------------------------------
// Restore Default Properties
//--------------------------------------------------------------------------------
void Default_Properties( void )
{
        UINT8   temp8
        UINT16  temp16;
        // Occupancy Object
        temp8 = ST_NO;                                  // occupancy sensor type
        eeprom_memcpy( &occ_sensor, &temp8, 1 );
        temp16 = 300;                                   // occupancy time
        eeprom_memcpy( &occ_time, &temp16, 2 );
        temp8 = OFF;                                    // occupancy override
        eeprom_memcpy( &occ_override, &temp8, 1 );
        // Manual Occupancy Object
        temp8 = SW_NO;                                  // manual occupancy button type
        eeprom_memcpy( &man_btn_type, &temp8, 1 );
        temp16 = 600;                                   / manual occupancy time
        eeprom_memcpy( &man_time, &temp16, 2 );
        temp8 = OFF;                                    // manual occupancy override
        eeprom_memcpy( &man_override, &temp8, 1 );
}
```

What is claimed is:

1. A system for controlling the operation of a laboratory with a fume hood having a sash comprising:

an intelligent occupancy monitor mechanism for producing an output control signal corresponding to the presence or absence of a person adjacent the sash of the fume hood, said producing mechanism comprising a producing CPU having its own intelligence which actively produces the output control signal, said producing mechanism to be disposed in fluid communication with the fume hood;

an intelligent sash closure mechanism for controlling air flow through the sash of the fume hood corresponding to the output control signal, said controlling mechanism connected to the producing mechanism to receive the output control signal, said controlling mechanism comprising a controlling CPU having its own intelligence which actively produces a drive signal for operating the controlling mechanism corresponding to the output control signal, said producing mechanism and said controlling mechanism forming a fully distributed intelligent non-hierarchical architecture; and a network to which the producing mechanism and the controlling mechanism are connected to communicate with each other, the producing mechanism and the controlling mechanism each having a network circuit which provides a communication network variable to the network so the producing mechanism and the controlling mechanism can communicate with each other.

2. A system for controlling the operation of a laboratory with a fume hood having a sash comprising:

an intelligent occupancy monitor which produces a communication network variable corresponding to the presence of at least o ne person in the laboratory;

an intelligent pressure sensor which produces a communication network variable corresponding to pressure in the laboratory;

an intelligent humidity sensor which produces a communication network variable corresponding to humidity in the laboratory;

an intelligent fumehood monitor which produces a communication network variable corresponding to status of the fumehood in the laboratory;

an intelligent laboratory monitor which produces a communication network variable corresponding to status of the laboratory in the laboratory;

an intelligent actuator mechanism for controlling air flow in the laboratory based on the communication network variables received from the intelligent occupancy monitor, the intelligent pressure sensor, the intelligent humidity sensor, the intelligent fumehood monitor, the intelligent laboratory monitor; and a network to which the intelligent actuator mechanism, the intelligent occupancy monitor, the intelligent pressure sensor, the intelligent humidity sensor, the intelligent fumehood monitor, and the intelligent laboratory monitor are connected to communicate with each other, said intelligent actuator mechanism, intelligent occupancy monitor, intelligent pressure sensor, intelligent humidity sensor, intelligent fumehood monitor and intelligent laboratory monitor forming a fully distributed intelligent non-hierarchial architecture.

3. A method for controlling air flow in a fume hood comprising the steps of:

sensing for the presence of a person near a fume hood to identify a measured presence;

producing a communication network variable corresponding to a desired sash position of the fume hood based on the measured presence with a producing processor;

transmitting the communication network variable over a network;

receiving the communication network variable at a device with a controlling processor which controls the sash's position at the fume hood, said controlling processor and producing processor forming a fully distributed intelligent non-hierarchical architecture; and controlling the sash position of the fume hood with the device based on the communication network variable which has been processed by the controlling processor.

* * * * *